US006053693A

United States Patent [19]

Ringdahl et al.

[11] Patent Number: 6,053,693

[45] **Date of Patent: *Apr. 25, 2000**

[54] COLLAPSIBLE, POWERED PLATFORM FOR LIFTING WHEELCHAIR

[75] Inventors: Lynn O. Ringdahl, Alexandria; James B. Welte, Sunberg, both of Minn.

[73] Assignee: Crow River Industries, Inc., Plymouth, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,002

[22] Filed: Aug. 21, 1997

Related U.S. Application Data

[60] Division of application No. 08/473,666, Jun. 7, 1995, Pat. No. 5,672,041, which is a continuation-in-part of application No. 08/363,290, Dec. 22, 1994, abandoned.

[51] Int. Cl.[7] .......... B60P 1/44

[52] U.S. Cl. .......... 414/545; 414/917; 414/921; 414/556; 187/306

[58] Field of Search .......... 414/921, 539, 414/540, 541, 545, 546, 556, 557, 917; 187/200, 276, 285, 306; 254/2 R; 105/447

[56] References Cited

U.S. PATENT DOCUMENTS

| | | | |
|---|---|---|---|
| Re. 30,462 | 12/1980 | Pohl | 414/921 X |
| Re. 31,178 | 3/1983 | Deacon . | |
| 4,140,230 | 2/1979 | Pearson . | |
| 4,273,217 | 6/1981 | Kajita | 414/921 X |
| 4,353,436 | 10/1982 | Rice et al. . | |
| 4,534,450 | 8/1985 | Savaria . | |
| 4,664,584 | 5/1987 | Braun et al. . | |
| 4,953,665 | 9/1990 | Paquin . | |
| 4,958,979 | 9/1990 | Svensson . | |
| 4,977,981 | 12/1990 | Paquin . | |
| 4,984,955 | 1/1991 | McCullough | 414/921 X |
| 5,180,275 | 1/1993 | Czech et al. . | |
| 5,228,538 | 7/1993 | Tremblay . | |
| 5,234,311 | 8/1993 | Loduha, Jr. et al. . | |
| 5,234,331 | 8/1993 | Schmidgall . | |
| 5,253,973 | 10/1993 | Fretwell . | |
| 5,261,779 | 11/1993 | Goodrich . | |
| 5,263,808 | 11/1993 | Kent | 414/545 |
| 5,308,215 | 5/1994 | Saucier . | |
| 5,320,135 | 6/1994 | Pierrou . | |

FOREIGN PATENT DOCUMENTS

| | | | |
|---|---|---|---|
| 186541 | 11/1982 | Japan | 414/521 |
| 2106857 | 4/1983 | United Kingdom | 414/921 |

OTHER PUBLICATIONS

Crow River Industries, Incorporated; Flat Floor Vangater™ dealer Manual; 44 pages; No date available.

Mobile–Tech™ Corporation; XM100 Brochure; 2 pages; No date available.

Ricon Corporation; UNI–lite™ Brochure; 2 pages; 1993.

(List continued on next page.)

*Primary Examiner*—Frank E. Werner
*Attorney, Agent, or Firm*—Merchant & Gould P.C.

[57] ABSTRACT

An apparatus for moving an object, such as a wheelchair, between an upper position and a lower position. The upper position is typically adjacent to the floor surface of a vehicle while the lower position is typically at ground level. The apparatus preferably includes a platform including at least three pivotally connected sections. The sections are selectively moveable between an unfolded orientation in which the sections are substantially co-planar and a folded orientation in which the sections form a compact configuration. The apparatus also preferably includes a folding assembly for selectively moving the sections of the platform between the folded orientation and the unfolded orientation, a deployment assembly for selectively deploying and stowing the platform and a lift assembly for selectively moving the platform vertically between the upper position and the lower position. The platform includes a control assembly with at least one switch for controlling the movement phases of the platform, where a switch must be activated for each subsequent movement phase.

13 Claims, 67 Drawing Sheets

OTHER PUBLICATIONS

Ricon Corporation; S–1231 Clearway™ Brochure; 2 pages; 1993.

Ricon Corporation; Spirit™ Brochure; 2 pages; 1993.

Ricon Corporation; S–1200 Trimway™ Brochure; 2 pages; 1993.

Ricon Corporation; S–2000™ Brochure; 2 pages; No date available.

Ricon Corporation; Mirage™ for VW Brochure; 2 pages; 1993.

Ricon Corporation; Transit Rider R–5500 Brochure; 2 pages; No date available.

Braun Corporation; L800U Rear Post Swing–A–Way™ Brochure; 3 pages; 1992.

REB Manufacturing, Inc.; Specifications for All REB Lifts Brochure; 2 pages; No date available.

Braun Corporation; L205 Ultra III Commerical Wheelchair Lift Brochure; 2 pages; Sep. 1988.

Crow River; Ultragater™ Brochure; 4 pages; No date available.

Crow River; Vangater™ Brochure; 4 pages; No date available.

Crow River; Transgater™ Brochure; 4 pages; No date available.

Braun Corporation; Mid–Size Mobility Vans; 2 pages; No date available.

Braun Corporation; L900/DPA™ Brochure; 2 pages; May 1991.

Braun Corporation; Semi–Automatic L25Ultra III Commercial Wheelchair Lift; 2 pages; May 1990.

Mobile–Tech™ Corporation; Under–Vehicle Lift®; 4 pages; Mar. 1994.

Leyman Brochure for Quick Dock, FoldaVador™; Cincinnati, Ohio; 1990.-

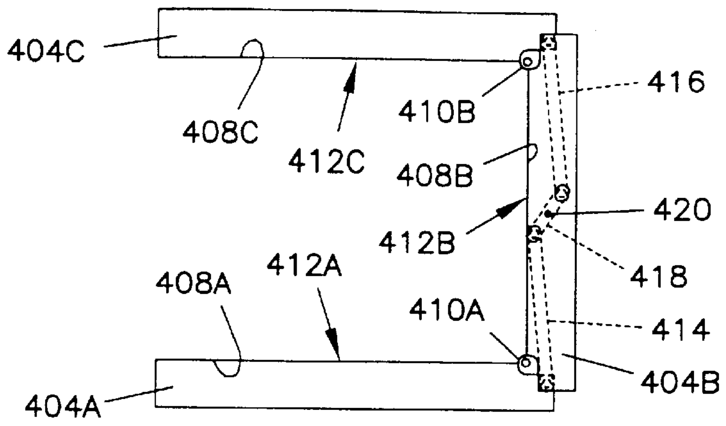
FIG. 37
FIG. 38
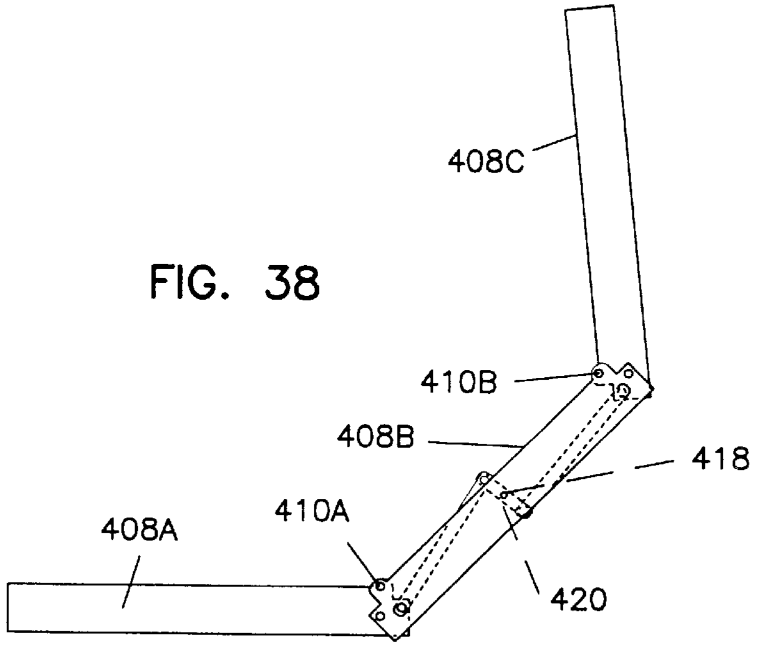
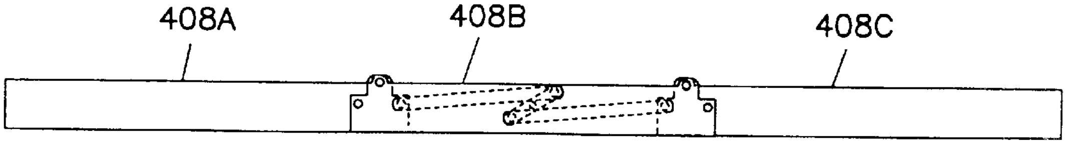
FIG. 39

NOTES:

1. 12VA - BATTERY POWER FED THRU THE CIRCUIT BREAKER.
2. 12VD - OUTPUT OF THE 12 VOLT REGULATOR.

FIG. 70

CROW RIVER MOTOR CONTROLLER 25 MAY, 1995
PROCESSOR CONNECTIONS CROW04

A. J1-LIMIT SWITCHES

| | | |
|---|---|---|
| DOOR COMMON | 0 | GND |
| DOOR LIMIT | 0 | 2 (ON PROCESSOR - U1) |
| UP/FLOOR COMMON | 0 | GND |
| UP LIMIT | 0 | 3 |
| FLOOR LIMIT | 0 | 4 |
| STOW/DEPLOY COM. | 0 | GND |
| STOW LIMIT | 0 | 5 |
| DEPLOY LIMIT | 0 | 6 |
| BARRIER DOWN COM. | 0 | GND |
| BARRIER LIMIT | 0 | 7 |
| DOWN LIMIT | 0 | 8 |
| FOLD/UNFOLD COM. | 0 | GND |
| FOLD LIMIT | 0 | 9 |
| UNFOLD LIMIT | 0 | 10 |
| STEPWELL COM. | 0 | GND |
| STEPWELL LIMIT | 0 | 15 RC0 |

B. J2 SCREW TERMINAL STRIP

| | | |
|---|---|---|
| POWER OUT - | 0 | GND |
| POWER OUT - | 0 | GND |
| POWER OUT + | 0 | +12 VDC |
| POWER OUT + | 0 | +12 VDC |
| BUZZER COMMON | 0 | GND |
| BUZZER OUT | 0 | U3-20 |
| DOME LIGHT SIGNAL | 0 | 37 RB4 |
| PWR OUT TO DOME LIGHT RELAY | 0 | U3-19 |

FIG. 71

C. PROCESSOR CONNECTIONS

| | | | |
|---|---|---|---|
| 40 | SPEED SELECT | DIP SWITCH | |
| 39 | SPEED SELECT | DIP SWITCH | |
| 38 | FOLD OPTION SELECT | DIP SWITCH | |
| 37 | DOME LITE ON SIGNAL | IN | |
| 36 | GATE MOTOR - OPEN | | |
| 35 | GATE MOTOR - CLOSE | | |
| 34 | U2-1 LED DRIVE (HI = LED ON) | | |
| 33 | UP SWITCH INPUT UP = LO | | |
| 32 | +5 VDC POWER IN | | |
| 31 | POWER COMMON (GND) | | |
| 30 | U2-2 | DEPLOY/STOW MOTOR --- | DEPLOY = HI |
| 29 | U2-3 | DEPLOY/STOW MOTOR | STOW = HI |
| 28 | U2-4 | FOLD MOTOR | FOLD = HI |
| 27 | U2-5 | FOLD MOTOR | UNFOLD = HI |
| 26 | U3-8 | UP/DOWN MOTOR | DOWN = HI |
| 25 | U3-7 | UP/DOWN MOTOR | UP = HI |
| 24 | U3-5&6 | DOOR | CLOSE = HI |
| 23 | U3-3&4 | DOOR | OPEN = HI |
| 22 | U3-2 | DOME LITE | ON = HI |
| 21 | U3-1 | BUZZER | ON = HI |
| 20 | DOWN SWITCH INPUT | | DOWN = GND |
| 19 | DEPLOY SWITCH INPUT | | DEPLOY = GND |
| 18 | STOW SWITCH INPUT | | STOW = GND |
| 17 | PWM SIGNAL TO THE MOTOR CONTROLLER | | |
| 16 | FAULT SIGNAL FROM THE MOTOR CONTROLLER - OVER CURRENT, UNDER VOLTAGE, OR OVER TEMP. | | |
| 15 | STEPWELL SWITCH INPUT | | LIMIT = GND |
| 14 | CRYSTAL | | |
| 13 | CRYSTAL | | |
| 12 | COMMON (GND) | | |
| 11 | +5 VDC POWER IN | | |
| 01 | RESET | | |

COLLAPSIBLE, POWERED PLATFORM FOR LIFTING WHEELCHAIR

CROSS REFERENCE TO PARENT APPLICATION

This application is a Divisional Application of U.S. patent application No. 08/473,666, filed on Jun. 7, 1995, now U.S. Pat. No. 5,672,041, which was a continuation-in-part of U.S. patent application No. 08/363,290, which was filed on Dec. 22, 1994, now abandoned.

FIELD OF THE INVENTION

This invention relates to powered platform for transportation of an object from one level of elevation to another level, more particularly, to lifts that are suitable for transporting a wheelchair-bound person from a vehicle to the ground.

BACKGROUND

For handicapped persons, mobility is greatly enhanced by the availability of vehicles having wheelchair lifts. Powered wheelchair lifts in which much or all of the movement of the wheelchair lift is motorized are particularly useful because of the inconvenience of physical activity by a person in a wheelchair. Many wheelchair lifts have been described in various patents. For example, U.S. Pat. No. 5,228,538 (Trembley) discloses a passenger lift suitable for use with a vehicle. The lift incorporates an electronic safety interlock to prevent all movement of the lift until a restraining belt is fastened. The lift has a pivotal mechanism for raising and lowering a platform. U.S. Pat. No. 5,261,779 (Goodrich) discloses a dual hydraulic, parallelogram arm wheelchair lift assembly for use in commercial vehicles. The lift assembly has a platform connected to a parallelogram linkage. In both of the above lift assemblies, when the platform of the lift is in a stowed position, the platform essentially blocks the doorway, making it very inconvenient to use the doorway in any other way.

Rotary wheelchair lifts that do not completely block the door when in a stowed position have been described. For example, U.S. Pat. No. 4,664,584 (Braun et al.) discloses a rotary wheelchair lift comprising a hydraulic lift having a vertically telescoping slide tube and a horizontal wheelchair platform support arm attached to the lower end of the slide tube. An in-out switch causes the platform to be rotated into or out of the vehicle around a vertical axis offset from, but parallel to, the slide tube. U.S. Pat. No. 5,180,275 (Czech et al.) discloses a rotary wheelchair lift that is retrofittable in transit vehicles. When stowed, the platform is nested against a transit seat and remains behind a closed door (behind half of a double-door pair). For use, the lift is deployed, rotated through the open double-door pair and lowered to the ground. The wheelchair lift has a variety of lockout switches and circuitry. However, in both of the rotatable wheelchair lifts, the platform, as well as the pivotal mechanism for deploying and moving the platform still take up a substantial amount of space.

U.S. Pat. No. 4,140,230 (Pearson) discloses a powered loading platform suitable for loading a wheelchair from the ground into the interior of a vehicle. The powered loading platform includes support means which pivotally support a horizontal platform and is carried by a powered parallelogram linkage. After loading the wheelchair into the vehicle, the platform can be collapsed and then pivoted to a vertically extending position entirely within the confines of the vehicle. However, even when collapsed, the powered platform still takes up a lot of room in the vehicle. Moreover, the horizontal position of the platform cannot be fine tuned to a desired position before it is lowered or raised between the vehicle and the ground. U.S. Pat. No. 4,353,436 (Rice et al.) also discloses a wheelchair lift having a foldable platform. The wheelchair lift also occupies much room even when stowed.

U.S. Pat. No. 5,234,331 (Loduha, Jr. et al.) discloses a wheelchair lift with adjustable post. The lift also has a pivotal end flap which rotates from a horizontal position during loading to an upright position during raising or lowering of the platform. This lift also blocks much of the doorway when in a stowed position.

SUMMARY

The present invention relates to an apparatus for moving an object, such as a wheelchair, between an upper position and a lower position. The upper position is typically adjacent to the floor surface of a vehicle while the lower position is typically at ground level. The apparatus preferably includes a platform including at least three pivotally connected sections. The sections are selectively moveable between an unfolded orientation in which the sections are substantially co-planar and a folded orientation in which the sections form a compact configuration. The apparatus also preferably includes a folding assembly for selectively moving the sections of the platform between the folded orientation and the unfolded orientation, a deployment assembly for selectively deploying and stowing the platform and a lift assembly for selectively moving the platform vertically between the upper position and the lower position.

A variety of advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

Illustrative embodiments of the present invention are shown in the various figures. Throughout the figures, identical reference numerals refer to identical structural elements in the several views, wherein:

FIG. 37 is a top schematic view of the sections of the platform of the embodiment of FIG. 27A in a folded, stowed configuration;

FIG. 38 is a top schematic view showing the sections of FIG. 27A in partially unfolded configuration;

FIG. 39 is a top schematic view of the sections of the platform of FIG. 27A showing the sections in fully unfolded configuration;

FIG. 70 defines microprocessor connections and limit switch commons for the microprocessor shown in FIG. 69;

FIG. 71 defines additional processor connections and outputs for the microprocessor shown in FIG. 69;

DETAILED DESCRIPTION OF PREFERRED EMBODIMENTS

Figure 1:
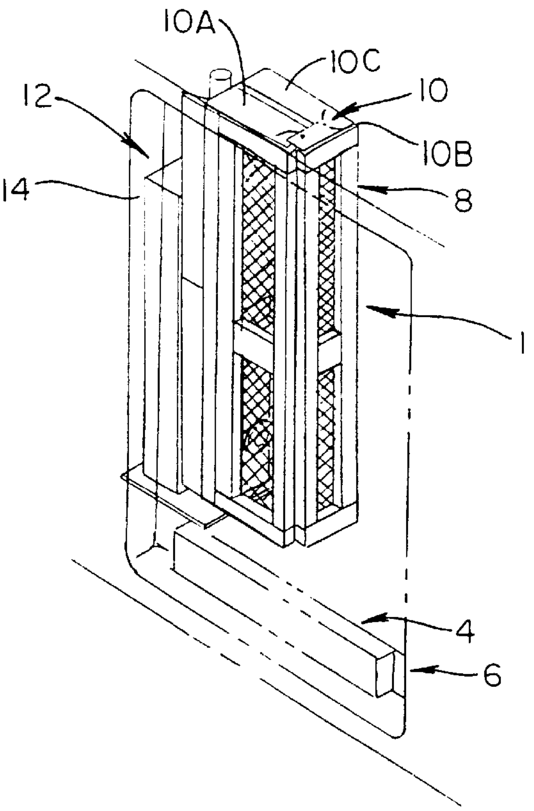
FIG. 1 is an isometric view of an embodiment of a wheelchair lift according to the present invention showing the platform of the wheelchair lift in a folded and stowed position in a vehicle.

The present invention provides a powered platform for transportation of an object (e.g., a person on a wheelchair) between two elevation levels. FIG. 1 shows an illustrative embodiment of the present invention.

Figure 2:
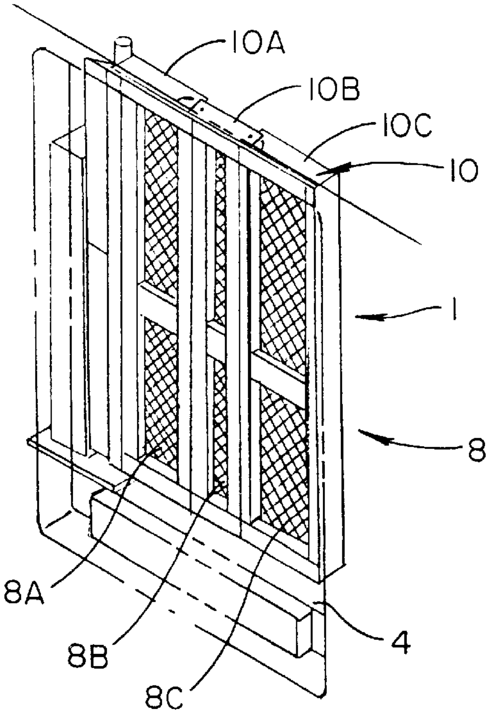
FIG. 2 is an isometric view of the embodiment of FIG. 1 showing the platform in an unfolded position.

Referring to FIG. 1, the powered platform I is a wheelchair lift for transportation of a person on a wheelchair (not shown) between the floor of a vehicle (not wholly shown in the figures) and the ground (not shown in FIG. 1). The powered platform is positioned proximate a door 6 (e.g., a side door or back door) of a vehicle, e.g., a van. The powered platform 1 preferably has a portable multi-sectional platform 8 which preferably has an adjustable (or pivotable) distal (or top or outboard) barrier 10. The term "adjustable" when used herein to describe a barrier refers to the ability to be opened and shut. When used herein, the term "distal" refers to a position that is remote from the floor of the vehicle and the term "proximal" refers to a position near to the floor of the vehicle. Referring to FIG. 1 and FIG. 2, the platform can be folded and unfolded between a compact, folded position and a generally flat, unfolded position. The powered platform 1 has a motorized means 12 for driving the various motorized movements of the powered platform. The powered platform is "collapsible" in that the platform can be stowed and folded close to the main up-down drive motor to render a compact configuration.

The motorized means 12 is preferably mounted on the floor 4 of the vehicle proximate to the edge of the floor near a side edge 14 of the door 6. The motorized means 12 is operatively connected to the platform for deploying or storing the platform, for leveling the platform from a substantially horizontal position to a desired position (which is preferably a horizontal or nearly horizontal position), for adjusting (or pivoting) the pivotable barrier 10, and for moving the platform 8 vertically from a first level to a second level of elevation. When used herein, the terms "vertical" or "horizontal" can also include orientations that are slightly off the perfectly vertical or perfectly horizontal orientations because of variation of the vehicle and the ground conditions. Preferably, the motorized means also drives the folding and unfolding of the multi-sectional platform 8. As used herein, the term "deploy" refers to the generally pivotal movement of an unfolded platform from a substantially vertical position to a substantially horizontal position in a drawbridge fashion, i.e. the upper edge of the unfolded platform moving in an arc at a speed faster than the lower edge and a tangent on the arc is substantially perpendicular to the upper edge. The term "stow" refers to moving the unfolded platform from a substantially horizontal position to a substantially vertical position in a drawbridge fashion in a movement reciprocal of the deploying movement.

Figure 3:
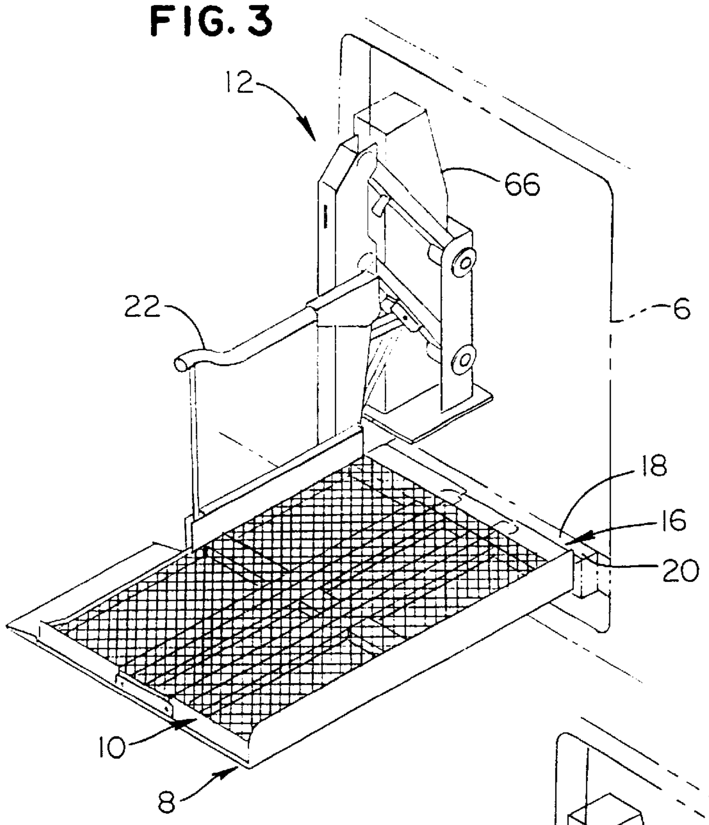
FIG. 3 is an isometric view of the embodiment of FIG. 1 showing the platform in a deployed position.

Referring to FIG. 3, in the present preferred embodiment, when the multi-sectional platform 8 has been deployed by the motorized means 12, the platform is in a substantially horizontal position extending outwardly from the door of the vehicle. As used herein, the term "outwardly" refers to a direction away from the interior of the vehicle. The platform also has proximal (or inboard or vehicle-floor) barrier 16 pivotally connected to the lower edge 18 of the multi-sectional platform 8. When the multi-sectional platform 8 is in a deployed position, the proximal barrier, driven by the motorized means 12, is in an "open", i.e. lowered position to allow a wheelchair to be rolled from the interior of the vehicle onto the multi-sectional platform. Preferably, a floor extension 20 is provided on the outside edge of the floor 4 proximate the door 6 of the vehicle to bridge any gap between the floor of the vehicle and the proximal barrier 16. In the deployed position, the motorized means 12 also extends a handrail 22 outwardly from the vehicle to provide a support for a person on the platform.

Figure 4:
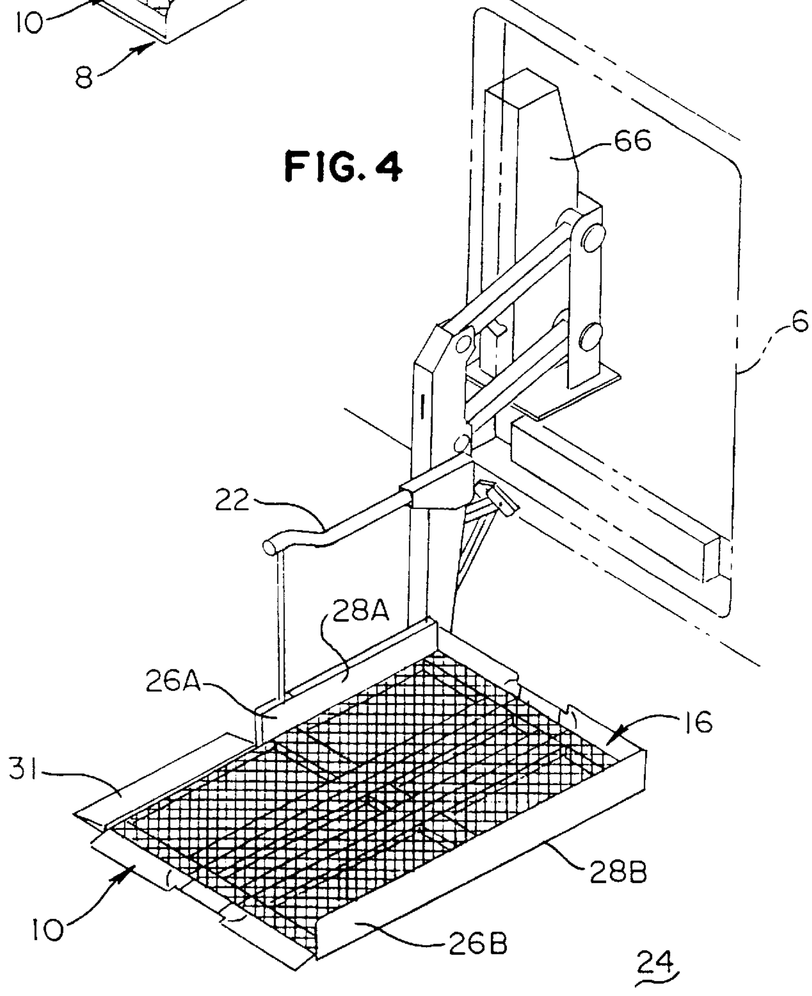
FIG. 4 is an isometric view of the embodiment of FIG. 1 showing the platform on the ground.

Referring to FIG. 4, after deploying, the multi-sectional platform 8 can be lowered from a level of elevation near the floor 4 of the vehicle to the ground. Before lowering the platform to the ground, the motorized means can be operated to provide a leveling action to move the multi-sectional platform 8 from a substantially horizontal position to a desired horizontal position. The desired horizontal position can be, for example, a position that is perfectly horizontal or a position that approximates the slope of the ground. After the multi-sectional platform 8 is positioned on the ground, the motorized means can be operated to open, i.e., lower the pivotable distal barrier 10 to permit the person to exit the platform. However, when the multi-sectional platform is being transported between the elevation of the vehicle floor and the ground, the distal pivotable barrier 10 and the proximal barrier are both in the "shut" (i.e., "up") position to confine the wheelchair therebetween. The multi-sectional platform preferably has unadjustable, i.e., rigidly affixed barriers 26A, 26B on the side edges 28A, 28B to further confine the wheelchair onto the platform. Preferably, the platform also has a ramp 30 affixed to the top portion of a side edge (e.g., 28A in FIG. 4) to allow the wheelchair to exit therefrom when exit through the distal side of the platform is inconvenient.

Figure 5:
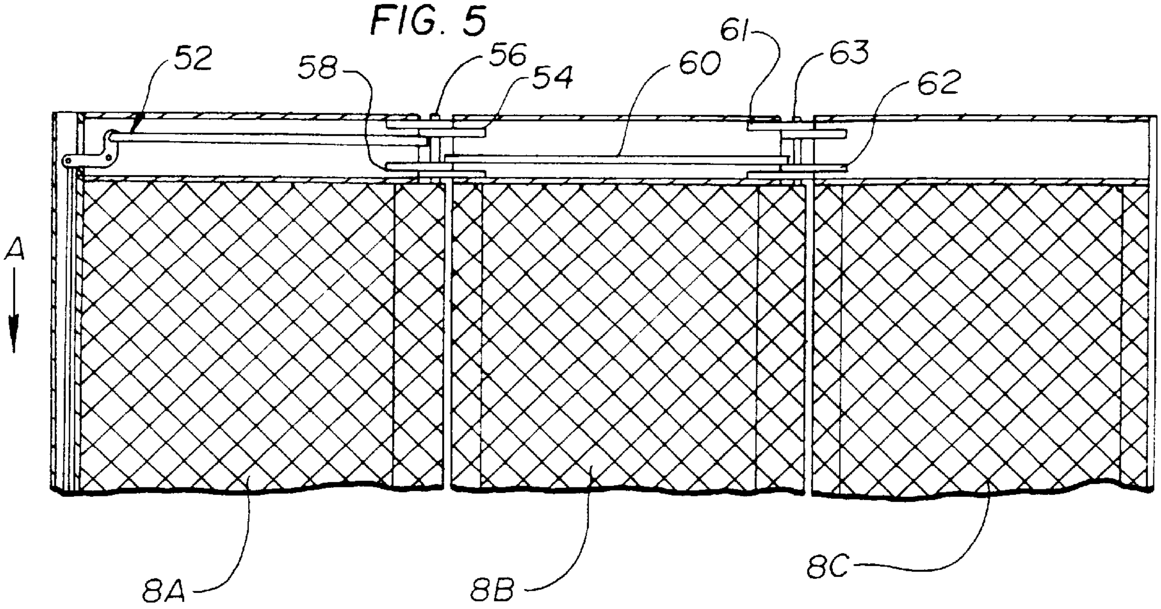
FIG. 5 is an elevation view in portion of the embodiment of FIG. 1 showing the platform in an unfolded position.
Figure 7:
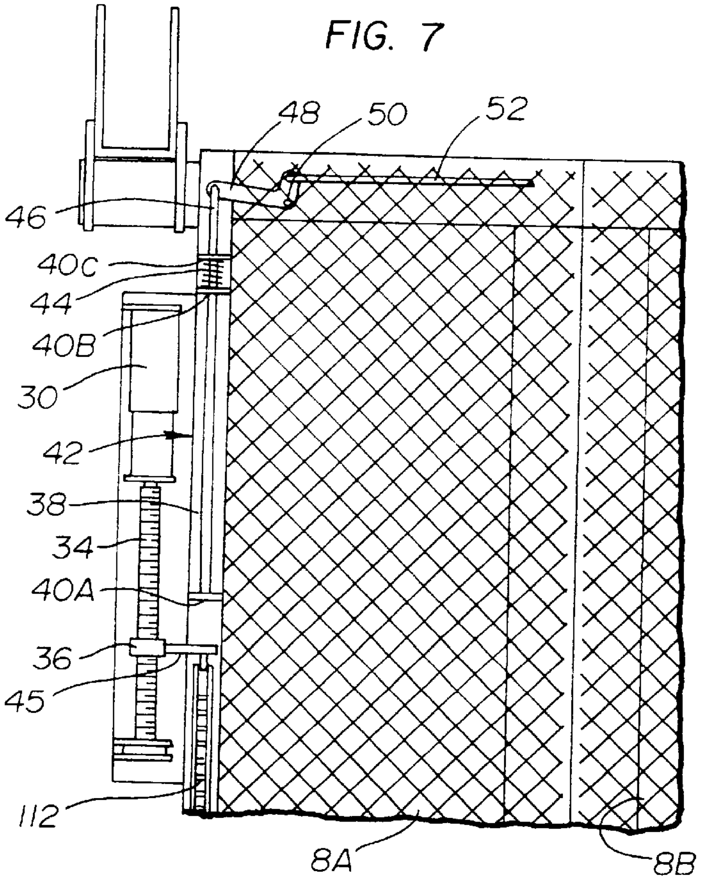
FIG. 7 shows an elevation view of the embodiment of FIG. 1 in portion showing actuation of the mechanical link to unfold the sections of the platform.
Figure 6:
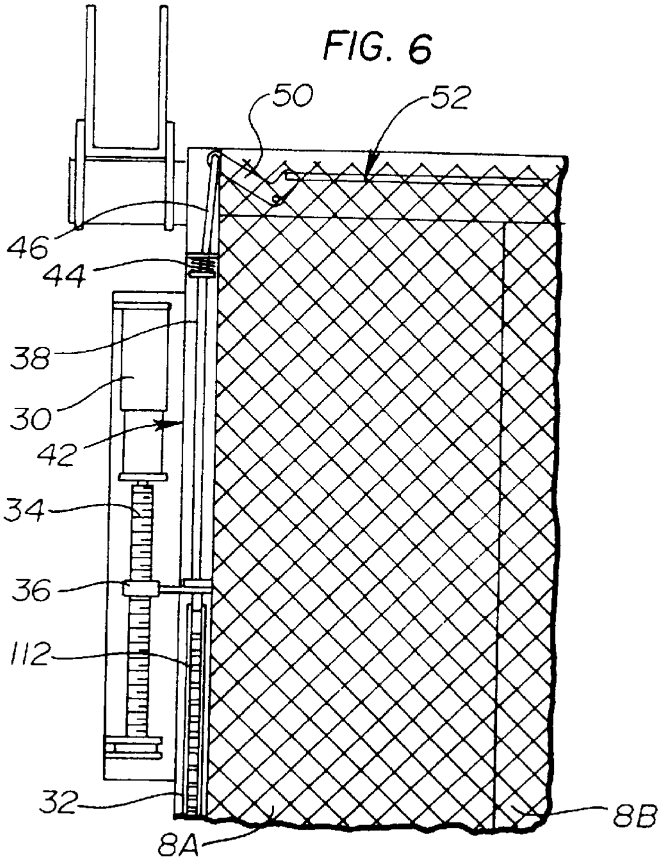
FIG. 6 shows an elevation view in portion showing the actuation of mechanical links for folding the sections of the platform.
Figure 9:
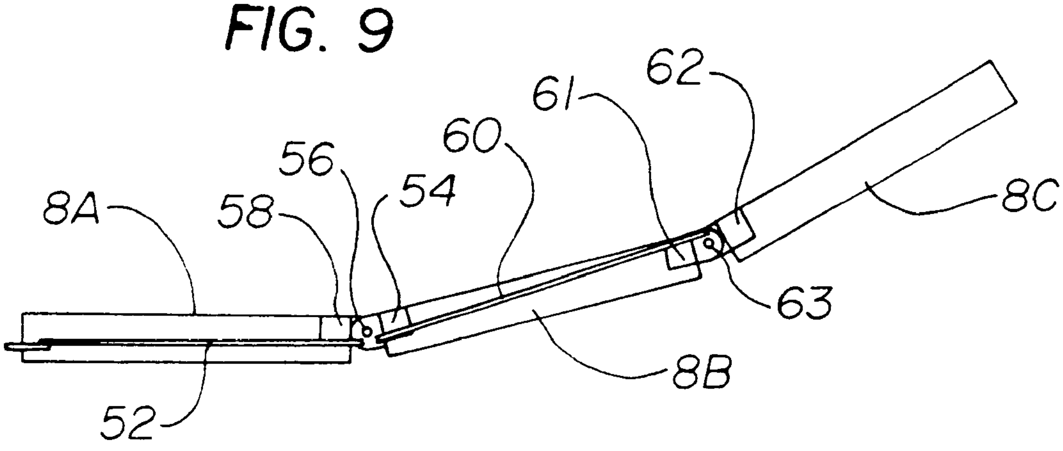
FIG. 9 is a top schematic view showing the sections of the platform of the embodiment of FIG. 1 in a partially unfolded configuration in a stowed position.
Figure 10:
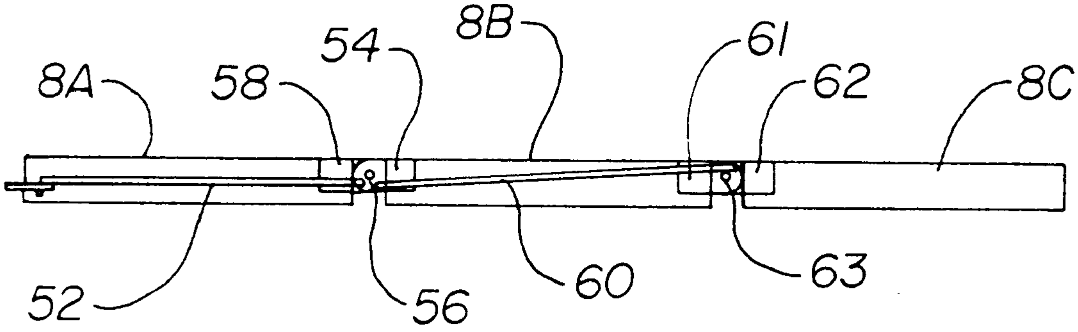
FIG. 10 is a top schematic view showing sections of the platform of the embodiment of FIG. 1 in the fully unfolded configuration in a stowed position.

Preferably, a motor is used to drive the folding and unfolding of the multi-sectional platform 8. Referring to FIGS. 5, 6, and 7, the arrow A points distally, i.e., a direction away from the floor of the vehicle. A fold-unfold motor 30 is mounted on a side rail 32 of a side section 34 of the multi-sectional platform 8. The fold-unfold motor 30 is preferably a direct current (DC) motor to provide a reciprocable actuation of a threaded fold-unfold screw shaft 34. A screw nut (e.g., ball screw nut) 36 is threadedly mounted on the fold-unfold screw shaft 34 to actuate a push rod 38 which drives the reciprocal fold-unfold movement of the multi-sectional platform.

The push rod 38 has steadying ends 40A, 40B slidably confined in a channel 42 parallel to the side rail 32. Preferably, the side rail is hollow so that its hollow interior can act as the channel 42. Screw nut 36 has a finger 45 extending therefrom into the channel 42 for releasably contacting end 40A of the push rod 38. A spring 44 is connected to the lower end 40B of push rod 38 and end 40C of a tiltable push rod 46. The tiltable push rod 46 is pivotally connected to an angled connector 48 which pivots at pivot pin 50 to actuate a lateral rod directed along the proximal (or lower) edge of the platform section 8A of the platform 8. In the embodiment shown in FIG. 1, platform 8 has three sections 8A, 8B, and 8C wherein when the platform is unfolded, section 8A is proximate the motorized means 12, section 8C is distal to the motorized means and section 8B interposes between and hingedly (or pivotally) connects to sections 8A and 8C.

Referring again to FIGS. 5, 6, and 7, when the push rod 38 is driven by motor 30 towards the proximal edge 18 of the platform, the spring 44 is compressed which in turn pushes the push rod 38 in the same direction. Push rod 38 in turn pivotally pushes angled connector 48 to cause lateral rod 52 to move in a direction away from motor 30 toward section 8B and 8C. In this configuration, the flexibility of spring 44 allows push rod 38 to tilt towards the section 8B. On the other hand, when motor 30 is actuated in a reciprocal manner to drive finger 45 away from motor 30 the compression force by finger 45 on the push rod 38 is released, thereby releasing the compression force on the spring 44. The resilient nature of spring 44 returns push rod 46 from its tilted position to a normal position which is generally in parallel relation with push rod 38.

Referring now to FIGS. 5 and 8–10, rod 52 is pivotally connected to plate 54 proximate and peripheral to the trodden (or upper) surface of section 8B. As used herein, the term "peripheral to" when describing the folding of the sections refers to a position relative another on the platform, viewing the platform when folded, as being farther away from the geometric center of the folded platform on the plane of folding movement (as in FIG. 8, which has geometric center 55). As used herein, the term "upper" or "trodden" when describing a surface of the platform 8 refers to the surface on which a wheelchair rolls for transportation to the ground. The term "lower" when referring to a surface of a platform describes the surface that contacts the ground for the wheelchair to exit from the platform. In a folded platform, pin 56 is more proximal to section 8B than rod 52. A plate 58 is also rigidly connected to section 8A and to pin 56. Plate 54 is rigidly connected to section 8B and pivots around pin 56. Therefore, when rod 52 moves in a direction away from section 8B, it causes the plate 54, and therefore section 8B to pivot around pivot pin 56, thereby unfolding section 8B and section 8A from a more folded configuration.

A rod 60 is pivotally connected to the plate 58 at a location more peripheral than pin 56, when the sections are folded, to the trodden surface of section 8A. The end of rod 60 remote from section 8A is pivotally connected to plate 62, which is rigidly connected to section 8C. The rod 60 is connected to the plate 62 more proximate than pivot pin 63 to the trodden surface of section 8C. On an end of the section 8B remote from pin 56 is mounted the pivotal pin 63 on which the plate 62 (and therefore section 8C) is pivotally mounted. A plate 61 is also affixed on pivot pin 63 in rigid relation to the section 8B. As section 8B unfolds pivotally from section 8A by the rod 52 moving in a direction away from section 8B, the rod 60 is caused to move relatively towards section 8C, thereby causing section 8C to pivot around pivot pin 63 and unfold away from section 8A. In this manner, operating the motor 30 to cause the screw nut 36 to move away from the motor 30 causes the multi-sectional platform 8 to unfold. Conversely, operating the motor 30 to move the screw nut 36 towards the motor 30 causes the multi-sectional platform to fold into a compact configuration.

Figure 12:
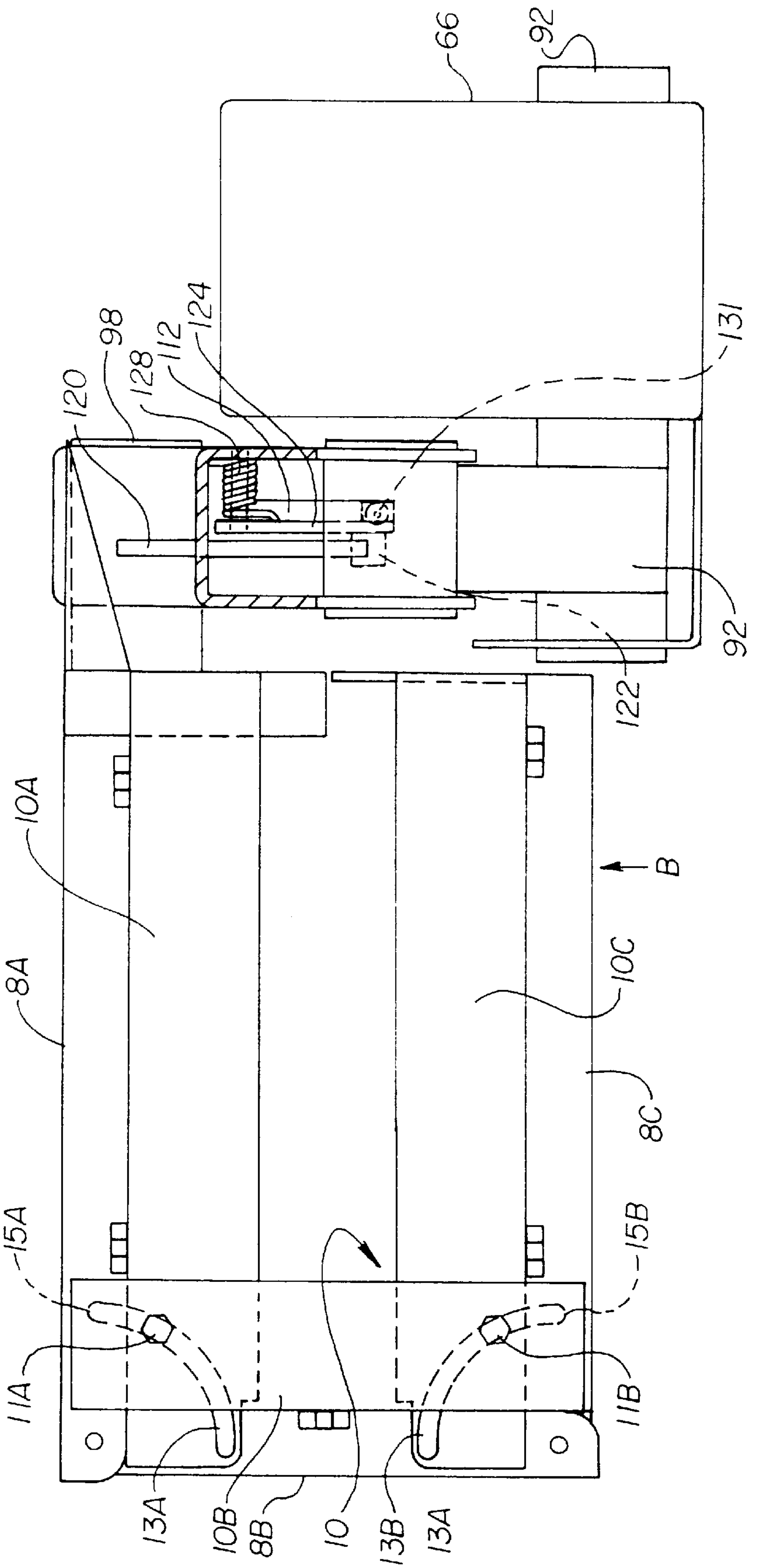
FIG. 12 is a top elevation view of the embodiment of FIG. 1 wherein the platform is in the stowed, folded position.

Referring to FIG. 12, the distal barrier 10 includes barriers 10A, 10B, and 10C pivotally connected to the corresponding sections 8A, 8B, and 8C. Barrier 10B has arcuate slots 15A and 15B at its two ends. Barrier 10A and 10C each has an arcuate slot 13A, 13B such that when the barrier 10 is shut and the platform is folded slots 15A and 15B superimpose on a portion of slot 13A and slot 13B respectively. Any two of the adjacent barriers (e.g. 10A and 10B, 10B and 10C) are movably secured together by a bolt and nut set (11A, 11B) which is slidably confined in corresponding slot combination 13A, 15A and 13B, 15B respectively. The bolt and nut sets 11A, 11B slidably tie the barriers 10A, 10B, 10C together so that the adjacent barriers are essentially in the same plane and pivoting any one of the barriers 10A, 10B, and 10C, as in shutting or opening the barrier 10, will cause the other two barriers to shut or open accordingly.

Figure 11:
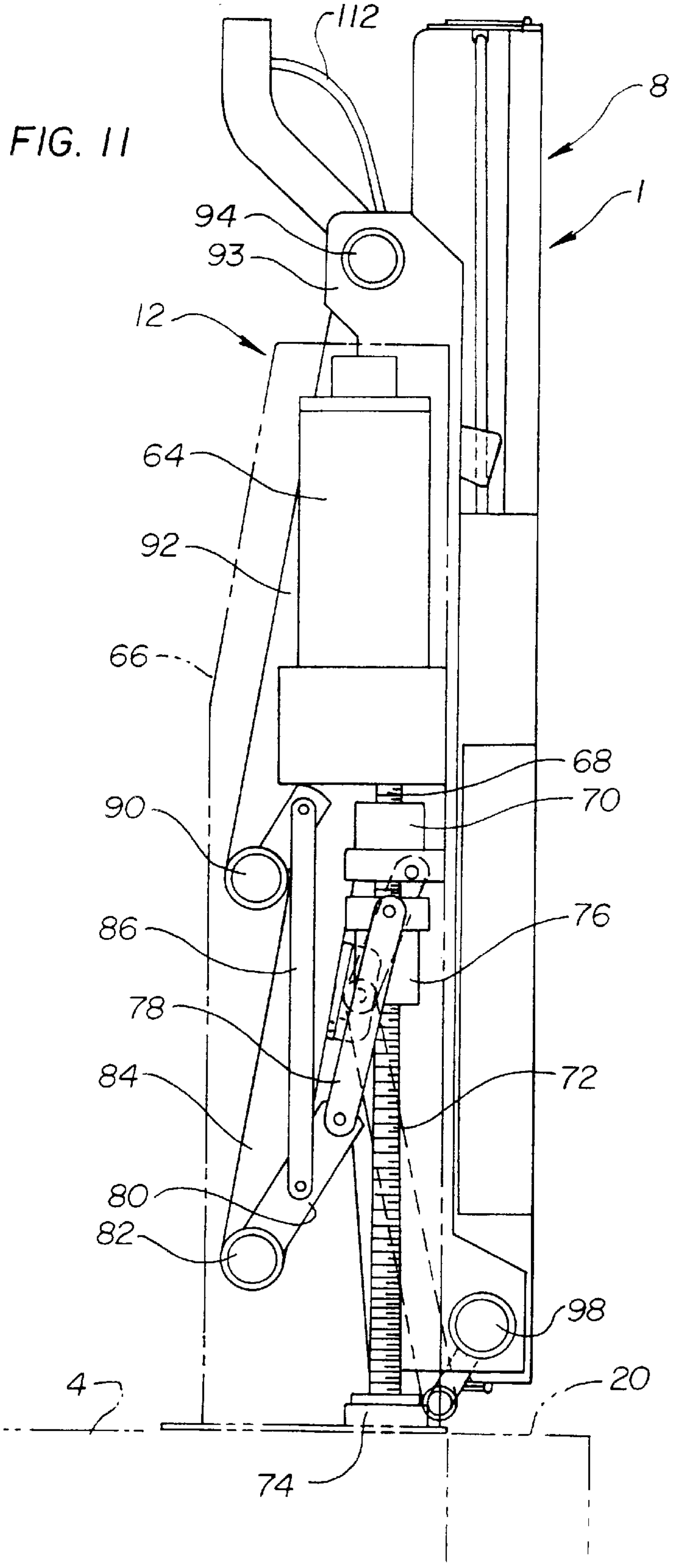
FIG. 11 is a side elevation view of the embodiment of FIG. 1 in the stowed position.

Referring to FIGS. 11 and 12, the chair lift of the present embodiment provides a motorized mechanism for deploying or stowing the platform and for moving the platform vertically from one level of elevation to another level. The motorized mechanism has an up-down motor (preferably a DC motor) 64 rigidly mounted to a housing 66 which in turn is rigidly mounted to the floor 4 of the vehicle. The motor 64 has a shaft 68 connected to a coupler 70 for driving the rotation of a main screw shaft (or up-down screw shaft) 72. The upper end of the main screw shaft 72 is connected to the coupler 70 and the bottom end of the main screw shaft is rotatably connected to a thrust bearing 74 affixed to the floor 4.

Figure 13A:
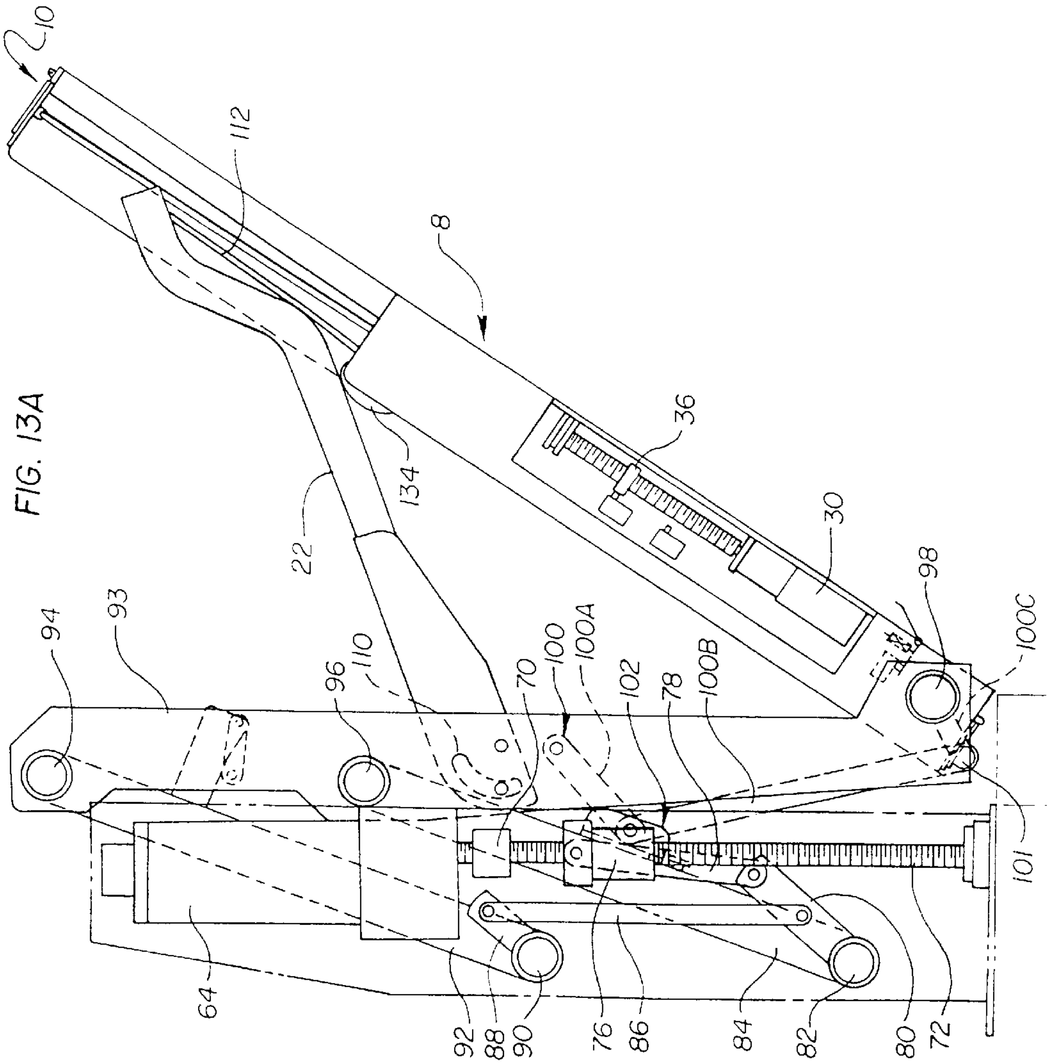
FIG. 13A is a side elevation view of the embodiment of FIG. 1 wherein the platform is partially deployed.

Referring to FIG. 13A, carried by the main screw shaft 72 is a screw nut (preferably a ball screw nut) 76 to which is pivotally connected thrust arm 78. Thrust arm 78 is pivotally connected to lever arm 80 which is rigidly connected to lower main pivot shaft 82 which in turn is rigidly connected to lower pivot arm 84. A toggle link 86 has its lower end pivotally connected to the mid portion of lever arm 80 and its upper end pivotally connected to an ear 88 which in turn is rigidly connected to an upper main pivot shaft 90 rigidly connected to upper pivot arm 92. The upper main pivot shaft 90 and lower main pivot shaft 82 are rotatably connected to the housing 66. The ends of the upper pivot arm 92 and lower pivot arm 84 remote from the toggle link 86 are respectively connected rotatably to a vertical channel beam 93 at vertical channel beam upper pivot shaft 94 and vertical channel beam intermediate pivot shaft 96.

Figure 13B:
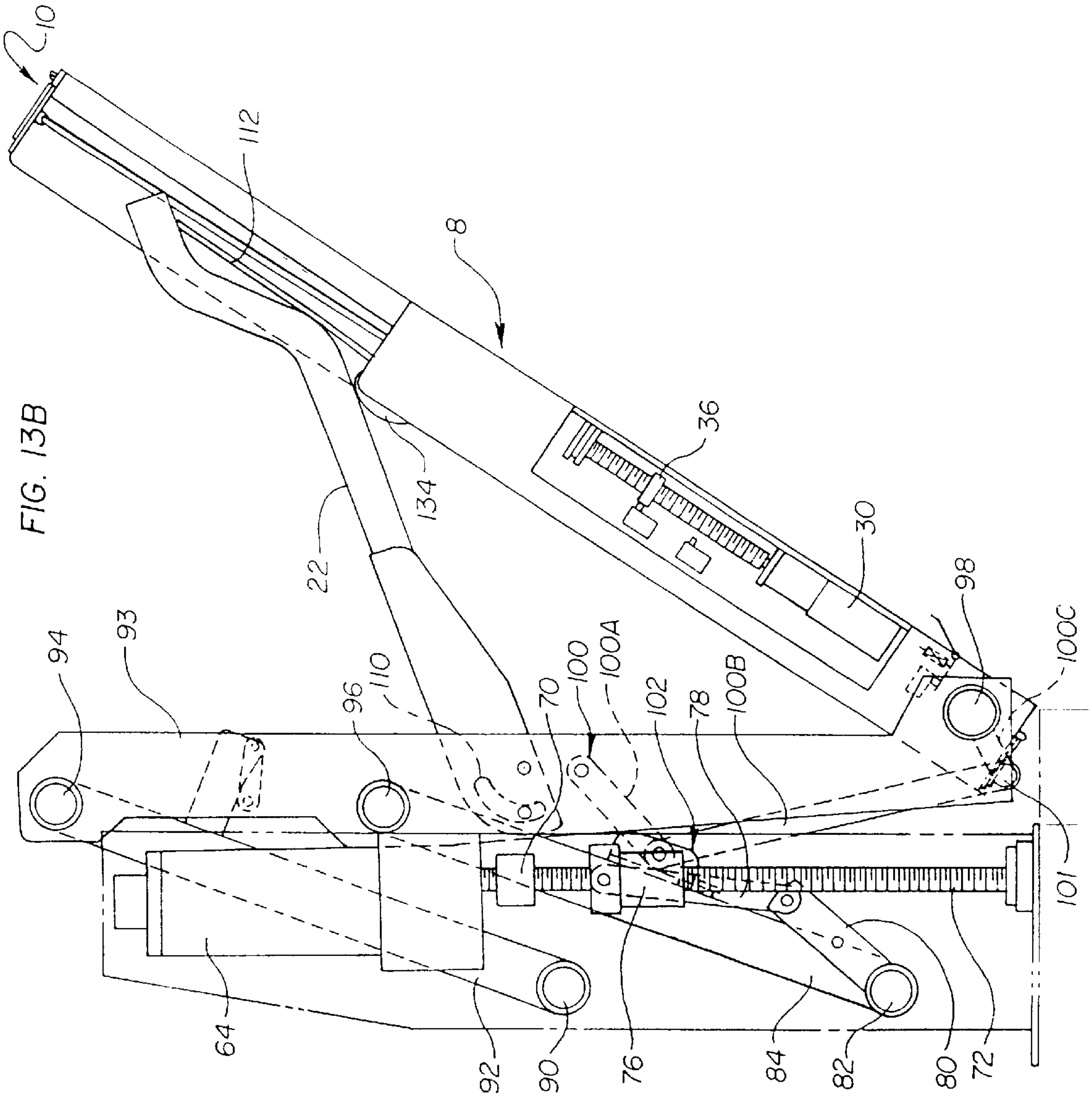
FIG. 13B is a side elevation view of an embodiment similar to FIG. 1 but without the toggle arm linking the two pivot arms.

Alternatively, a powered platform can be made without the toggle arm 86 and the ear 88 (as shown in FIG. 13B). In this case, since the housing 66 maintains the separation of the pivot arms 84 and 92, the configuration of the pivot arms 84, 92, the housing 66, and the vertical channel beam 93 has a generally parallelogram-like appearance. However, the two pivot arms can also have somewhat different lengths, in which case the appearance of the pivot arms, housing, and the vertical channel beam will not be a true parallelogram, but an approximate one.

Figure 14:
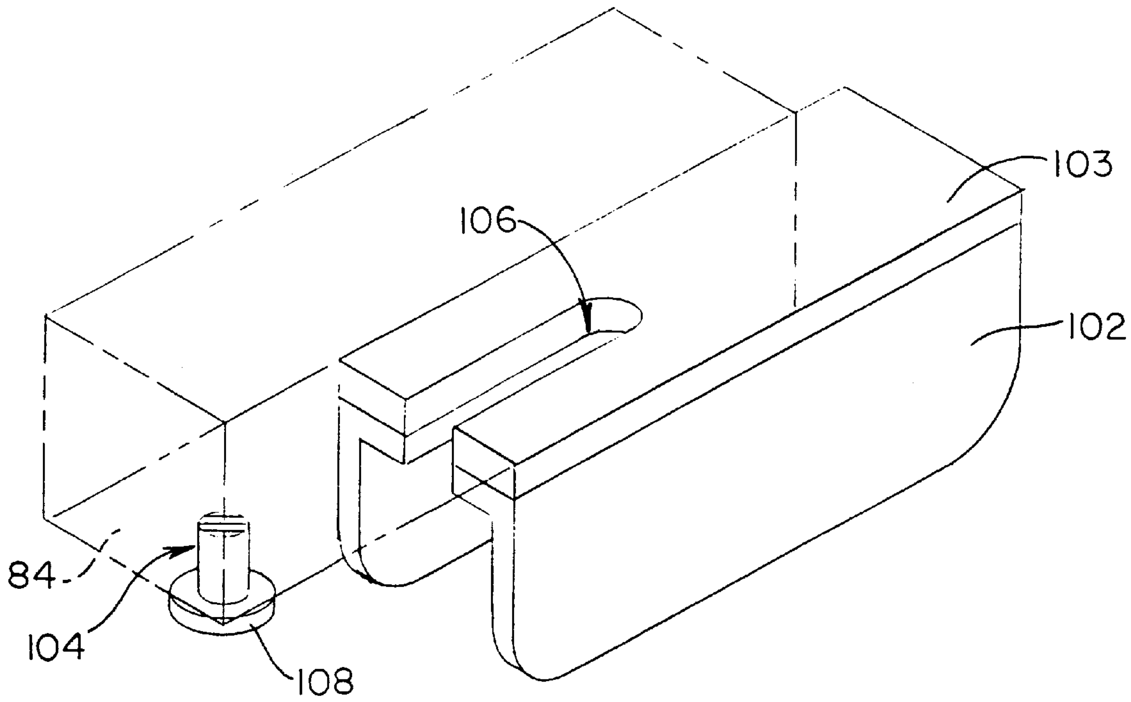
FIG. 14 is an isometric view showing in portion the slide shoe and catch pin arrangement of the embodiment of FIG. 1.

Referring now to FIGS. 11 and 13–14, multi-sectional platform 8 is pivotally connected to vertical channel beam 93 at vertical channel beam lower pivot shaft 98. Pivotal link 100 having pivotally connected arms 100A, 100B, 100C is pivotally connected to vertical channel beam 93 and fixedly connected to vertical channel beam lower pivot shaft 98 so that movement of the link 100 causes pivotal movement of the multi-sectional platform relative to vertical channel beam 93. Referring to FIG. 13A–13B, link arms 100A and 100B are pivotally connected at slide shoe 102 which slidably contacts a side of the lower pivot arm 84 when the platform 8 is being deployed or stowed. Link arm 100C is fixedly connected to vertical channel lower pivot shaft 98 and pivotally connected to link arm 100B at pivot pin 101. Referring to FIG. 14, the slide shoe 102 has a neoprene layer 103 for reducing friction when the slide shoe slides on the lower pivot arm 84. A catch pin 104 having a head 108 is provided on the lower pivot arm 84 to engage the slide shoe 102 in a slot 106 thereof when the multi-sectional platform 8 is approaching a substantially vertical position.

Referring now to FIGS. 11 and 13–19, a hand rail 22 is pivotally mounted to the vertical channel beam 93 at approximately the midsection thereof for pivoting from a substantially vertical position to a substantially horizontal position. An arcuate groove 110 is provided proximate an end of the hand rail for limiting the movement of the hand rail 22. Proximate its other end which is remote from the groove 110, the hand rail 22 connects to a chain 112 whose other end is connected to the screw nut 36 by means of a finger 45 (which is not shown in FIGS. 11 and 13–19). Pivotal link 114 pivoting on pivot pin 116 has one end pivotally connected to distal pivotable barrier 10 and another end connected to a roller 118 riding on a surface of chain 112 facing away from the distal pivotable barrier 10.

A cam finger 120 is rigidly connected to the upper pivot arm 92 and points towards the vertical channel beam 93. A cam follower 122 is located at the end of follower arm 124 which is pivotally connected to vertical channel beam 93. A torsion spring 128 (shown in FIG. 12) biases the follower arm 124 to cause the cam follower 122 to ride on a surface 126 of the cam finger 120. A cable mechanism 130 having a cable 131 and a cable sheath 132 is operatively connected to the cam follower 122 and to a proximal barrier 16.

The linkage driven by motor 64 to move the platform 8 vertically can be referred to as “in-line” because the pivotal components generally moves in parallel planes and parallel arms of the parallelogram configuration external of housing 66 (i.e., pivot arms 92 and 84, toggle link 86) are connected so that they pivot with their center lines in generally the same plane. This is accomplished by using channel beams for constructing some of the arms and support structure (as in vertical channel beam 93 shown in FIG. 12). Furthermore the sliding shoe 102 (except for the neoprene layer) and the link arms 100A, 100B are also made of channel beams arranged so that they, as well link arm 100C, pivot in the same plane as the plane of the vertical channel beam 93. In this way, the arms and beams do not overlap in a side by side configuration with different pivoting planes, thereby making more efficient use of space, which is limited in a vehicle with a powered platform.

Mechanics of Motion of the Platform

Referring to FIGS. 11 and 13, in use, as screw nut 76 is driven downward by the actuation of the motor 64, the downward movement of thrust arm 78 causes lever arm 80 and lower pivot arm 84 to pivot on lower main pivot shaft 82 and causes upper pivot arm 92 to pivot at upper main pivot shaft 90. In this way, vertical channel beam 93 is moved outwardly and downwardly relative to the motor 64. The upper pivot arm 92, the lower pivot arm 84, toggle link 86, and the vertical channel beam 93 form a parallelogram-shaped configuration. As the vertical channel beam 93 moves in an outward and downward direction, the lower portion of the vertical channel beam 93 moves away from the lower pivot arm 84 by pivoting at the vertical channel beam immediate pivot shaft 96. The catch pin 104, fitting in the slot 106, retains the slide shoe 102 by means of head 108 as the vertical channel beam 93 moves outward, thereby causing link arms 100A and 100B to move closer together by pivoting at the slide shoe. Consequently link arms 100B and 100C pivot at their pivot joint 101 and move their respective other ends farther apart, thereby causing the platform 8 to pivot at vertical channel lower pivot shaft 98 and start deploying in a drawbridge fashion.

Subsequently, the slide shoe 102 slides on lower pivot arm 84 towards vertical channel beam intermediate pivot shaft 96. This in turn causes link arms 100A, 100B, 100C to move upward relative to vertical channel beam 93, thereby causing the multi-sectional platform 8 to further pivot at vertical channel beam lower pivot shaft 98, resulting in the multi-sectional platform 8 descending pivotally in a drawbridge fashion. Gravity causes hand rail 22 to ride and slide on a neoprene piece 134 which is affixed to the side rail 32 of section 8A of the platform.

Figure 15:
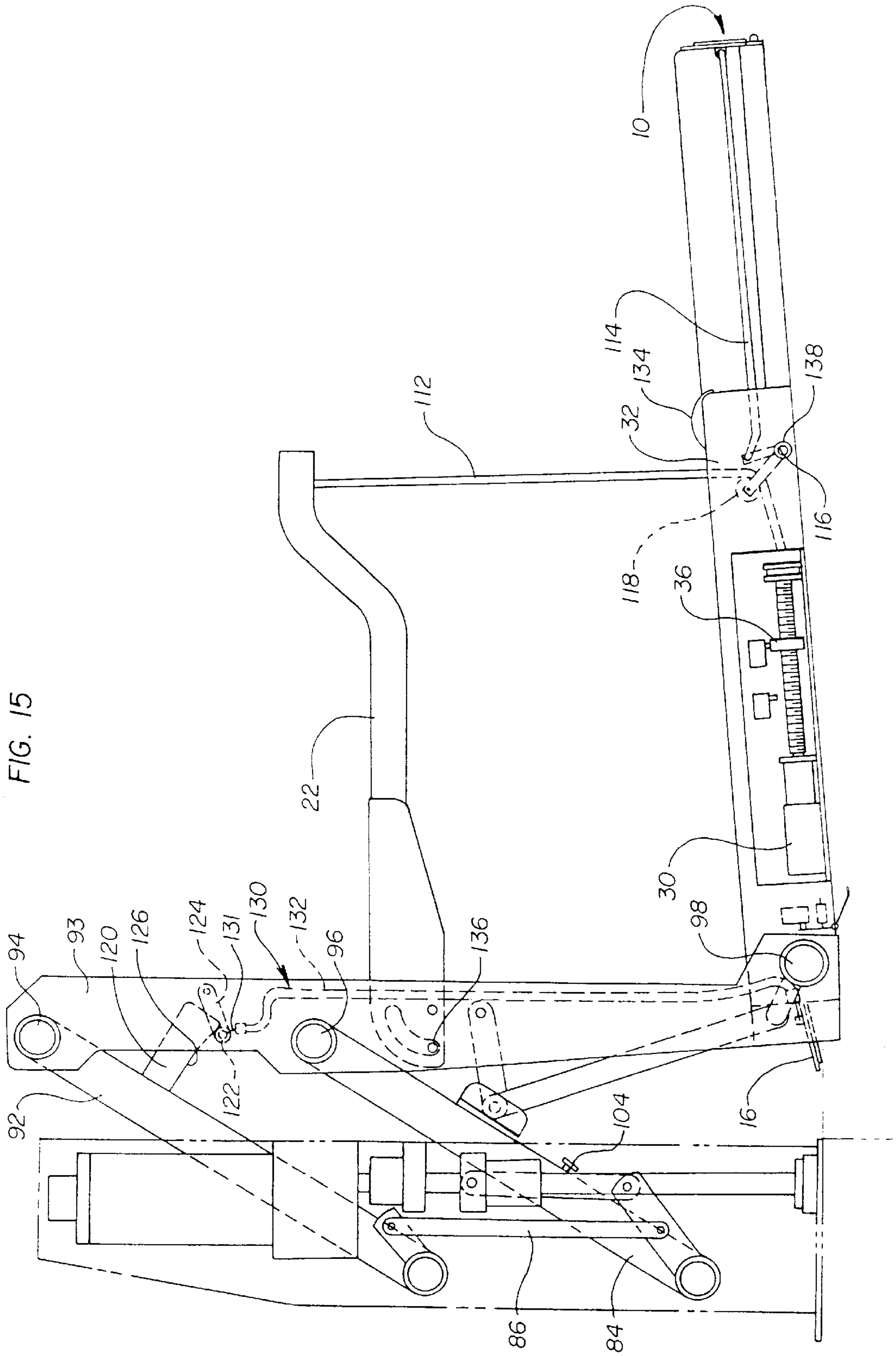
FIG. 15 is a side elevation view of the embodiment of FIG. 1 showing the platform in a substantially horizontal position.
Figure 16:
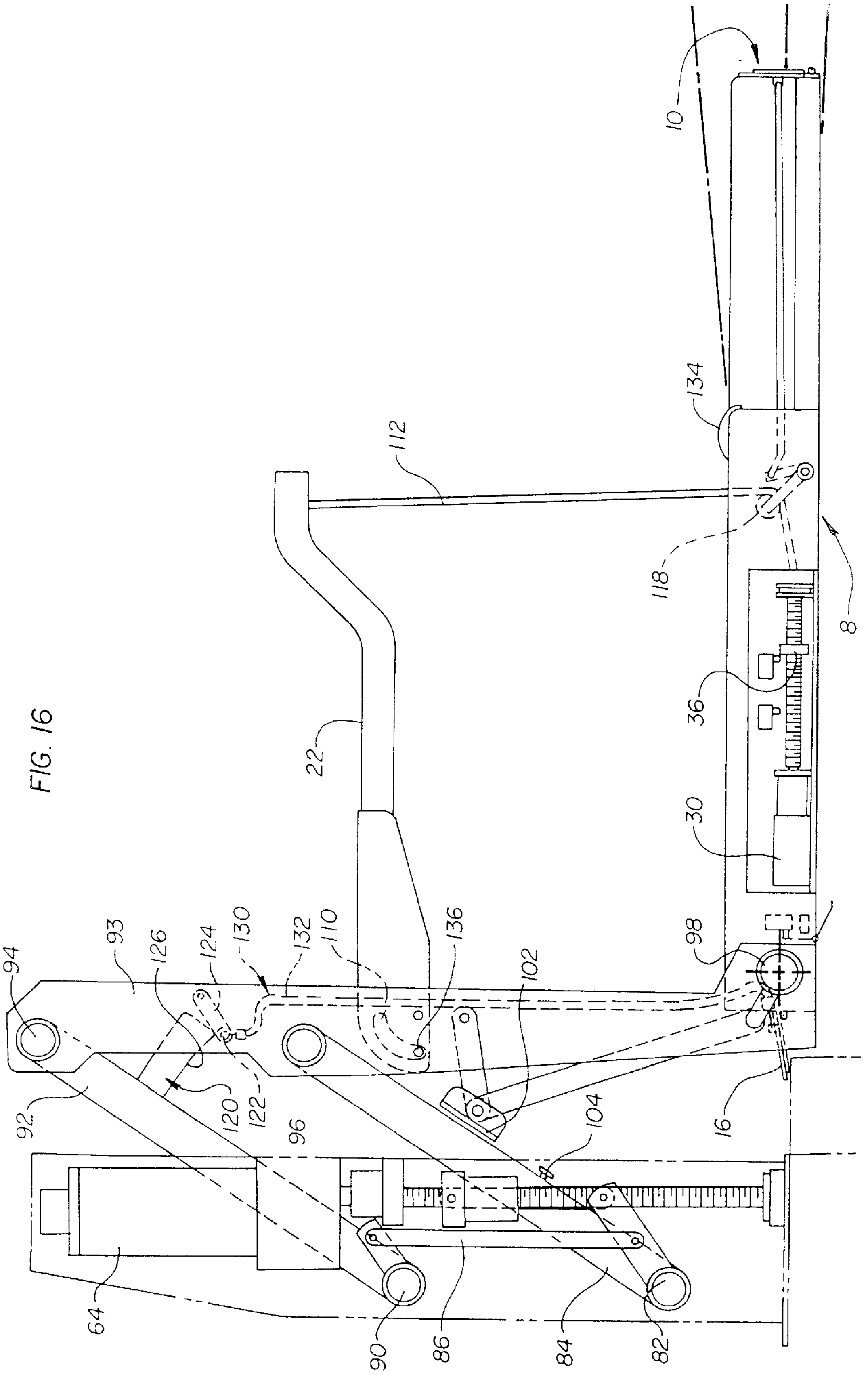
FIG. 16 is a side elevation view of the embodiment of FIG. 1 showing the platform being leveled to a desired horizontal position.

Referring to FIGS. 15 and 16, as the multi-sectional platform 8 is further lowered by the actuation of the motor 64, the stop pin 136 moves along groove 110 of the hand rail 22 until eventually stop pin 136 engages the hand rail at the end of the groove to achieve and maintain a substantially horizontal position. At the same time, the pivotal motion of vertical channel beam 93 relative to the upper pivot arms 92 causes the cam follower 122 to ride along surface 126 of the cam finger 120. The arrangement of the cam finger 120, the cam follower 122, the follower arm 124, and the cable mechanism 130 is such that when the multi-sectional platform approaches a position that is substantially horizontal, the cam follower pushes the cable 131 downward to slide in the cable sheath 132 to cause the proximal barrier 16 to be lowered into an "open" position. At this point, the proximal end of the platform 8 is at a level of elevation proximate the level of the floor of the vehicle and the platform is substantially horizontal.

At this time, the slide shoe 102 has slid to a position in which it no longer engages catch pin 104 and the further pivotal movement of the vertical channel beam 93 relative to the pivot arms 84, 92 will cause the slide shoe to detach from the lower pivot arm 84. Thereafter, the multi-sectional platform can be leveled from the substantially horizontal position to a desired horizontal position so that a wheelchair can be safely transported between different levels of elevation. For leveling, the platform can be adjusted through an angle within the range of about 5 degrees to suit the desire of the user.

When the multi-sectional platform 8 is being deployed in a substantially horizontal position, because the hand rail 22 is prevented from further downward movement by catch pin 136, the weight of the platform causes roller 118 to apply tension to the chain 112. Leveling of the multi-sectional platform 8 can be accomplished by operating motor 30 to move screw nut 36 towards or away from distal barrier 10.

Figure 17:
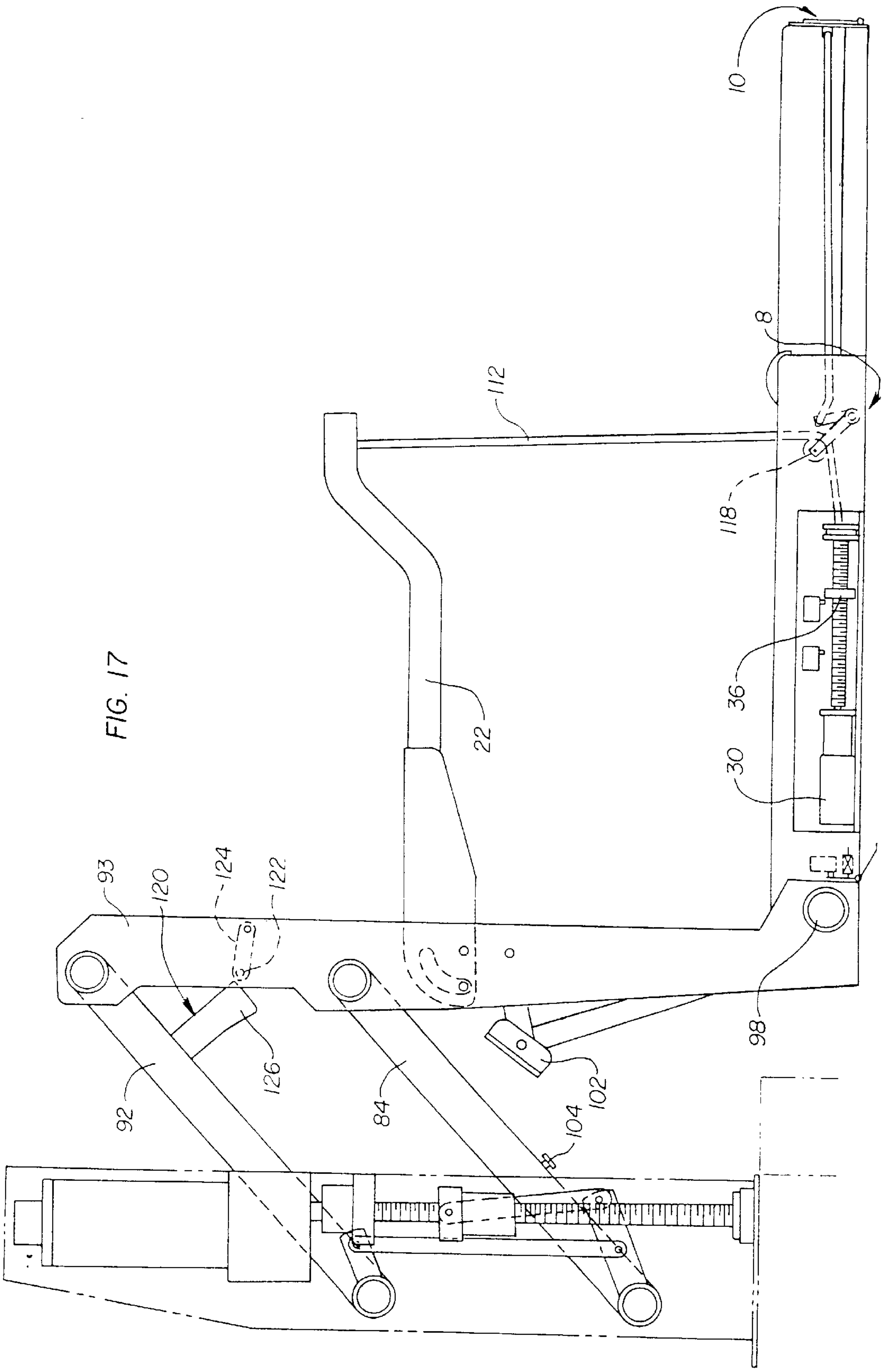
FIG. 17 is a side elevation view of the embodiment of FIG. I showing the platform being lowered to the ground.

Referring to FIGS. 16 and 17, the up-down motor 64 can be actuated to further lower the vertical channel beam 93, and therefore the multi-sectional platform 8 from the floor level of the vehicle. Cam follower 122 then disengages from cam finger 120, allowing the torsion spring 128 to cause the cable mechanism 130 to shut the proximal barrier 16 as the platform is being lowered to the ground from the elevation of the floor level of the vehicle.

Figure 18:
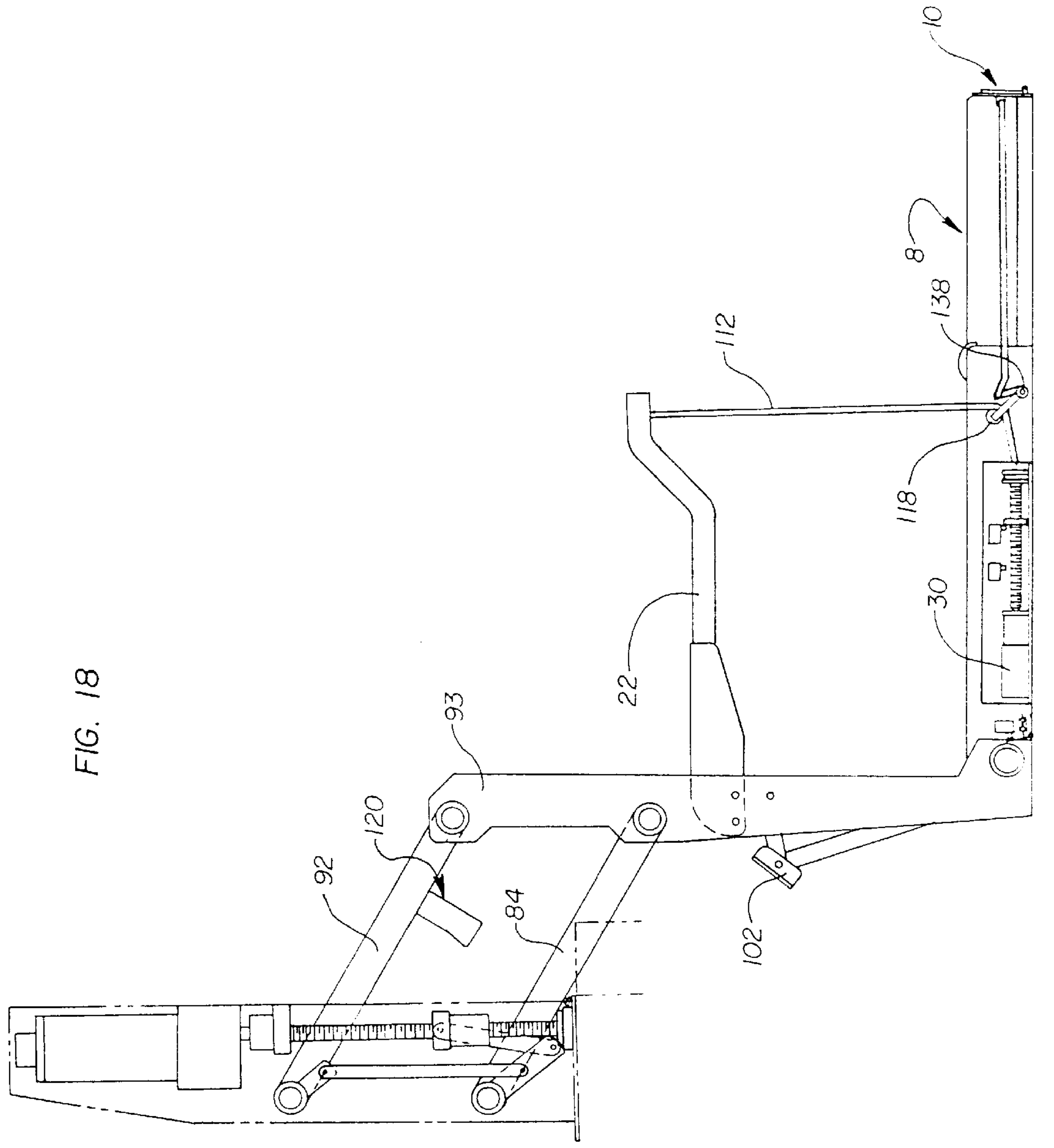
FIG. 18 is a side elevation view of the embodiment of FIG. 1 showing the platform proximate the ground.
Figure 19:
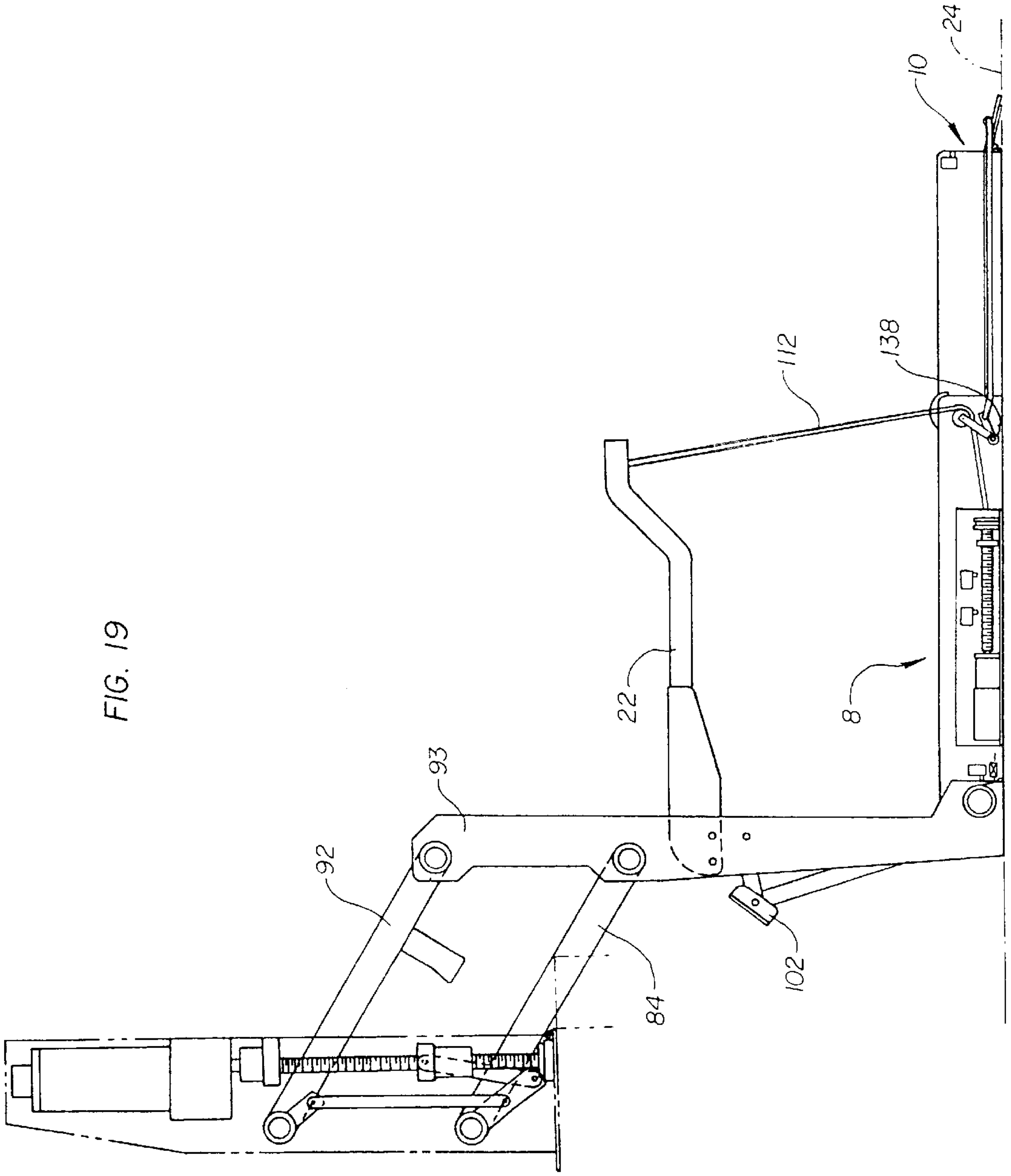
FIG. 19 is a side elevation view of the embodiment of FIG. 1 showing the platform resting on the ground.

Referring to FIGS. 18 and 19, after the multi-sectional platform 8 has been lowered to the ground, the fold-unfold motor 30 can be operated to move screw nut 36 towards the distal barrier 10 to decrease the tension of the chain 112. A spring actuated biasing mechanism (such as a torsion spring) 138 causes the pivotal link 114 to move towards and lower (i.e., open) the distal barrier 10. The wheelchair can then be wheeled from the platform 8. To transport a wheelchair from the ground to the vehicle involves movement reciprocal of that described hereinabove. The stowing mechanics is generally reciprocal of the deploying mechanics.

Figure 20:
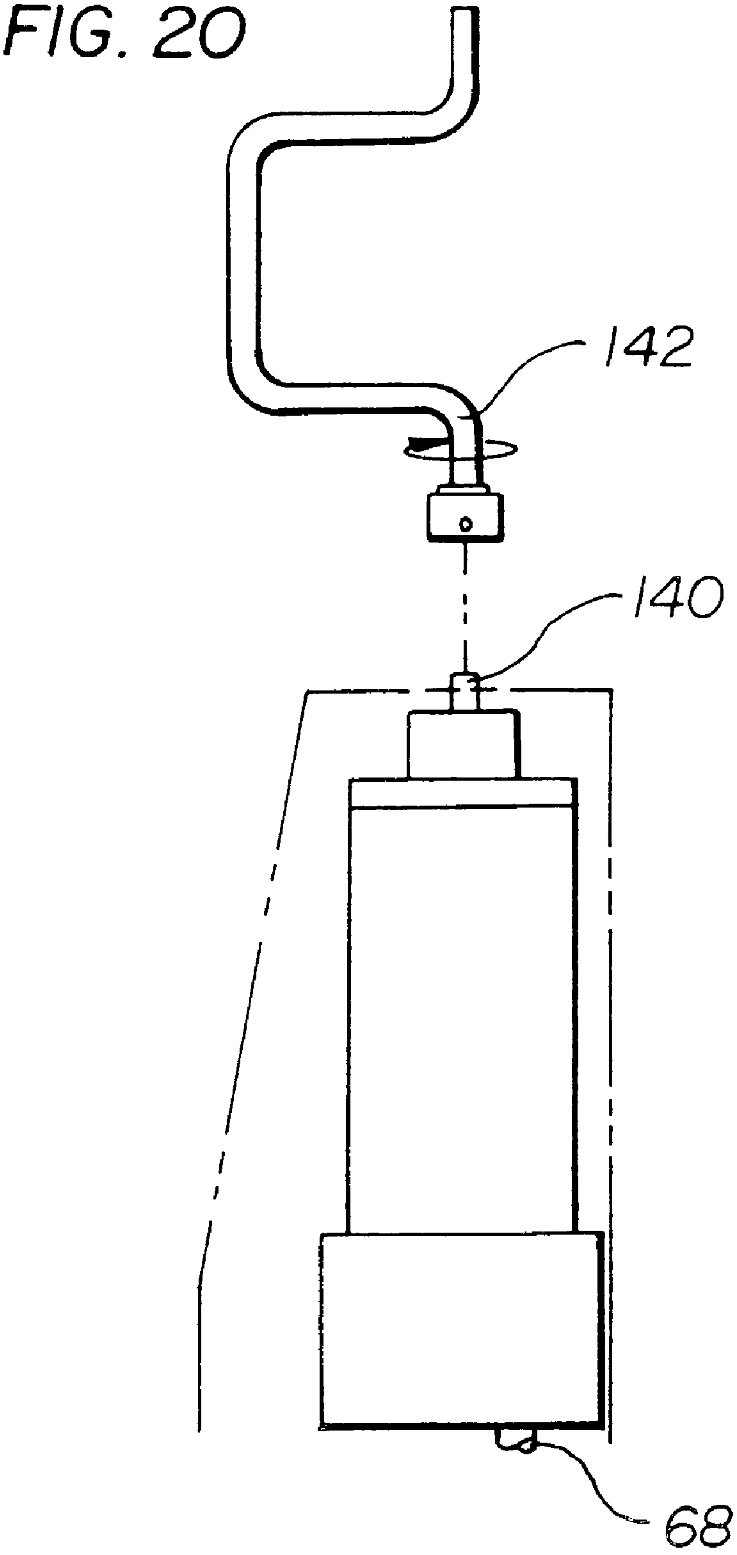
FIG. 20 is a schematic view showing in portion a manual mechanism for turning the motor to raise and lower the platform.

Referring to FIG. 20, the motor 64 has a means, such as a bolt 140 operatively connected to the drive shaft 68 of motor 64 such that the drive shaft can be manually turned by coupling and turning a crank 142 to the bolt. This can be used, for example, to raise or lower the platform when power has been cut off to the motor 64.

Control mechanism

Figure 21:
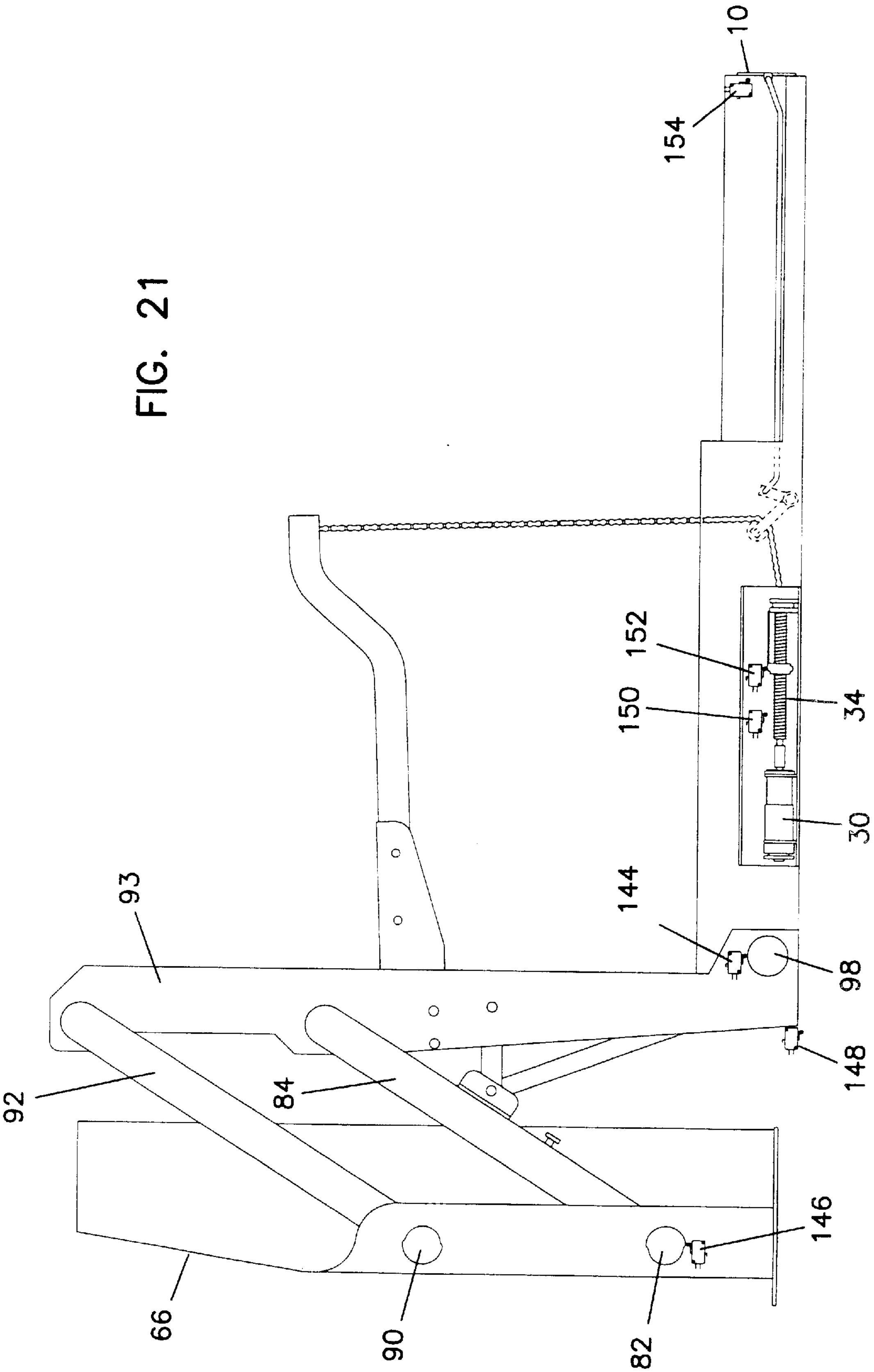
FIG. 21 is a side elevation view showing the position of limit switches in the embodiment of FIG. 1.

Referring to FIG. 21, limit switches are provided to limit the operation of the motors and control the transition from one phase of operation of the powered platform to another phase. Up-limit switch 144 is located proximate and actuated by the lower pivot shaft 98 to limit the pivotal movement of upper pivot arm 92 in the stowing operation. Floor limit switch 146 is located proximate and actuated by the lower main pivot shaft 82. Down-stop limit switch 148 is positioned at the lower end of vertical channel beam 93 proximate the bottom of the multi-sectional platform 8 to limit the downward action caused by the up-down motor. It is actuated by compression when contacting the ground. Fold-limit switch 150 and unfold-limit switch 152 are positioned proximate the platform shaft 34. The fold-limit switch 150 is nearer to the motor 30 than is the unfold-limit switch 152. A barrier stow switch 154 is located on a side barrier 26B (not shown in FIG. 21 but shown in FIG. 4) proximate and actuated by the distal barrier 10.

Figure 22:
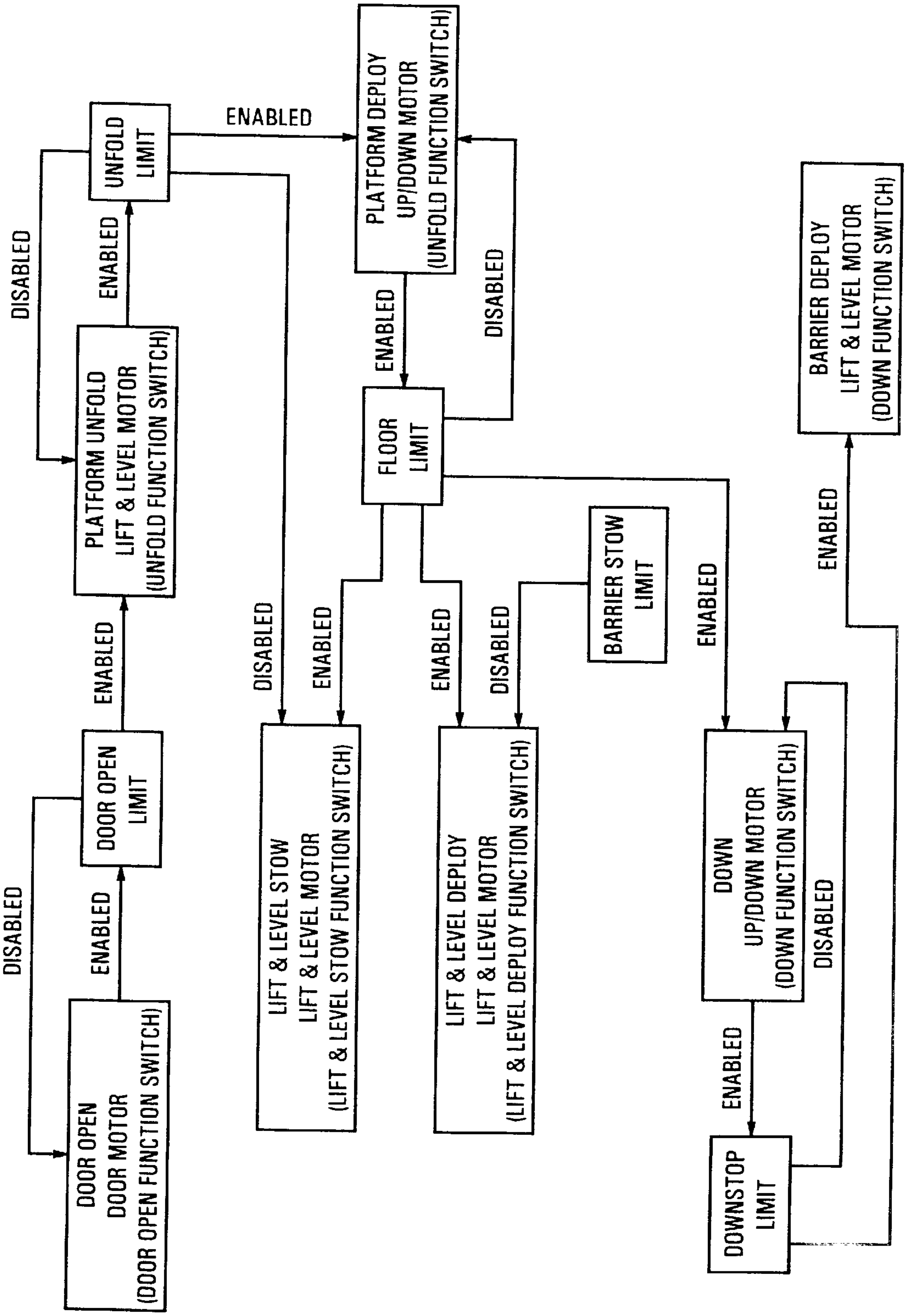
FIG. 22 is a flow diagram showing the relation of the limit switches to the operation of the collapsible powered platform of the embodiment of FIG. 1 in deploying and lowering the platform to the ground.

Referring to FIG. 21 and 22 (which shows a flow chart of an illustrative scheme for deploying the platform and transporting a wheelchair from the vehicle to the ground using the embodiment of FIG. 21), to use the platform for transportation to ground, a user first enables a door open function switch. The door or doors of the vehicle will open by a door motor and enables a door open limit switch (not shown in the drawing). The door open limit switch will disable the door open function and allow the platform unfold function switch to be operable by the user. The platform unfold function switch is then enabled by the user. The platform will unfold by the fold-unfold motor 30 and the unfold limit switch 152 will enable via screw nut 36. The unfold limit switch 152 will disable the unfold function and allow the platform deploy function switch to be operable by the user. The platform deploy function switch is then enabled by the user, which causes the platform to be deploy and descend by the up-down motor 64. When the platform approaches a substantially horizontal position proximate the floor level of the vehicle, the floor limit switch 146 will enable. The floor limit switch 146 will disable the platform deploy function and enables the lift & level deploy-stow function switch to be operable by the user. The fold-unfold motor 30 (which is the same as and is also referred to as the lift & level deploy-stow motor for leveling operation) can be operated by the user by using a lift & level deploy-stow function switch. The floor level limit switch will allow lift & level stow (or "stow"), lift & level deploy (or "deploy") and the lift-down function switch is to be operable by the operator. The fold-unfold motor 30, which can be used for leveling the platform, can be enabled to level the platform using the lift & level deploy function switch if the floor level limit switch and barrier stow limit switches are enabled. The fold-unfold motor may be enabled to level the platform using the lift & level stow function switch if the floor level limit switch and the unfold limit switches are enabled. The floor limit switch enables the down function switch to be operable by the user. Operating the down switch will cause the platform 8 to go down and enable the down-stop limit switch 148. The down-stop switch 148 will disable the down function and allow the distal pivotable barrier 10 to be deployed by the operation of the fold-unfold motor 30 using the down function switch.

Figure 23:
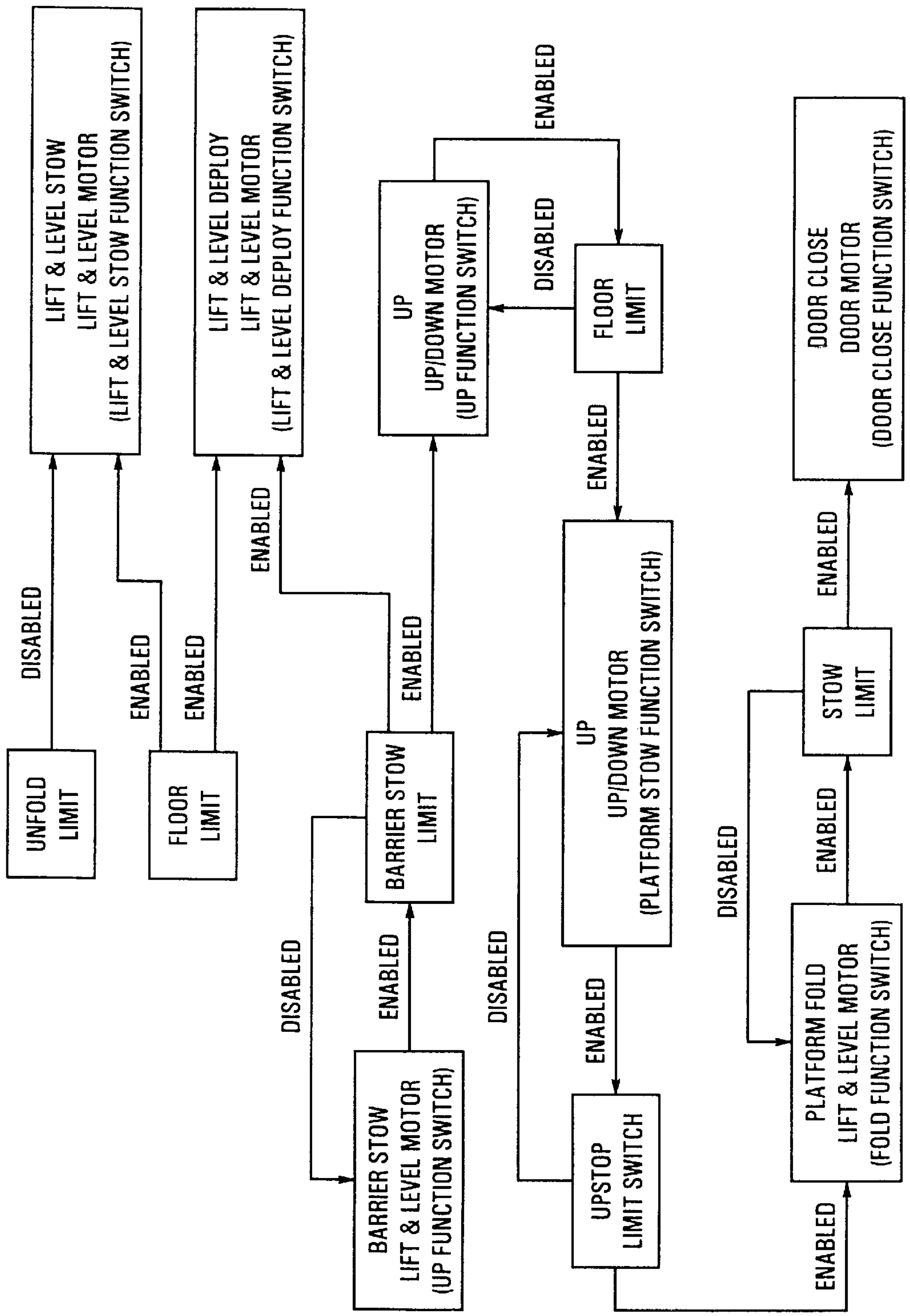
FIG. 23 is a flow diagram showing the relation of the limit switches to the operation of the collapsible, powered platform of the embodiment of FIG. 1 in raising and stowing the platform.
Figure 24:
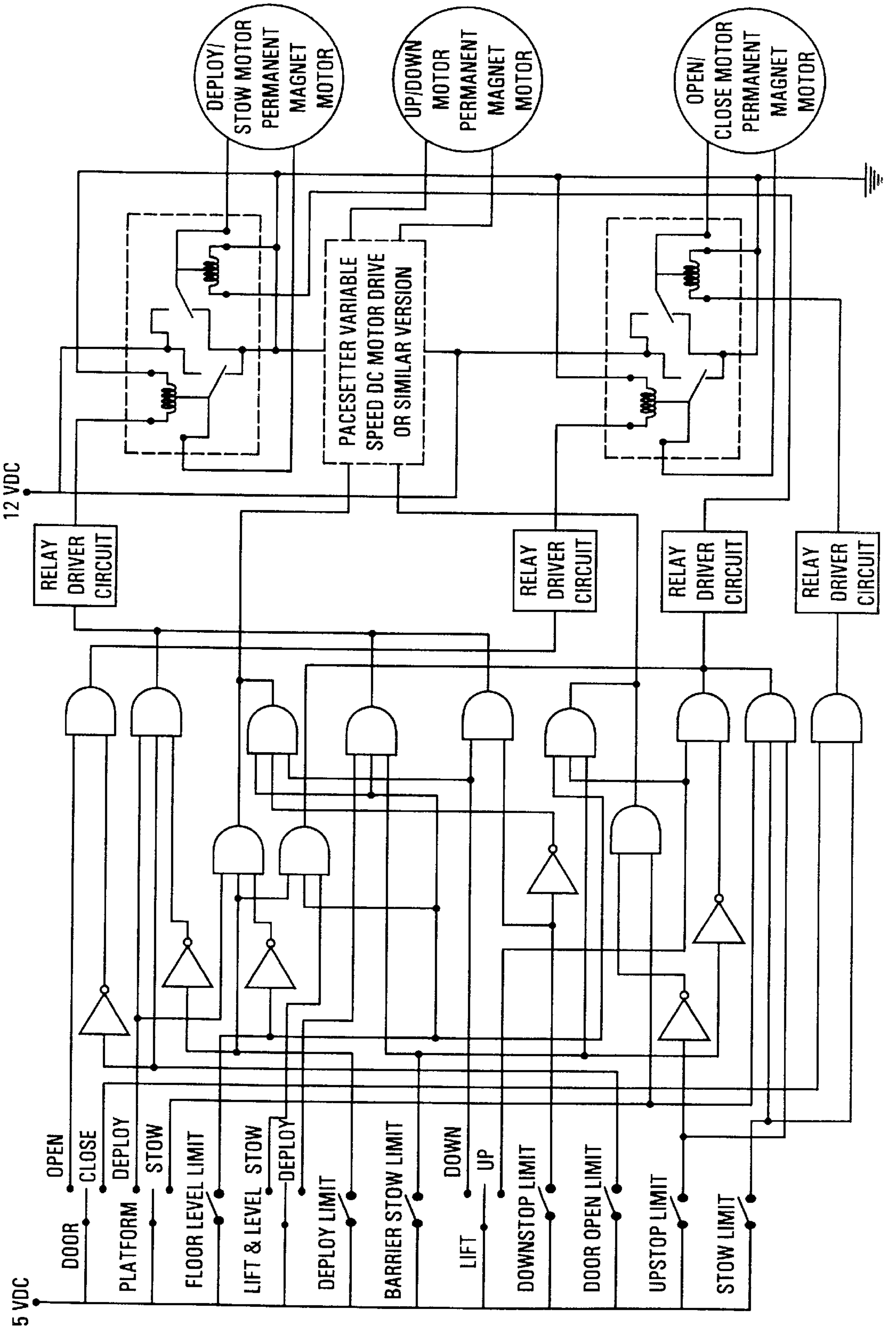
FIG. 24 is a schematic diagram showing the logic in operating the motors according to the flow diagrams of FIG. 22 and FIG. 23.

Referring to FIGS. 21 and 23, which illustrates how the powered platform can be stowed, the up function switch is enabled by the user. The distal barrier 10 will be stowed by the lift & level deploy-stow motor (which is the same as the fold-unfold motor) and enable the barrier stow limit 154. The barrier stow limit 154 will switch the output from the barrier stow output to the lift up output. The barrier stow limit will also allow the lift & level stow and lift & level deploy function switches to be operable by the user. The lift & level deploy-stow motor (i.e., the fold-unfold motor) 30 may be operated (enabled) by the user to level the platform 8 using the lift & level stow function switch if the floor limit switch and the unfold limit switch 152 are enabled. The lift & level deploy-stow motor 30 may be enabled to level the platform to a desired horizontal position from a substantially horizontal position using the lift & level deploy function switch by the user if the floor limit switch 146 and the barrier stow limit switch are enabled. As the up function switch is further activated by the user, the platform 8 will be actuated by the up-down motor 64 and the floor limit switch 146 will disable. The floor limit switch 146 will disable the up function. The floor limit switch 146 will also allow the platform stow function switch to be operable by the user. As the platform stow function switch is activated by the user, the platform will stow by the up-down motor 64 and enable the up-stop limit switch 144. The up-stop limit switch 144 will disable the platform stow function switch and will allow the platform fold function to be operable by the user. As the platform fold function switch is operated, the platform will fold by the lift & level motor (i.e., the fold-unfold motor 30) and the fold limit switch 150 will enable. The fold limit switch 150 will disable the platform fold function switch and allow the door close function switch to be operable by the user. The door close function switch, when operated, will close the door by the operation of a door-close motor. The logic of the control of the above described movement of the powered platform according to flow diagrams FIG. 22 and FIG. 23 is shown in FIG. 24.

Figure 25:
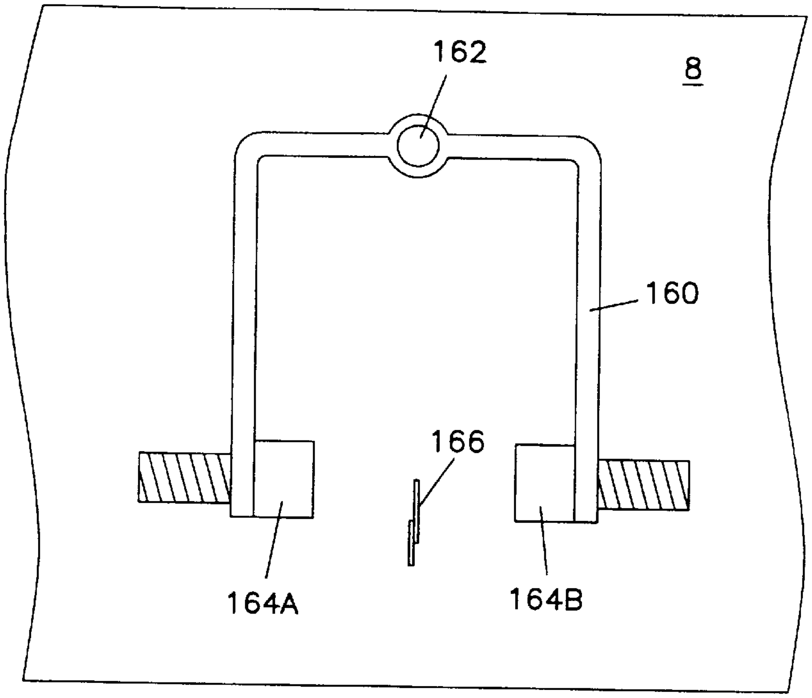
FIG. 25 shows an embodiment of a device for automatic control of leveling of the embodiment of FIG. 1.
Figure 26:
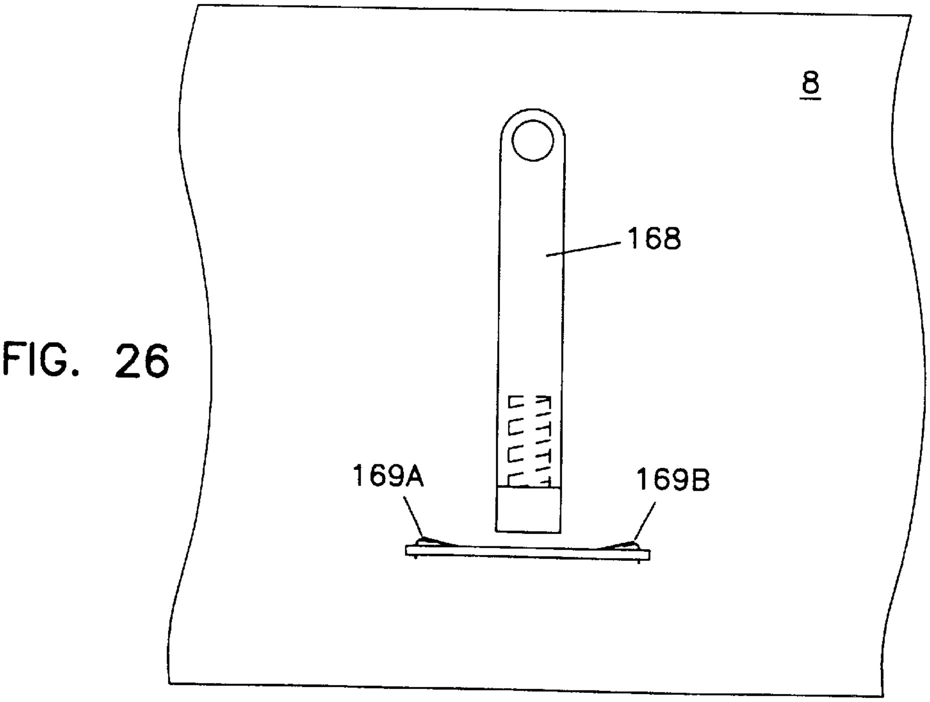
FIG. 26 is an elevation view of an alternative device for automatically controlling the leveling of the platform of the embodiment of FIG. 1.

Preferably, the embodiment of FIGS. 11 and 12 can be leveled automatically. Referring to FIGS. 25 and 26, the automatic leveling control mechanism preferably comprise a generally U-shaped support pivotally mounted to the multi-sectional platform 8 (preferably on a side edge of section 8A) at a pivot point 162. As the platform 8 is being leveled by pivoting in a drawbridge fashion, gravity causes the U-shape support 160 to pivot at pivot point 162. The U-shaped support 160 has magnetic transducers 164A, 164B for detecting the position of the platform relative to the horizontal orientation. An electrical signal generated by the transducers 164A, 164B relative to reference plate 166 affixed on the platform caused by the relative position of the U-shaped support to the platform enables automatic control of the leveling by a computer or microprocessor.

FIG. 26 shows another embodiment which is applicable for application in automatically controlling the leveling movement. An actuator arm 168 is pivotally mounted to the multi-sectional platform 8 (e.g., a side edge of section 8A). Gravity causes the actuator arm to pivot and point downwards. A magnet at the downward end of the actuator arm interacts with two Hall effect transducers 169A, 169B rigidly mounted to the platform so that electric signals transmitted by the transducers, depending on the orientation of the transducers relative to the actuator arm 168, enables automatic control of the leveling movement by a computer or microprocessor.

Second Embodiment

Figure 27A:
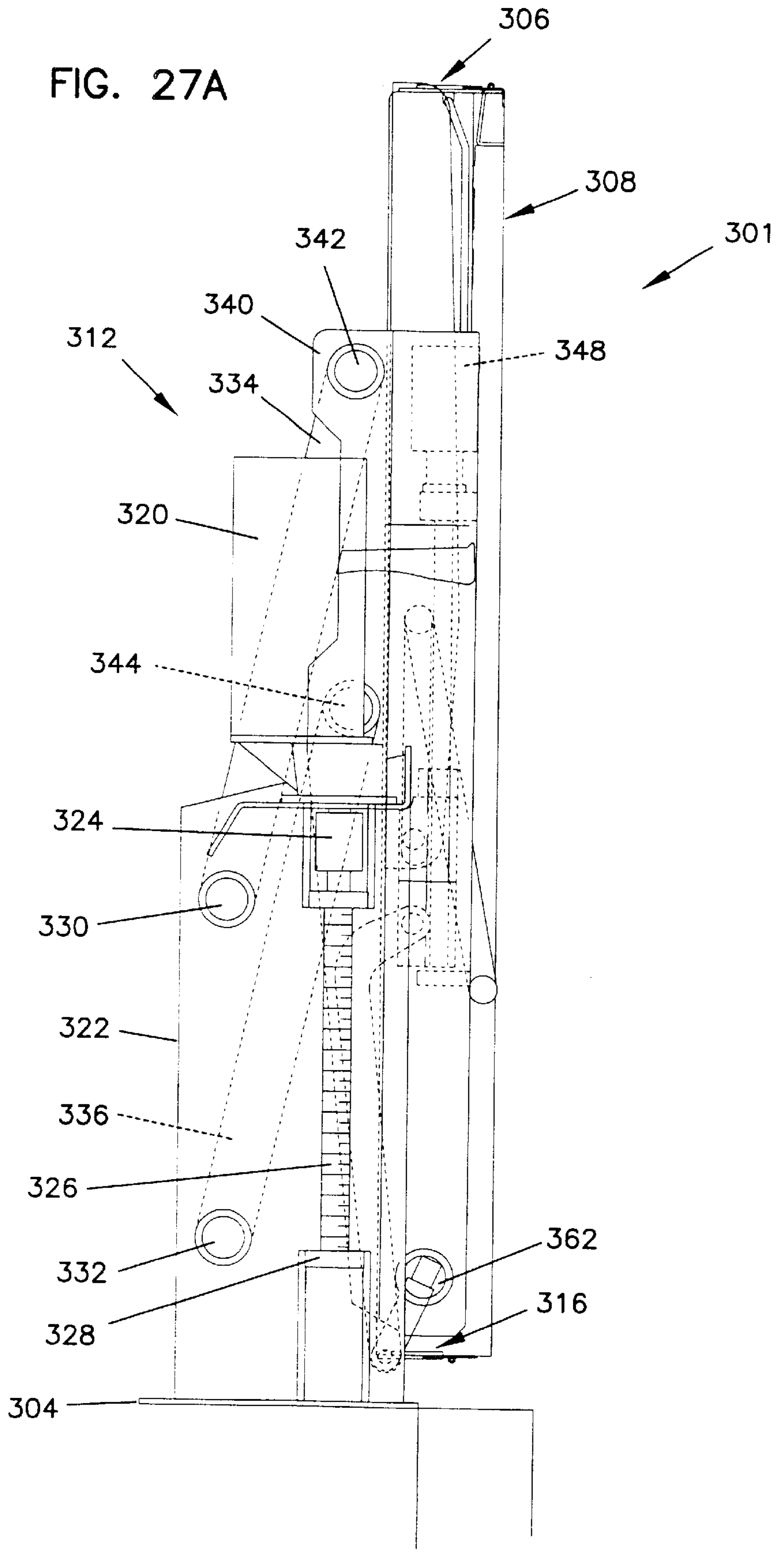
FIG. 27A is a side elevation view of another embodiment of a wheelchair lift according to the present invention.
Figure 27B:
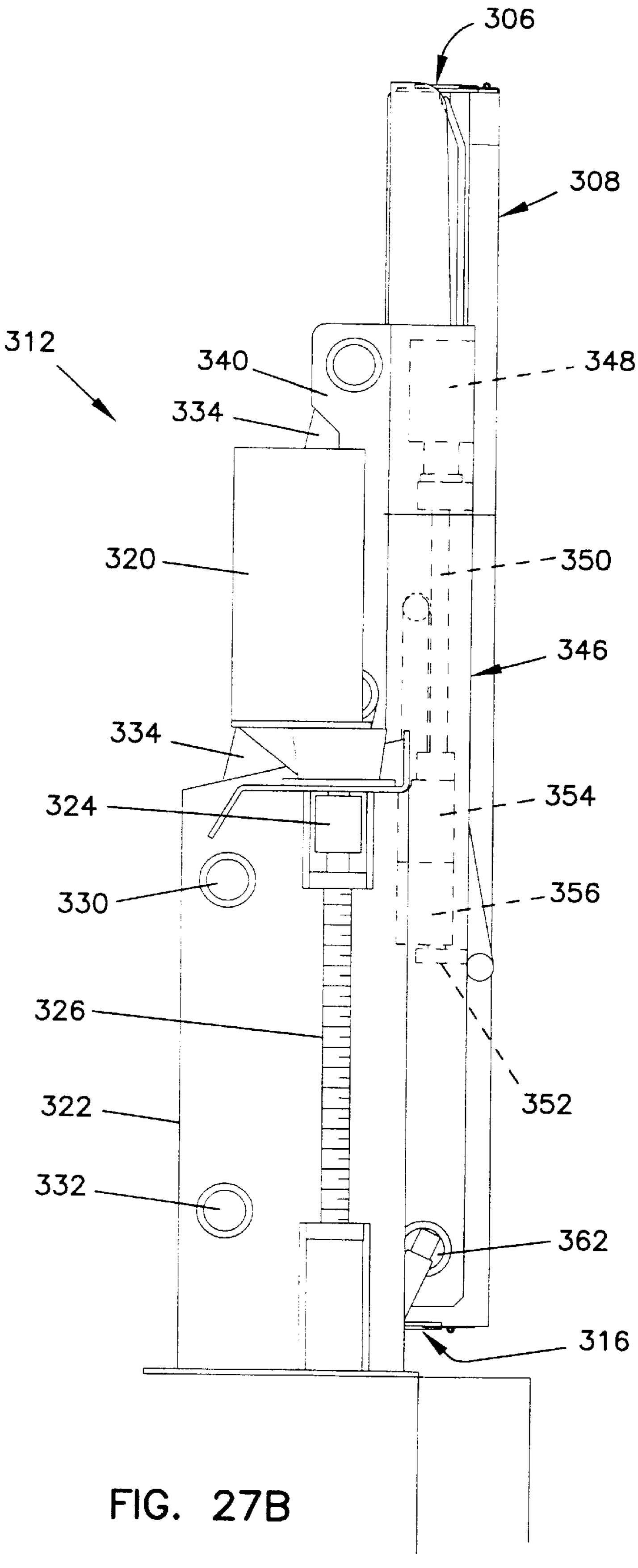
FIG. 27B is a side elevation view of the embodiment of FIG. 27A with some parts not shown for clarity.
Figure 29:
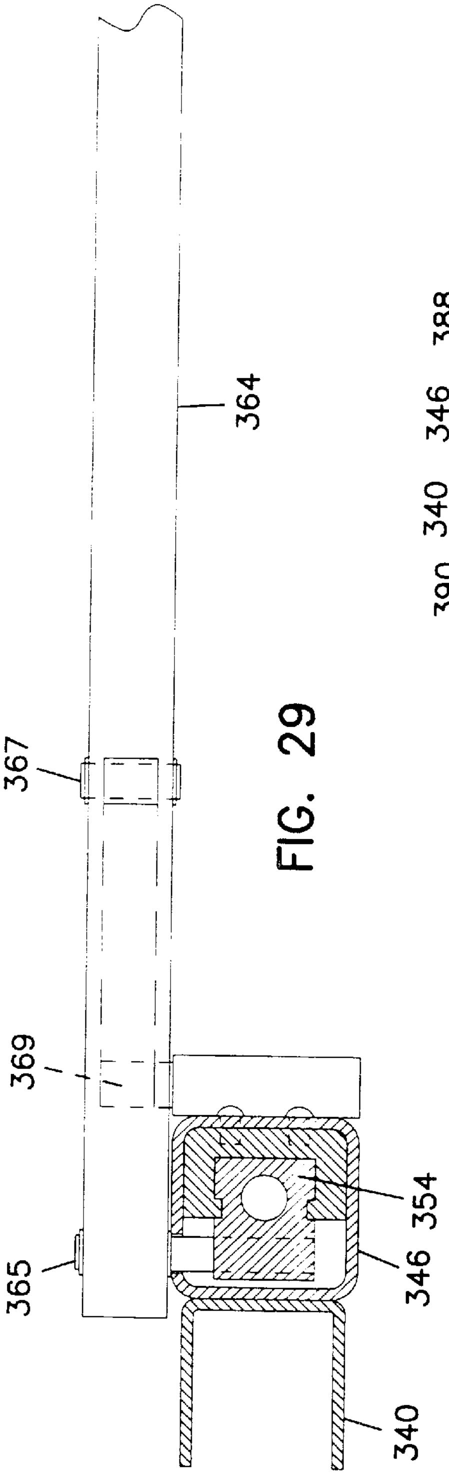
FIG. 29 is a top elevation view of a portion of the embodiment of FIG. 27A showing the mechanical link to the motor for deploying and stowing the platform.
Figure 28:
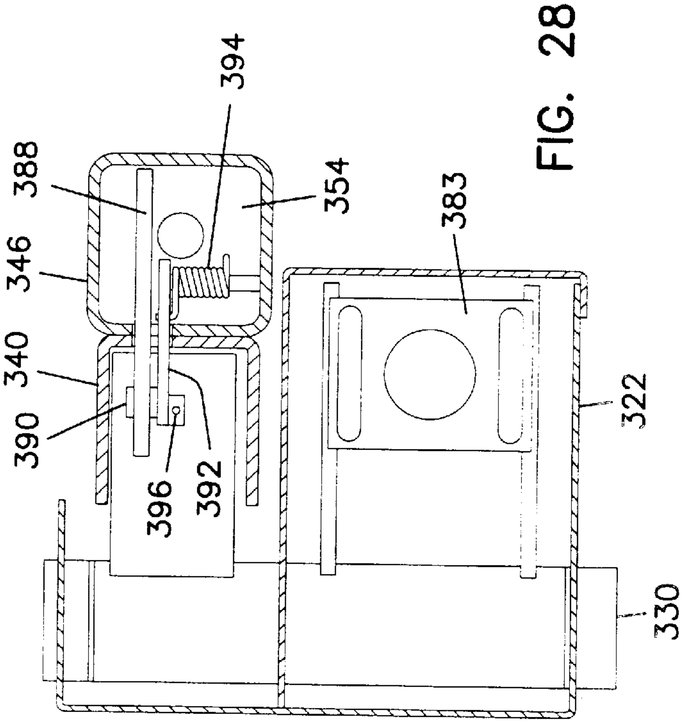
FIG. 28 is a top elevation view in portion of the embodiment of FIG. 27A showing the mechanical link to the up-down motor.

Referring to the embodiment of FIGS. 27A and 27B, the power platform 301 has a multi-sectional platform 308 and a motorized means 312 for driving the movement of the platform. The multi-sectional platform 308 has distal pivotable barrier 310 and proximal pivotable barrier 316 at opposite edges. An up-down motor 320 (preferably a DC motor) is rigidly mounted to a housing 322 which is rigidly mounted to a floor 304 of a vehicle (not shown). The up-down motor 320 is coupled by means of a coupler 324 to a main screw shaft 326 which is rotatably mounted to a thrust bearing 328 affixed to the floor 304 of the vehicle. The housing 322 has an upper pivot shaft 330 and a lower pivot shaft 332 connected respectively to upper pivot arm 334 and lower pivot arm 336 which in turn are pivotally connected to vertical channel beam 340 by means of upper vertical channel beam pivot shaft 342 and lower vertical channel beam pivot shaft 344.

Vertical channel beam 340 is rigidly and parallelly connected to an elongated movable housing 346 to which deploying motor (preferably a DC motor) 348 is rigidly mounted. The deploying motor 348 (which also functions for leveling and shutting-opening the distal barrier) drives a screw shaft 350 which is rotatably mounted on a thrust bearing 352 mounted to the movable housing 346 such that the screw shaft 350 is parallel to the vertical channel beam 340 and the movable housing 346. A screw nut (preferably a ball screw nut) 354 is threadedly carried by the screw shaft 350 so that rotation of the screw shaft causes the screw nut to move vertically along the screw shaft. The screw shaft 350 also slidably extends through a block 356 which is proximate and below the screw nut 354. A neoprene liner 360 is provided on the internal surface of the movable housing 346 to snugly support and allow the screw nut 354 and the block 356 to slide thereon. The multi-sectional platform 308 is pivotally connected to the movable housing proximate the lower end thereof at platform pivotal shaft 362.

Referring to FIGS. 28–30A, a hand rail 364 is supported pivotally at one end by a pivot shaft 365 on the screw nut 354 and at a pivot shaft 367 at an intermediate location towards the other end by fulcrum arm 366 which is pivotally mounted on a pivot shaft 369 on the elongated movable housing 346 proximate the thrust bearing 352. Block 356 is pivotally connected to angled link arm 368 which in turn is pivotally connected to link arm 370 fixedly connected to platform pivot shaft 362. In turn, platform pivot shaft 362 is fixedly connected to multi-sectional platform 308 so that when the block 356 is compressed by the screw nut 354 to travel downward, the angled link arm 368 and link arm 370 causes the platform 308 to pivot upward towards a stowing position.

Referring to FIGS. 30A and 31–32B, an adjustable (e.g., flexible) link 372, such as a roller chain (e.g., bicycle chain), is affixed on the hand rail 364 proximate the distal end thereof. The other end of the adjustable link 372 is preferably affixed to the platform on a side rail vertically under the hand rail 364 at a location between the distal and proximal ends and the barrier link mechanism 310 similar to the embodiment of FIG. 15 can be used to adjust the distal barrier 306. The pivoting (i.e., shutting and opening) of the distal barrier 306 by the action of the adjustable link 372 and the barrier link mechanism 310 is similar to that described hereinabove for the embodiment of FIG. 15.

Figure 30A:
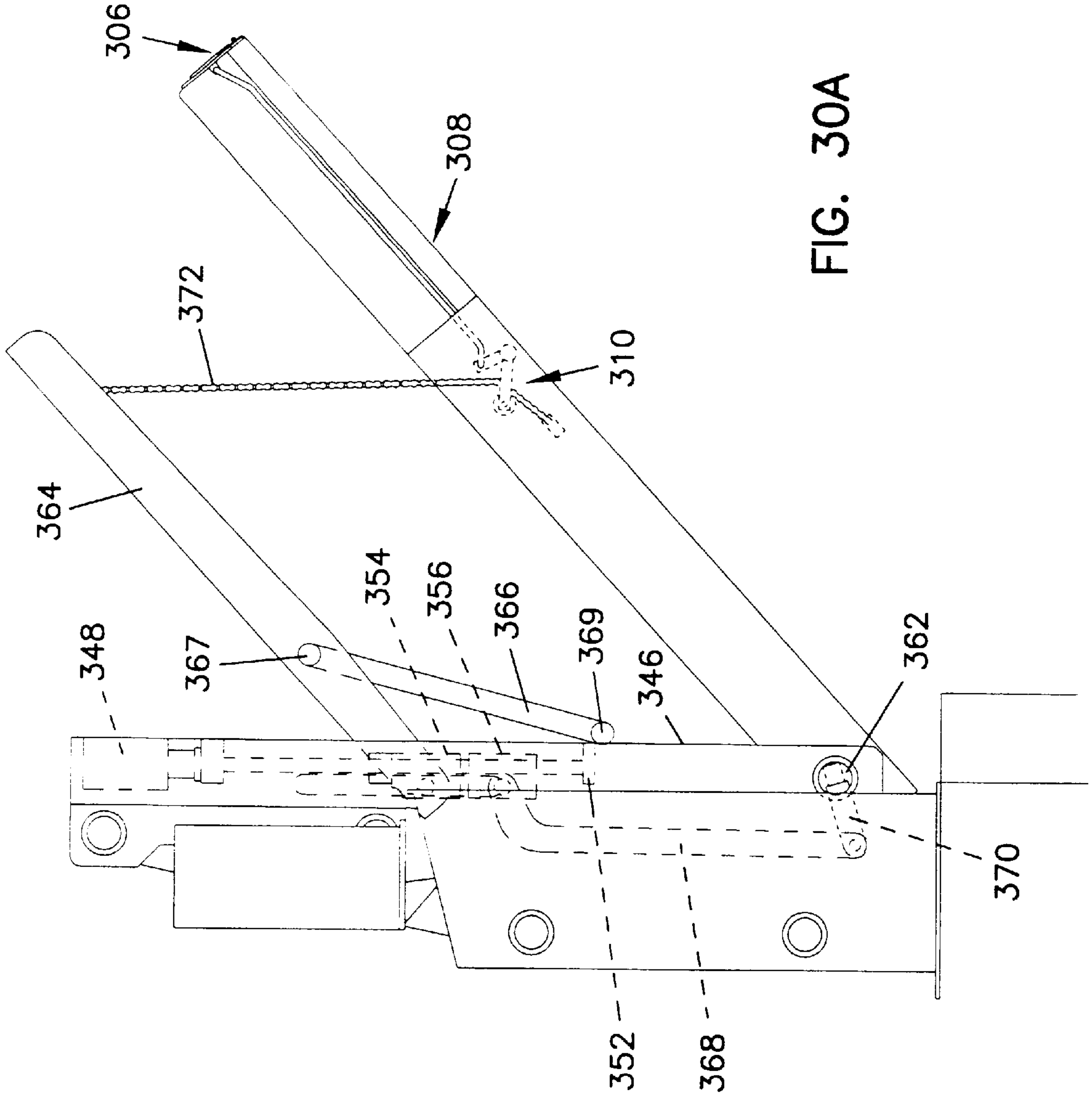
FIG. 30A is a side elevation view of the embodiment of FIG. 27A showing a partially deployed platform.
Figure 30B:
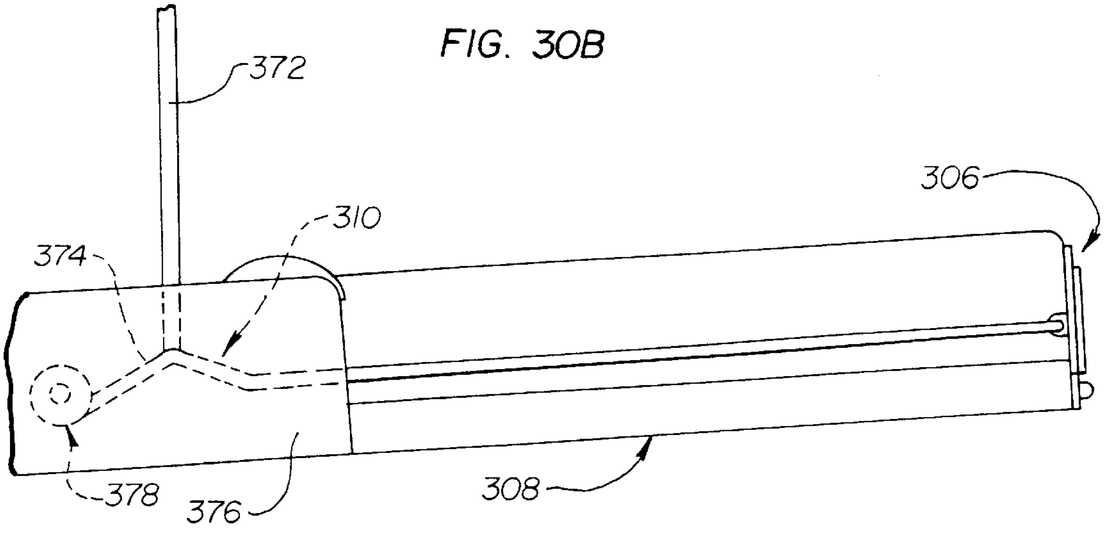
FIG. 30B is an elevation view showing in portion an alternative barrier link mechanism for shutting and opening of the distal barrier applicable for the embodiment of FIG. 27A.
Figure 31:
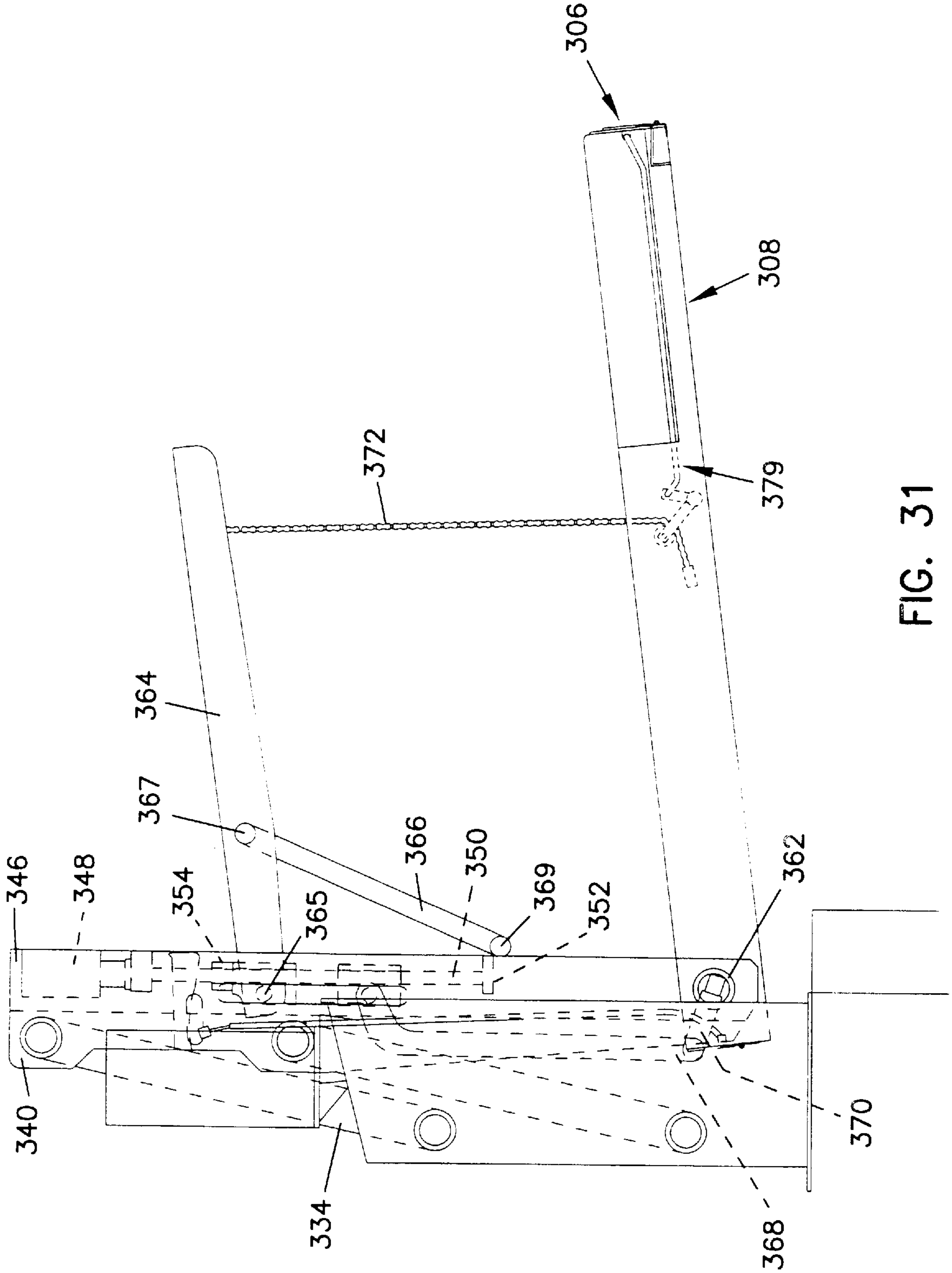
FIG. 31 is an elevation view of the embodiment of FIG. 27A showing the platform being deployed in a substantially horizontal position.
Figure 32A:
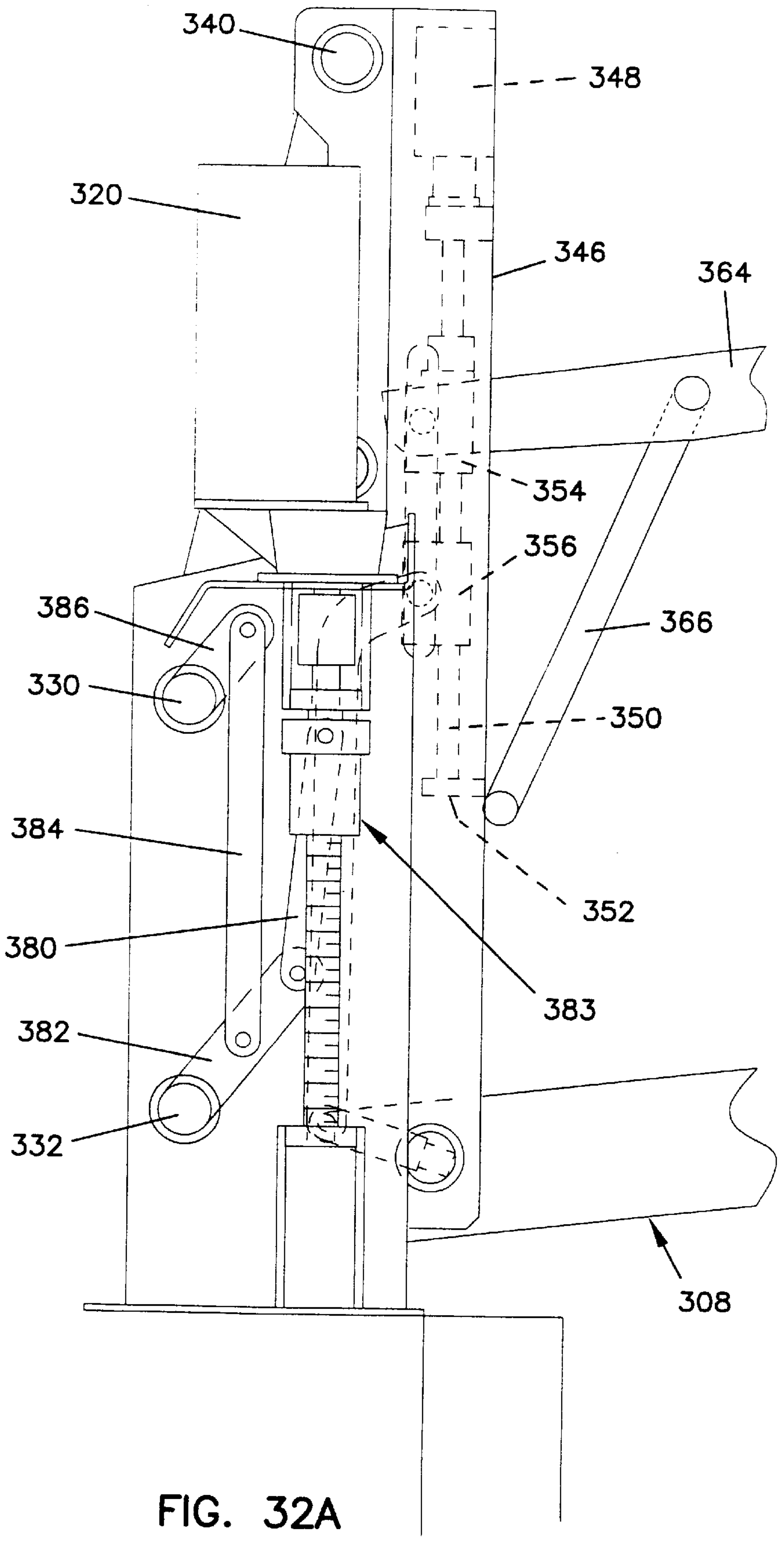
FIG. 32A is an elevation view of the embodiment of FIG. 27A showing the platform being lowered to the floor level.
Figure 32B:
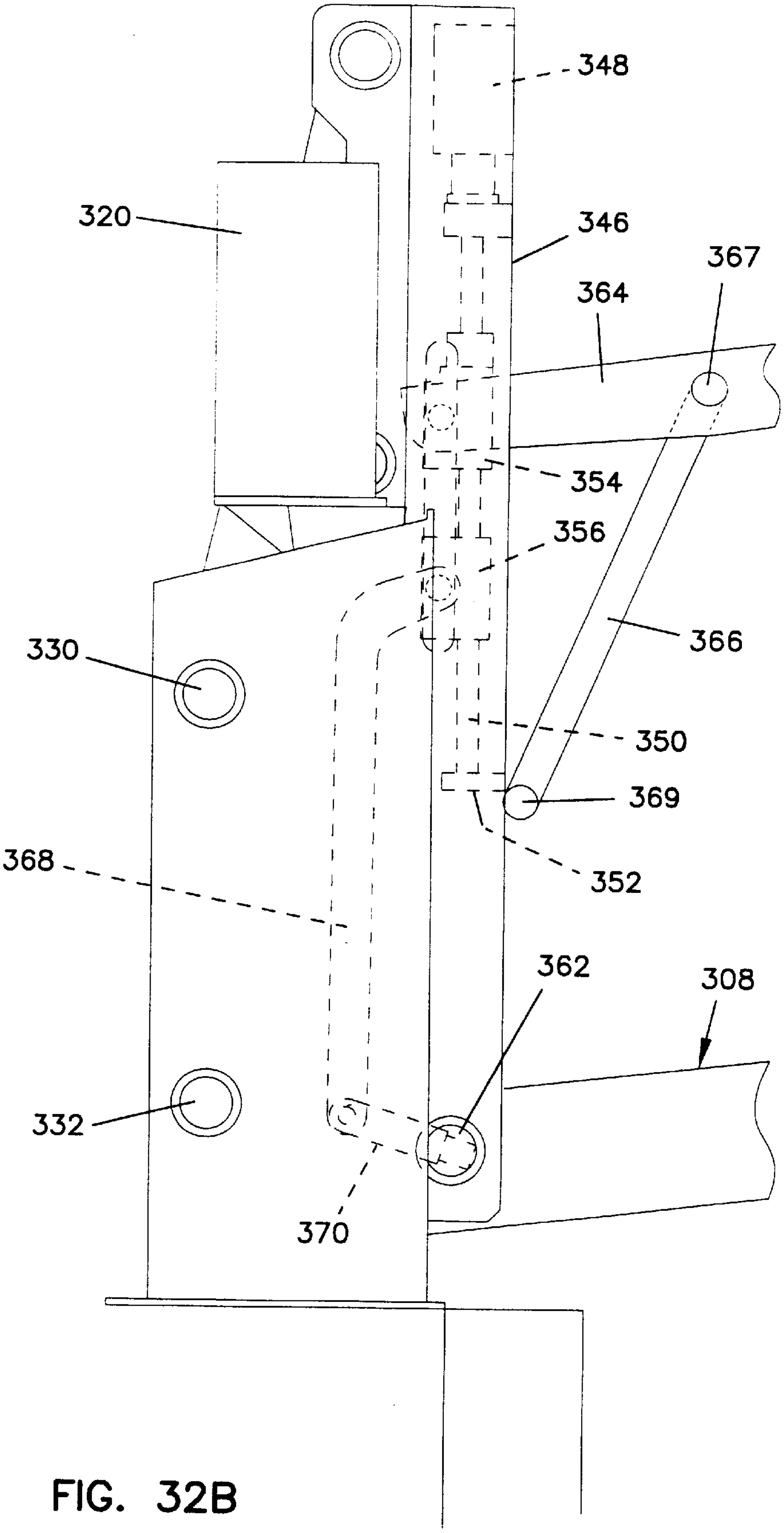
FIG. 32B is an elevation view of the embodiment of FIG. 27A showing in portion details of FIG. 32A, with portions omitted for clarity.

Alternatively, the barrier link mechanism 310 can be configured (as shown in FIG. 30B) such that the other end of the adjustable link 372 is connected to a finger 374 which is pivotally connected to a side rail 376 of the multi-sectional platform 308. Preferably, a spring mechanism (e.g., a torsion spring) 378 is provided to bias finger 374 towards the distal pivotable barrier 306 to provide a biasing force on a link arm 380 to open the distal pivotable barrier. When the multi-sectional platform is not resting on the ground, the weight of the multi-sectional platform 308 causes the adjustable link to be under tension and maintaining the distal pivotable barrier 306 in a closed position. As an alternative to using a flexible link, an adjustable link consisting of a telescopic mechanism can be used to pivotally connect to the barrier link mechanism 310 shown in FIG. 30B.

Figure 33:
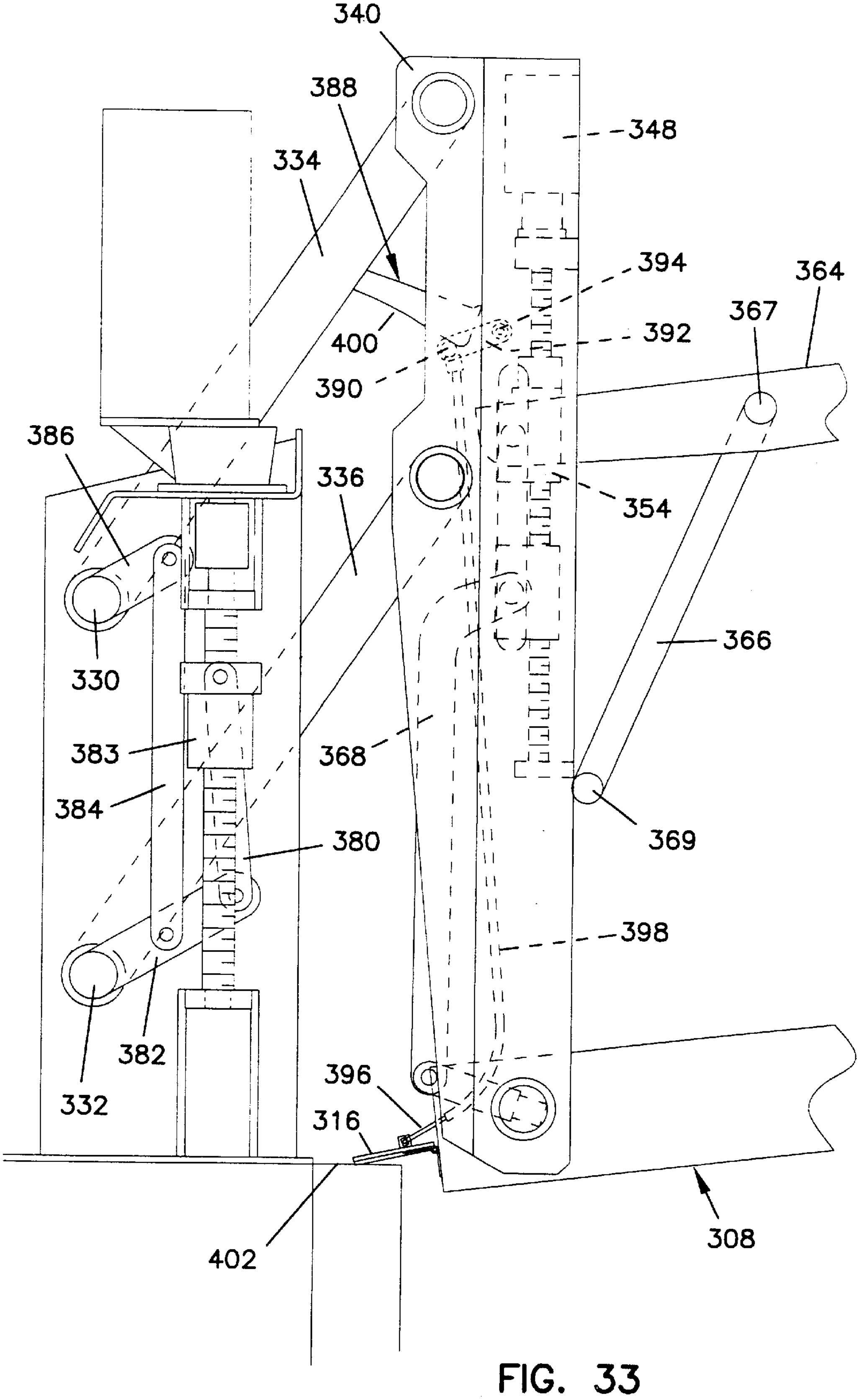
FIG. 33 is a side elevation view of the embodiment of FIG. 27A in portion showing the platform in a substantially horizontal position at floor level.
Figure 34:
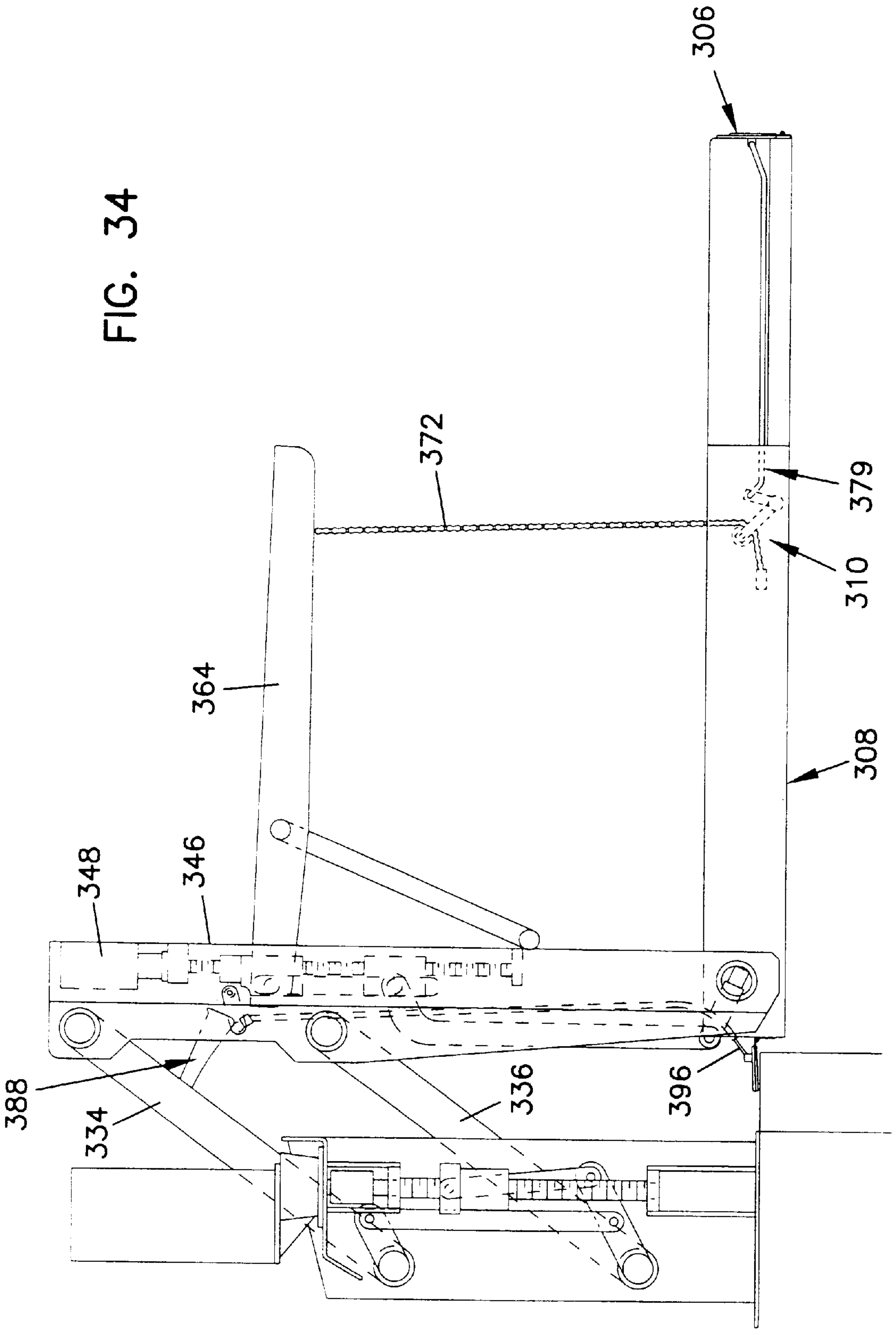
FIG. 34 is an elevation view of the embodiment of FIG. 27A showing the platform in a horizontal position proximate the floor level of the vehicle.

Referring to FIGS. 33–34, a screw nut (preferably a ball screw nut) 383 threadedly rides on the main screw shaft 326 and is pivotally connected to a generally downwardly directing thrust arm 380 to which an end of a lever arm 382 is pivotally connected. The lever arm 382 is rigidly connected in relation to the lower pivot arm 336 at the lower pivot shaft

332 so that as the screw nut 383 moves downward, the lower pivot arm 336 is caused to move outward and downward relative to the floor of the vehicle. A toggle link arm 384 is pivotally connected to the midsection of lever arm 382 and to an ear 386 which is connected to the upper pivot arm 334 in a rigid relationship at the upper pivot shaft 330. In this way, the upper pivot arm 334, lower pivot arm 336, toggle link arm 384, and the vertical channel beam 340 are arranged in a parallelogram configuration. In an alternative embodiment, as in the embodiment of FIG. 13B, the toggle link arm 384 and the ear 386 can be omitted if desired.

A cam finger 388 is rigidly connected to the upper arm 334 and extends therefrom towards the vertical channel beam 340. An proximal pivotable barrier actuating mechanism similar to the embodiment of FIG. 15 described above is also present. This proximal pivotable barrier actuating system includes the cam finger 388, cam follower 392 biased by a torsion spring 394 towards the cam finger, cable 396, and cable sheath 398. The vertical channel beam 340, elongated housing 346, upper pivot arm 334 and lower pivot arm 336 are arranged in an "in-line" fashion similar to that of the embodiment of FIG. 15.

Mechanics of Motion of the Platform of the Embodiment of FIG. 27

Referring again to 31–32B, when the power platform 301 is being deployed, the deploy motor 348 actuates to raise the screw nut 354 along the screw shaft 350, allowing the weight of the platform 308 to cause pivotal movement of angled link arm 368 and link arm 370 to result in the block 356 rising along the screw shaft 350, thereby resulting in the multi-sectional platform 308 pivoting downward at the platform pivot shaft 362. As the screw nut 354 rises along the screw shaft 350, the hand rail 364, being pivotally connected to the vertical housing 346 proximate the thrust bearing 352 by means of fulcrum arm 366, pivots outward. The weight of the multi-sectional platform 308 causes tension on the flexible link 372 to maintain the distal pivotable barrier 306 in an "up," i.e., shut, position by pulling the barrier link 379 away from the distal pivotable barrier. In this way, the hand rail 364 and the multi-sectional platform 308 are pivotally moved from a substantially vertical position to a substantially horizontal position.

At this point, the up-down motor 320 can be actuated to drive the screw nut 383 downward along the main screw shaft 326, thereby causing the thrust arm 380 to pivot the lever arm 382 and the lower pivot arm 336 as well as the upper pivot arm 334 outwardly and downwardly relative to the floor of the vehicle.

Figure 35:
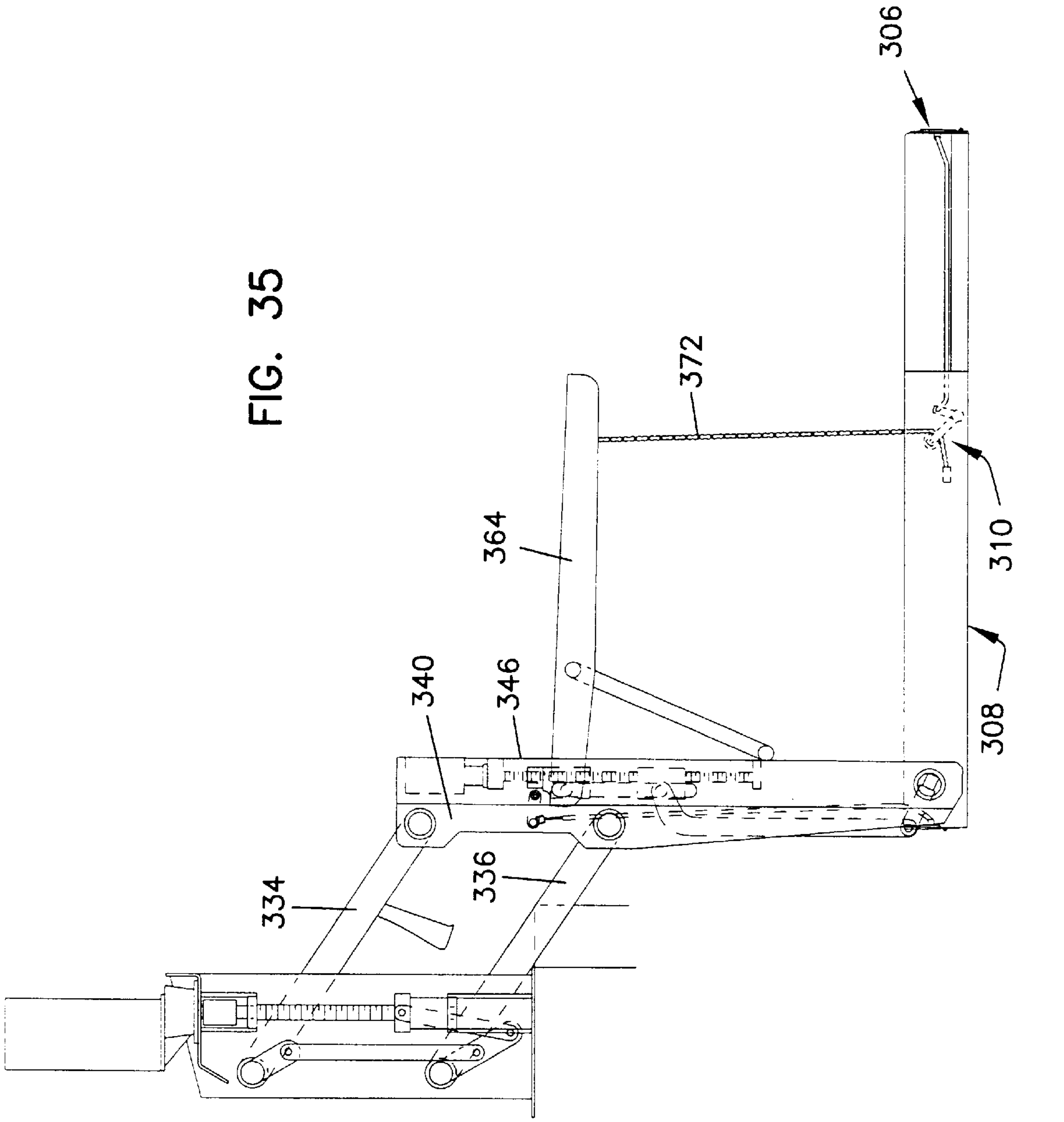
FIG. 35 is a side elevation view of the embodiment of FIG. 27A showing the platform proximate the ground.

Referring to FIG. 33–35, the outward and downward movement of the upper pivot arm 334 causes the cam follower 390 to ride along the surface 400 of the cam finger 388. As the cam follower 390 approaches the distal end of the cam finger 388 remote from the upper pivot arm 334, it forces cable 396 partially through the cable sheath 398, thereby causing the proximal pivotable barrier 316 to be lowered, i.e. opened. At this point, the multi-sectional platform 308 is in a substantially horizontal position with its proximal end proximate to the floor of the vehicle. A floor extension 402 is preferably connected to the floor of the vehicle to provide a surface on which the proximal pivotable barrier 316 can rest as a wheelchair is rolled onto the platform 308.

The platform can further be adjusted to obtain a desired horizontal position by actuating the deploy motor 348 to pivotally lower or raise the hand rail 364. After a desired horizontal position is accomplished, the platform 308 can be lowered to the ground by actuating the up-down motor 320 to further drive the screw nut 383 and therefore the upper pivot arm 334 and lower pivot arm 336 downward. As the vertical channel beam 340 moves further downward, the cam follower 390 disengages from cam finger 388, thereby allowing torsion spring 394 to bias the follower arm 392 and the cam follower upwards and pulling the proximal pivotable barrier 396 to a shut position by means of cable 396.

Figure 36:
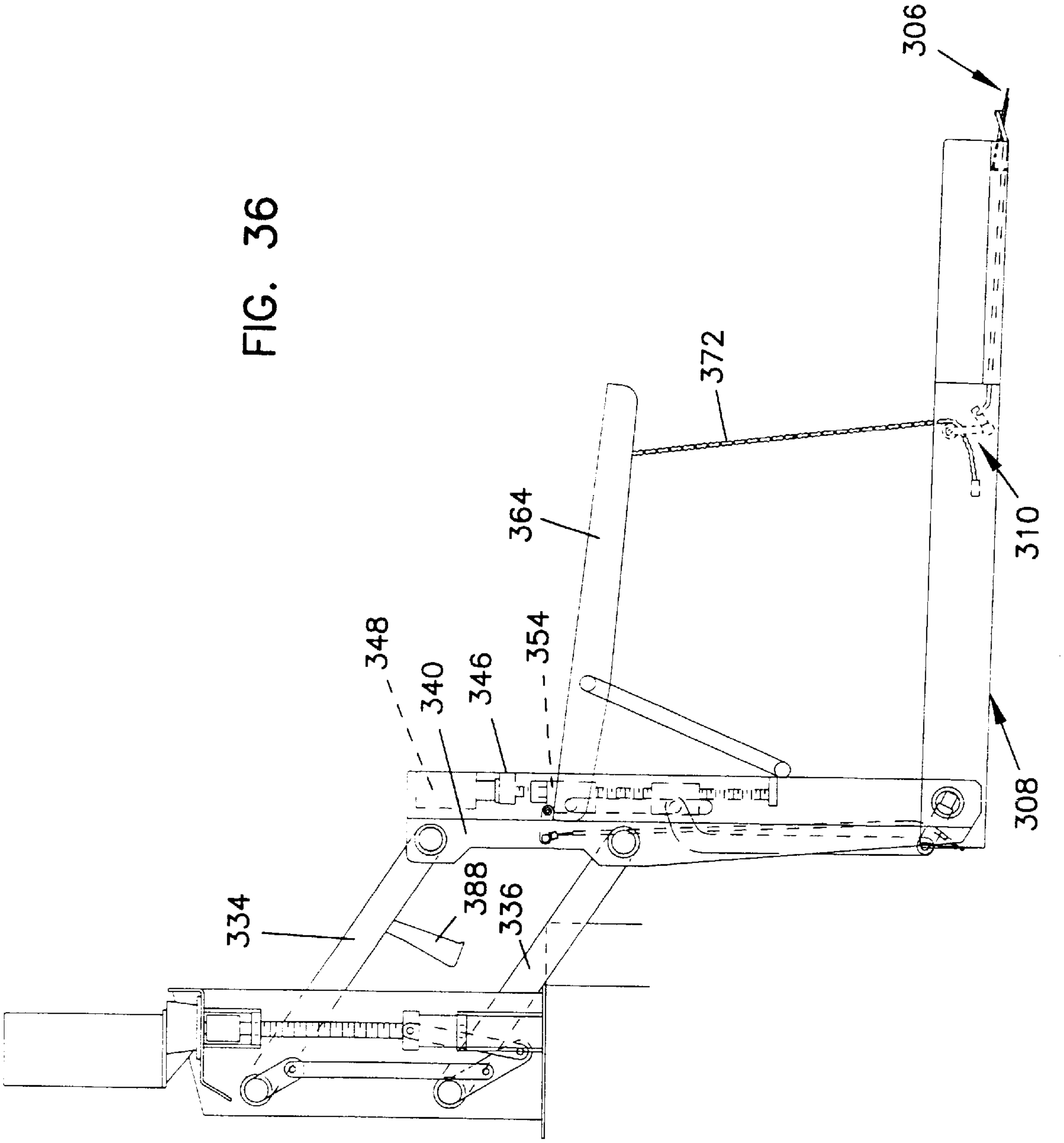
FIG. 36 is a side elevation of the embodiment of FIG. 27A showing the platform resting on the ground.

Referring now to FIG. 36, after the multi-sectional platform 308 reaches the ground, further actuation of the deploy motor 348 to raise the screw nut 354 results in the distal end of the hand rail 364 moving towards the multi-sectional platform 308. This produces a slack in the flexible link 372, which allows the barrier link mechanism 310 to open the barrier 306. In the embodiment having the barrier link of FIG. 30B, finger 374 pivots at the torsion spring 378 and the barrier link 379 to move towards the distal pivotable barrier 316 thereby lowering, i.e. opening, the distal pivotable barrier to allow a wheelchair to exit from the platform 308.

Unfolding of the Multi-Sectional Platform

Referring now to FIGS. 37, 38, and 39, the multi-sectional platform has three sections 408A, 408B, and 408C. Section 408A is pivotally connected to the elongated movable housing 346 (not shown in FIGS. 37–39). Section 408B interposes and pivotally connects to section 408A and 408C by means of hinges 410A and 410B respectively. Hinges 410A and 410B are positioned proximate the trodden surface 412A, 412B, 412C of the sections. Section 408A is rigidly connected to a plate 404A pivotally connected to a push arm 414 at a location peripheral to and proximate hinge 410A when the sections are in the folded configuration (as shown in FIG. 37, which shows the sections each at about right angle to its adjacent section(s)). The term "peripheral," refers to a relative position away from the geometric center of the folded platform as in describing the folding of the embodiment of FIG. 9. The section 408C is rigidly connected to a plate 404C pivotally connected to a push arm 416 at a location peripheral to and proximate the hinge 410B when the sections folded. The push arm 414 and the push arm 416 are pivotally connected to connecting arm 418 which pivots on pivot pin 420 mounted on the midsection of a plate 404B rigidly connected to section 408B. The total length of push arm 414, connecting arm 418, and push arm 416 is longer than the length of plate 404B or section 408B. The planes of plates 404A, 404B, 404C are proximate and parallel but not coplanar to one another so that the plates can overlap. In this manner, when section 408A is unfolded from 408B by pivoting at hinge 410A, the lever action of section 408A around fulcrum, i.e. hinge 410A, causes push arm 414 to move towards section 408C, thereby pivoting connecting arm 418 at pivot pin 420. This causes push arm 416 to be pulled towards section 408A, thereby causing a lever action around fulcrum, i.e. hinge 410B, to result in section 408C being unfolded from section 408B. In this way, pulling on any one section to unfolding any two adjacent sections will cause all three sections to be unfolded.

Control Mechanism

Figure 40:
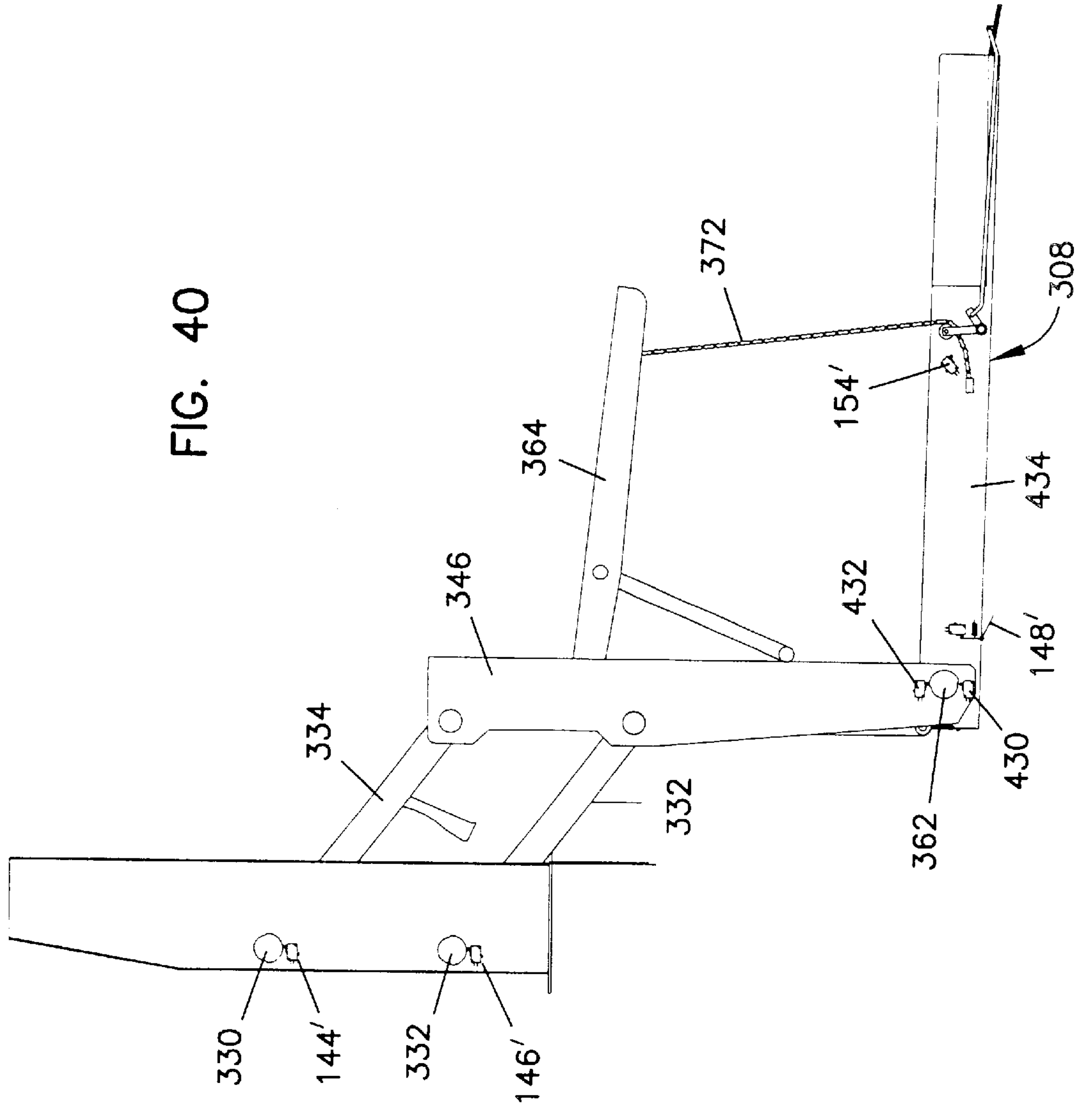
FIG. 40 is a side elevation view of the embodiment of FIG. 27A showing the positions of the limit switches.

Referring to FIG. 40, limit switches are provided to limit the operation of the motors and control the transition from one phase of operation of the powered platform to another phase. Each limit used for controlling the movement of the powered platform is detected by a corresponding limit switch. The limits enable or disable certain electrical outputs from the circuitry of the powered platform so that a subsequent movement will only be possible if a prior step of movement has be properly completed and continuation of subsequent action desired by the user. Up-limit switch 144' is located proximate and actuated by the upper main pivot shaft 330 to limit the pivotal movement of upper pivot arm 334 in the stowing operation. Floor limit switch 146' is located proximate and actuated by the lower main pivot shaft 332. Down-stop limit switch 148' is positioned at the bottom of the platform 308 proximate the lower end of elongated movable housing 346 to limit the downward action caused by the up-down motor. It is actuated by compression when contacting the ground. Deploy limit switch 430 and stow limit switch 432 are positioned proximate and actuated by the platform pivot shaft 362. A barrier stow switch 154' is located on a side barrier 434 proximate and actuated by the adjustable (e.g., flexible) link 372. It is to be understood that some of the switches can be positioned in other positions, e.g., in substantially similar positions as in the embodiment shown in FIG. 21.

Figure 41:
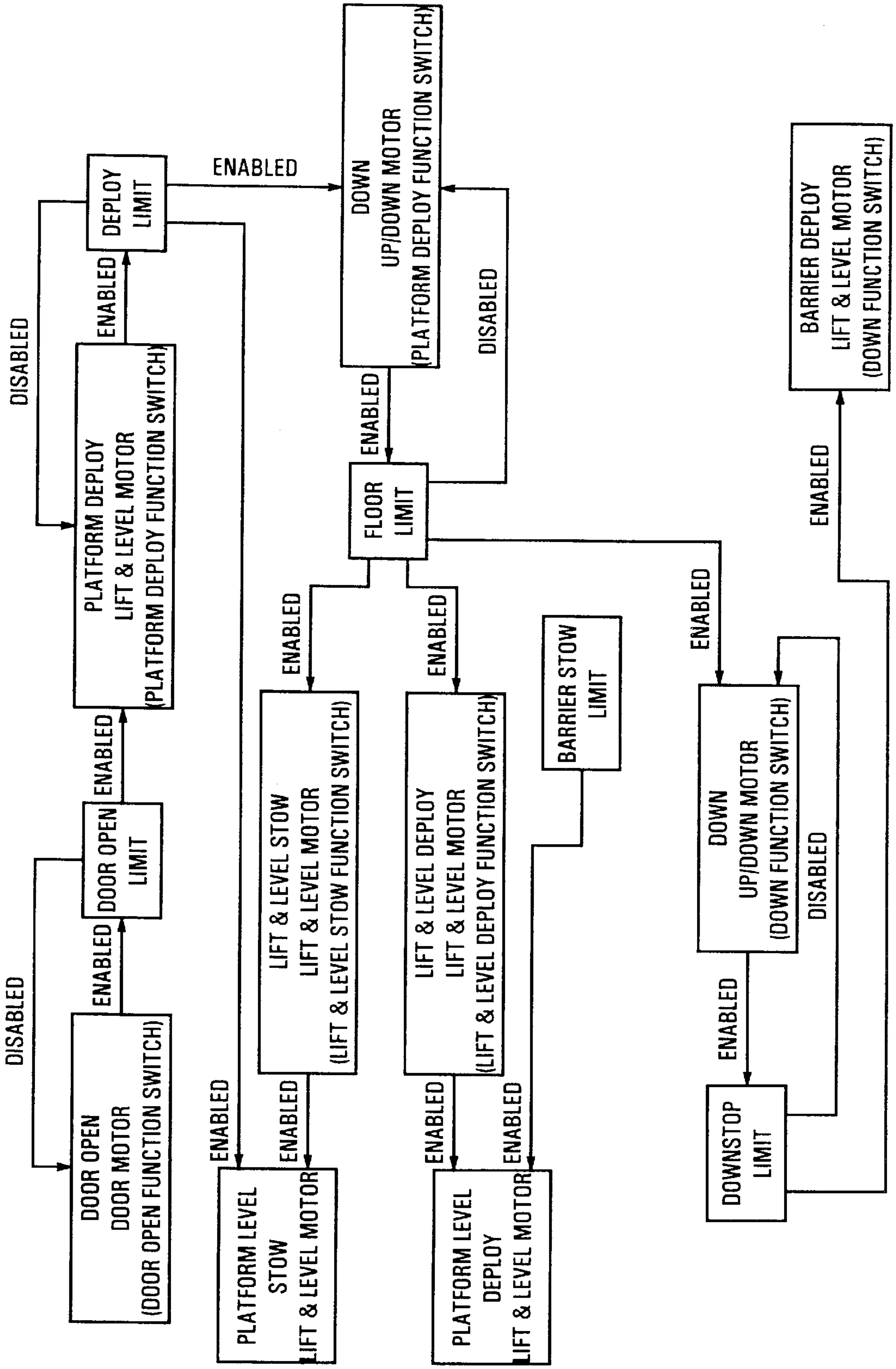
FIG. 41 is a flow diagram showing the relation of the limit switches to the operation of the collapsible powered platform of the embodiment of FIG. 27A in deploying and lowering the platform to the ground.

FIG. 41 shows an illustrative flow chart for deploying the platform for transporting a wheelchair from the vehicle to the ground for the embodiment of a powered platform of FIG. 40. To commence the process, the door open function switch is activated by the user. The control will allow a door open output. The door limit will make and disable the door open output. The platform deploy function switch is activated by the user. The control will allow a platform deploy output. The deploy limit makes and switches the deploy output to the lift down output. The floor limit makes and disables the down output. When the floor level limit is made the lift & level deploy or stow are enabled. The lift down function switch is activated by the user. The control will allow a lift down output. The down-stop limit makes and switches the down output to the barrier deploy output.

Figure 42:
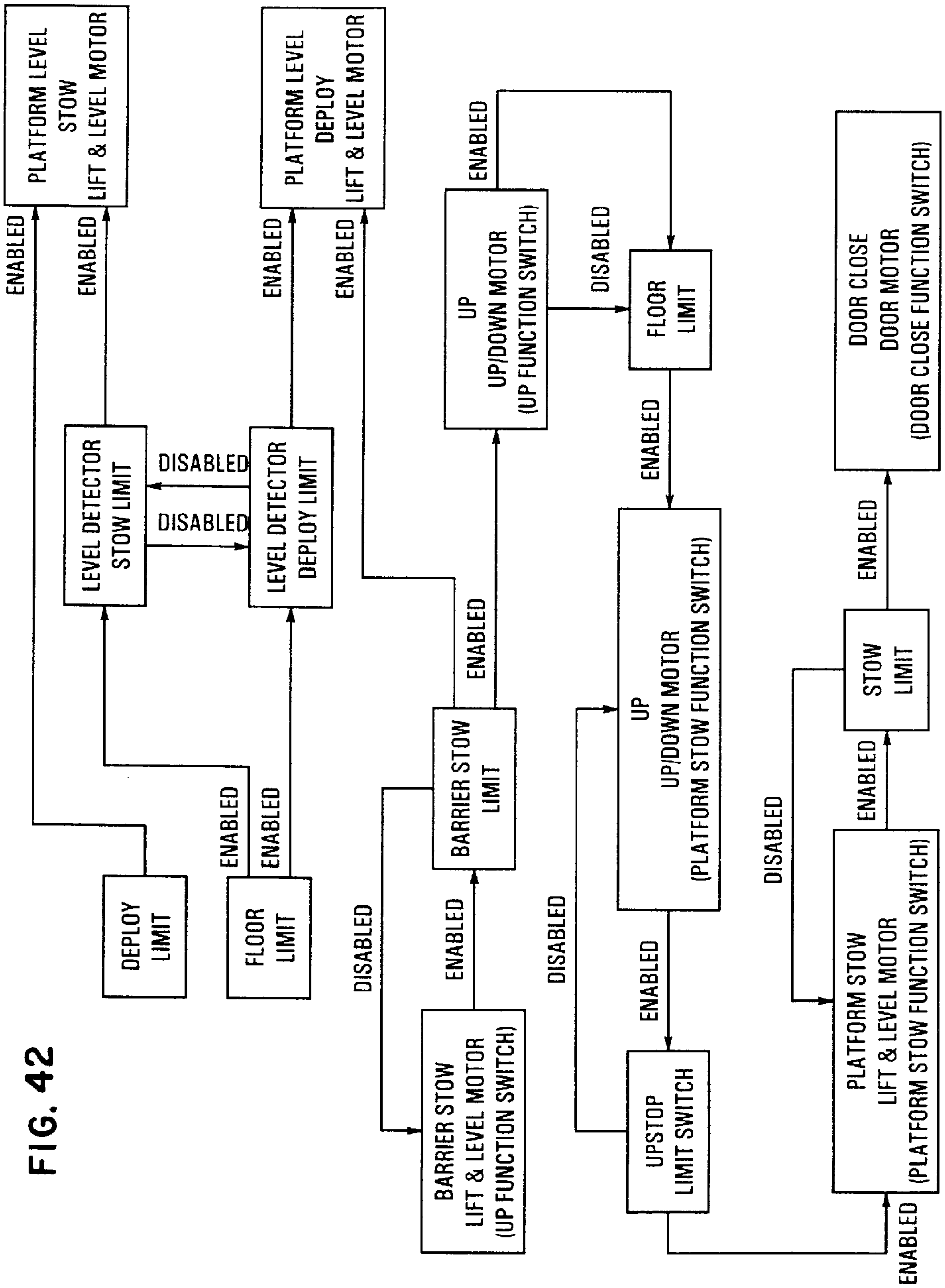
FIG. 42 is a flow diagram showing the relation of the limit switches to the operation of the collapsible, powered platform of the embodiment of FIG. 27A in raising and stowing the platform.

FIG. 42 shows a flow chart for stowing the platform for transporting a wheelchair from the ground to the vehicle for the embodiment of a powered platform of FIG. 40. To commence the stowing process, the lift up function switch is activated by the user. The control will allow a barrier stow output. The barrier stow limit makes and switches the barrier stow output to the lift up output. The floor limit makes and disables the lift up output. The platform stow function switch is activated by the user. The control will allow a lift up output. The up-stop limit breaks and switches the lift up output to the stow output. The stow limit makes and disables the stow output. The door close function switch is activated by the user. The control will allow a door close output.

Figure 43:
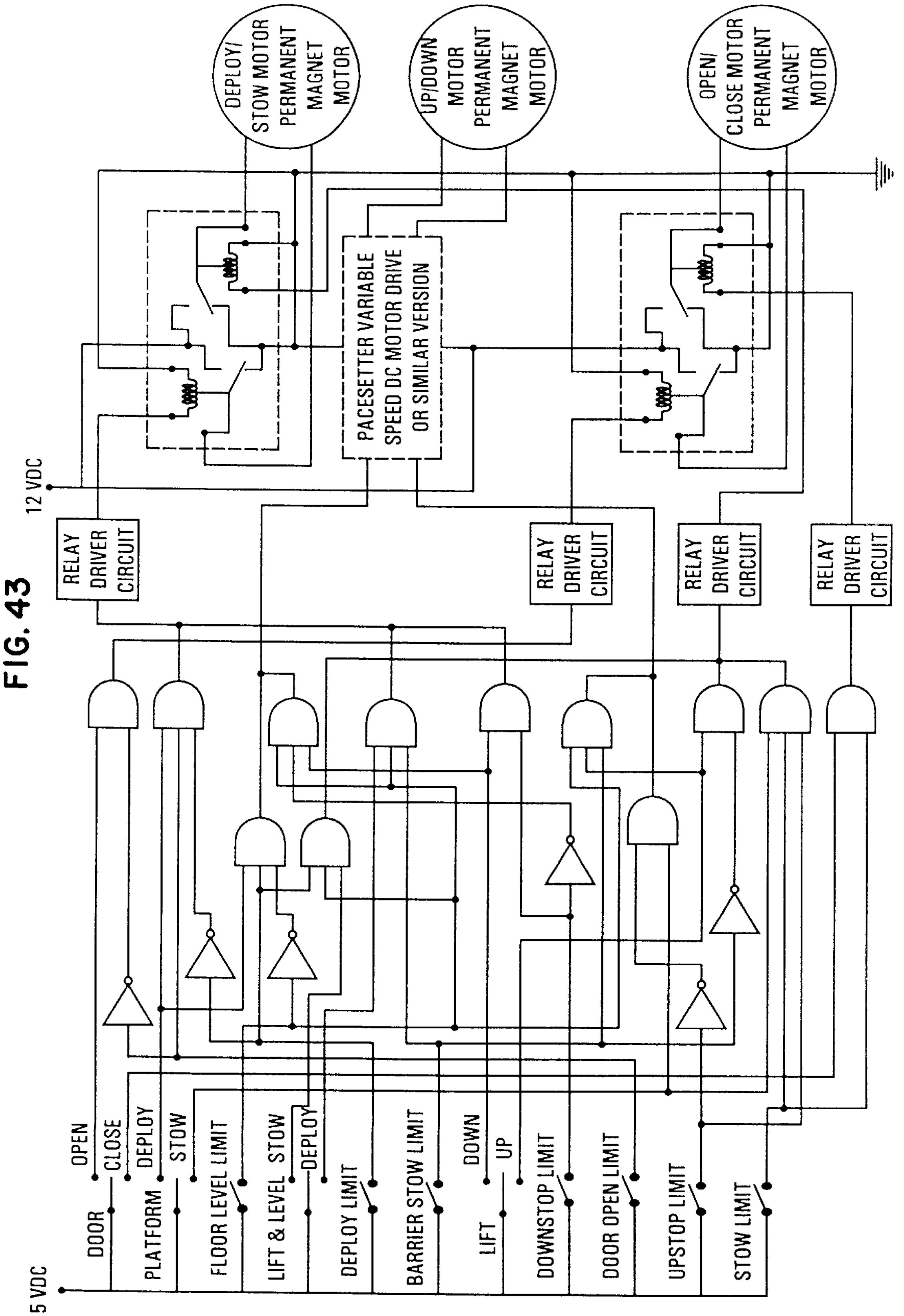
FIG. 43 is a schematic diagram showing the logic in operating the motors according to the flow diagrams of FIG. 41 and FIG. 42.

FIG. 43 shows the logic schematic of the flow diagrams of FIGS. 41 and 42.

Automatic Leveling

Figure 44:
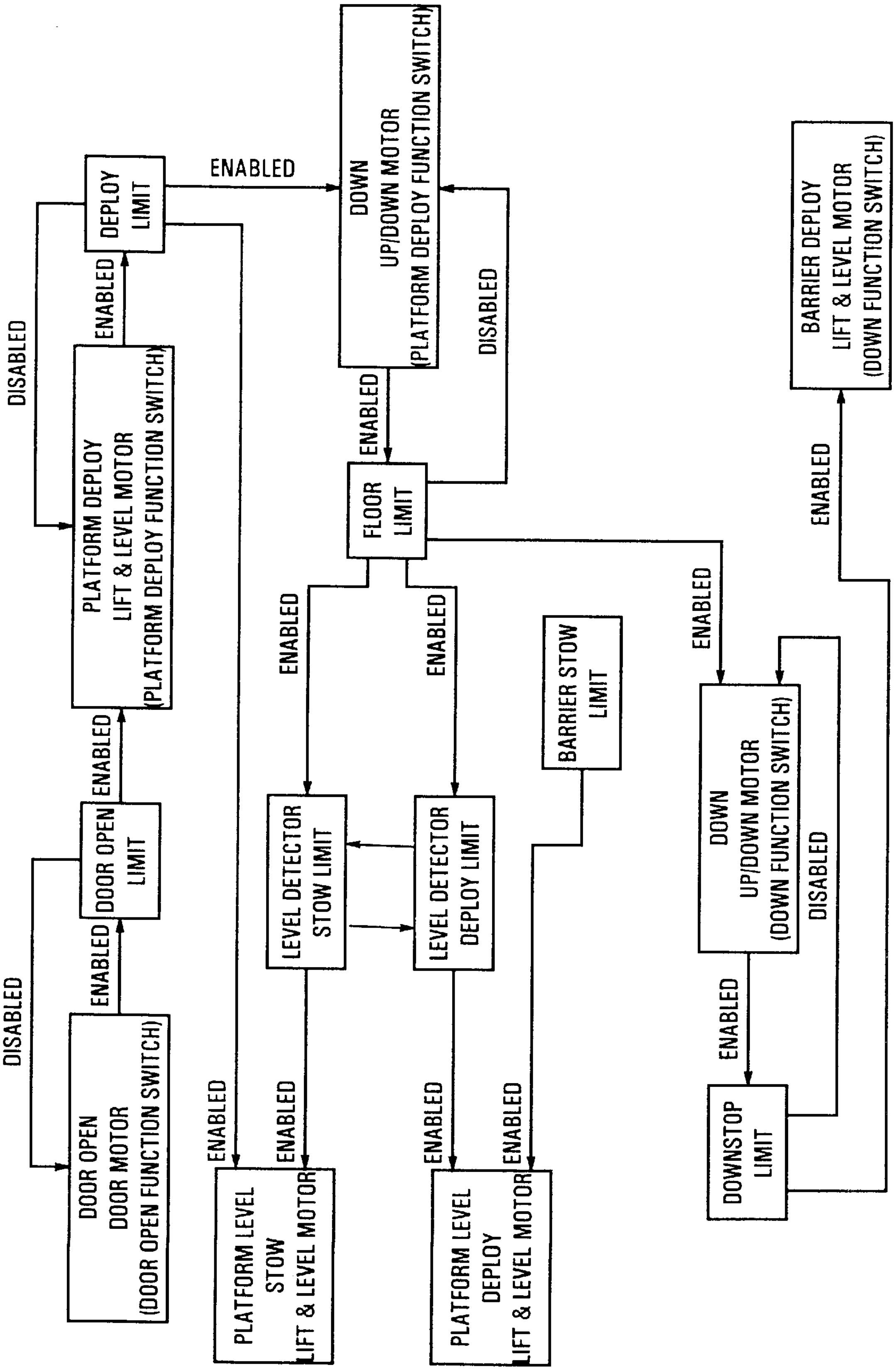
FIG. 44 is a flow diagram showing the relation of the limit switches to the operation of the collapsible powered platform of the embodiment of FIG. 27A, incorporating automatic leveling ("autoleveling") in deploying and lowering the platform to the ground.

Automatic leveling can be accomplished for the powered platform of the embodiment of FIG. 27A by using automatic level sensing devices, e.g., the devices of FIG. 25–26. FIG. 44 shows a flow chart for deploying the platform for transporting a wheelchair from the vehicle to the ground in an embodiment similar to that of FIG. 40. To commence the process, the door open function switch is activated by the user. The control will allow a door open output. The door limit will make and disable the door open output. The platform deploy function switch is activated. The control will allow a platform deploy output. The deploy limit makes and switches the deploy output to the lift down output. The floor limit makes and disables the down output. When the floor level limit is made the auto level control will level the platform by activating the lift & level motor. The lift down function switch is activated. The control will allow a lift down output. The down-stop limit makes and switches the down output to the barrier deploy output.

Figure 45:
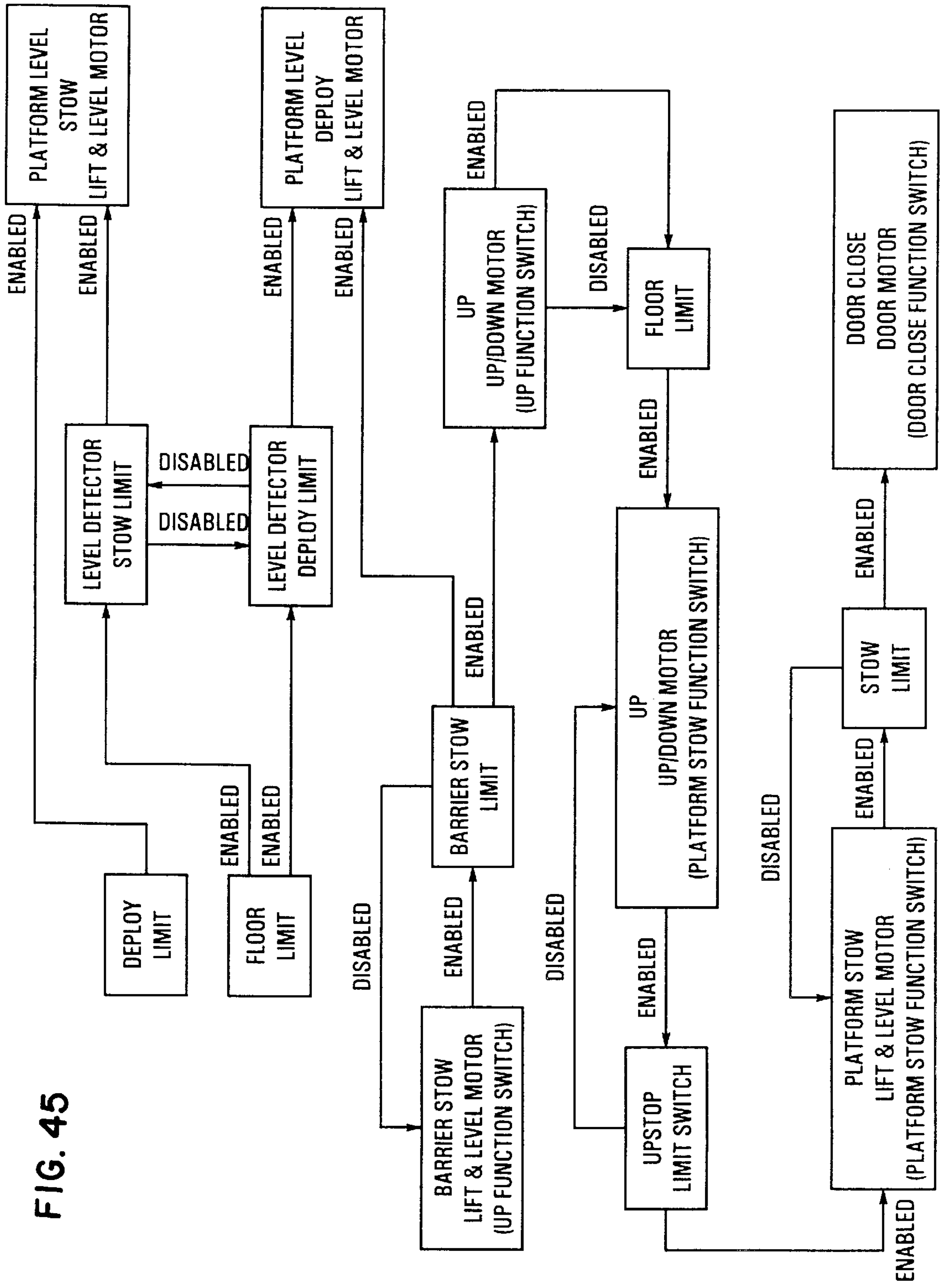
FIG. 45 is a flow diagram showing the relation of the limit switches to the operation of the collapsible, powered platform of the embodiment of FIG. 27A, incorporating autoleveling in raising and stowing the platform.

FIG. 45 shows a flow chart for stowing the platform for transport a wheelchair from the ground to the vehicle corresponding to the embodiment of FIG. 44. To commence the process of stowing the powered platform using autoleveling, the lift up function switch is activated. The control will allow a barrier stow output. The barrier stow limit makes and switches the barrier stow output to the lift up output. When the barrier stow limit is made the auto level will level the platform using the lift & level motor. The floor limit makes and disables the lift up output. The platform stow function switch is actuated. The control will allow a lift up output. The up-stop limit makes and switches the up output to the platform stow output. The stow limit makes and disables the platform stow output. The door is closed by activating the door close function switch.

Figure 46:
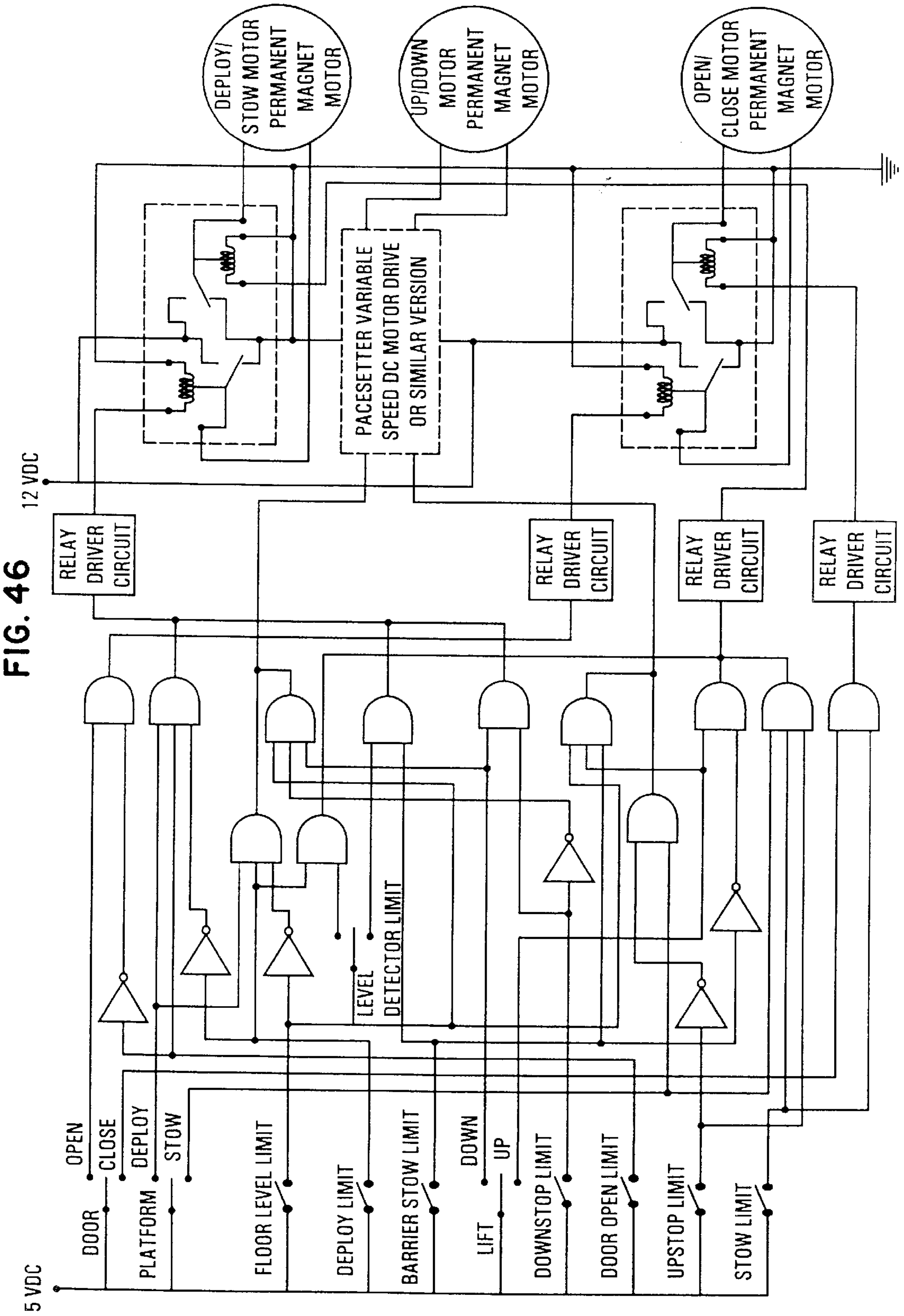
FIG. 46 is a schematic diagram showing the logic in operating the motors according to the flow diagrams of FIG. 44 and FIG. 45.
Figure 47:
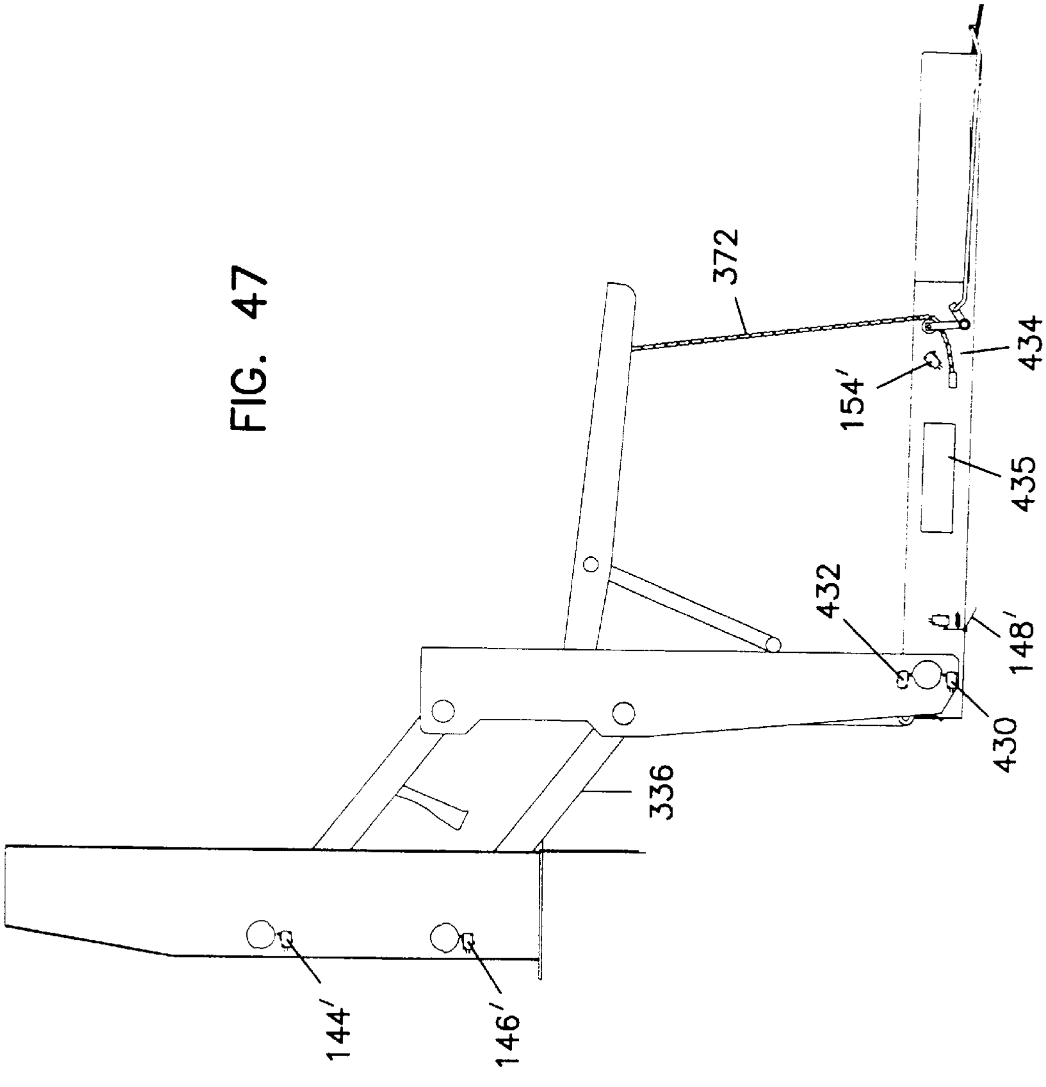
FIG. 47 is an elevation view showing the limit switches for the embodiment of FIGS. 44–46.

FIG. 46 shows the logic schematic of the flow diagrams of FIG. 45 involving automatic leveling of the platform. The position of the level detector limit switch 435 is shown in FIG. 47 to be on a side barrier 434. However, other alternative locations wherein the detector can sense the level of the platform, e.g. a platform section, can be used.

Figure 48A:
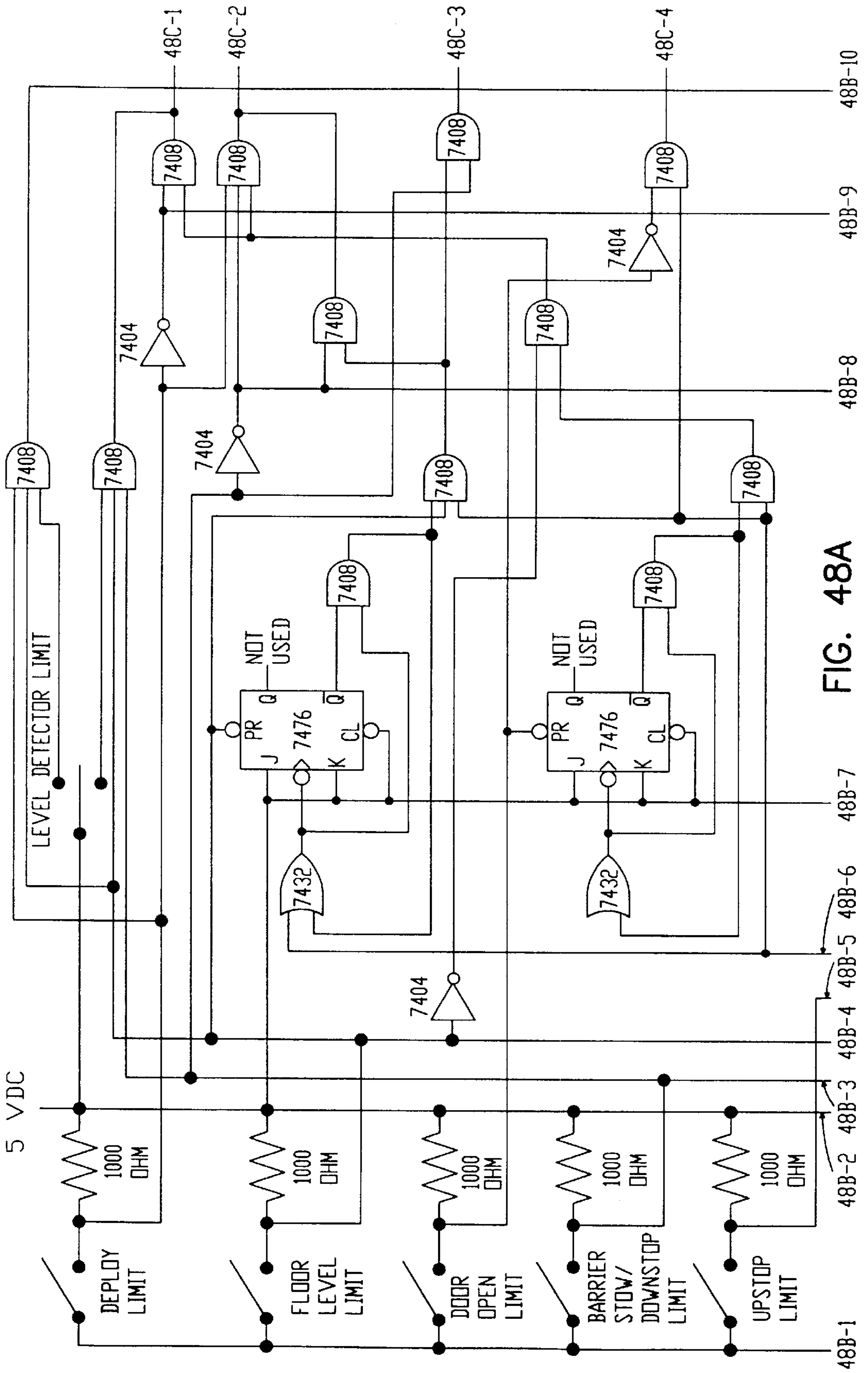
FIGS. 48A to 48C shows the logic schematic of an embodiment wherein a powered platform of FIG. 27A is controlled by using a single toggle switch with autoleveling.
Figure 48B:
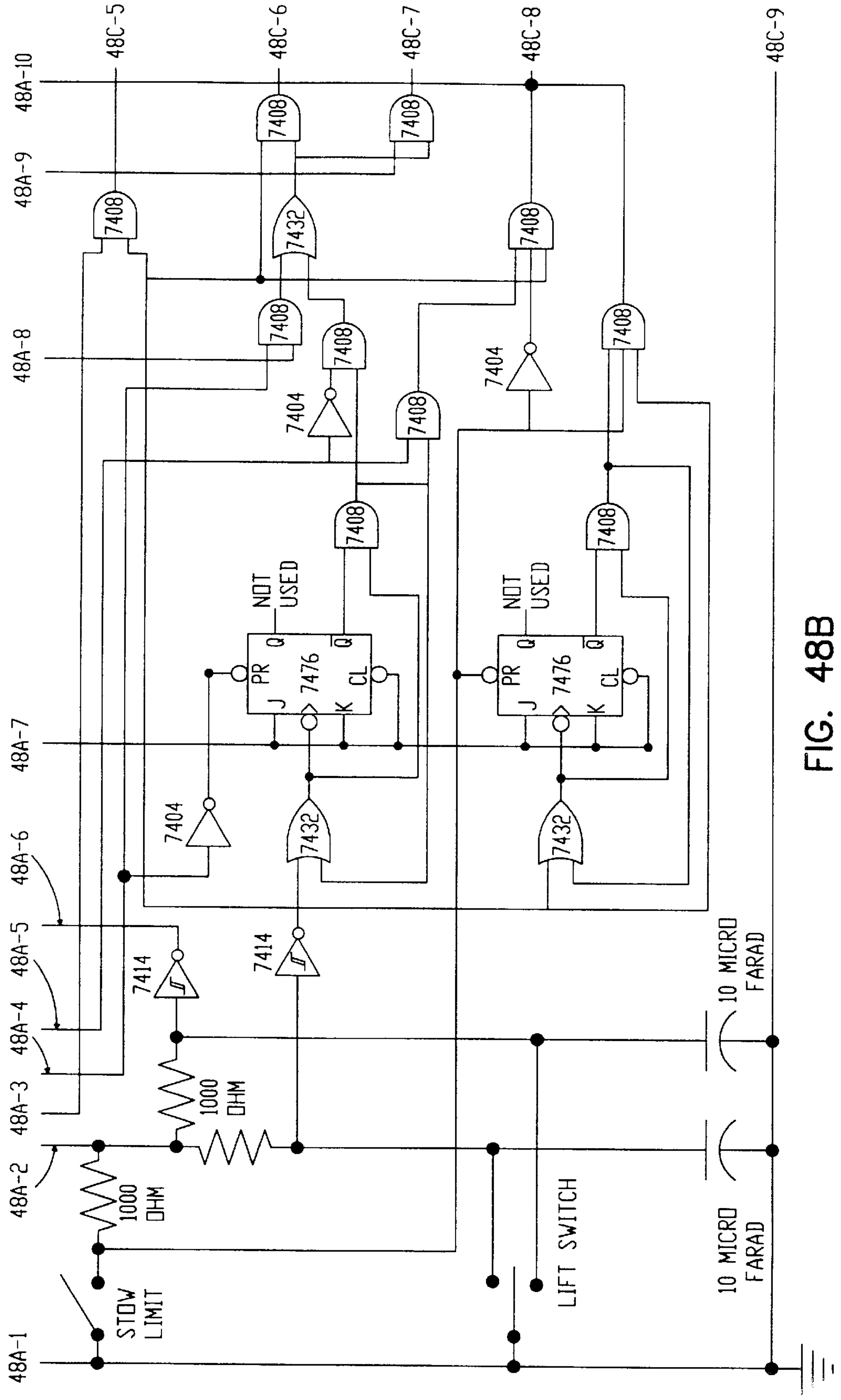
Figure 48C:
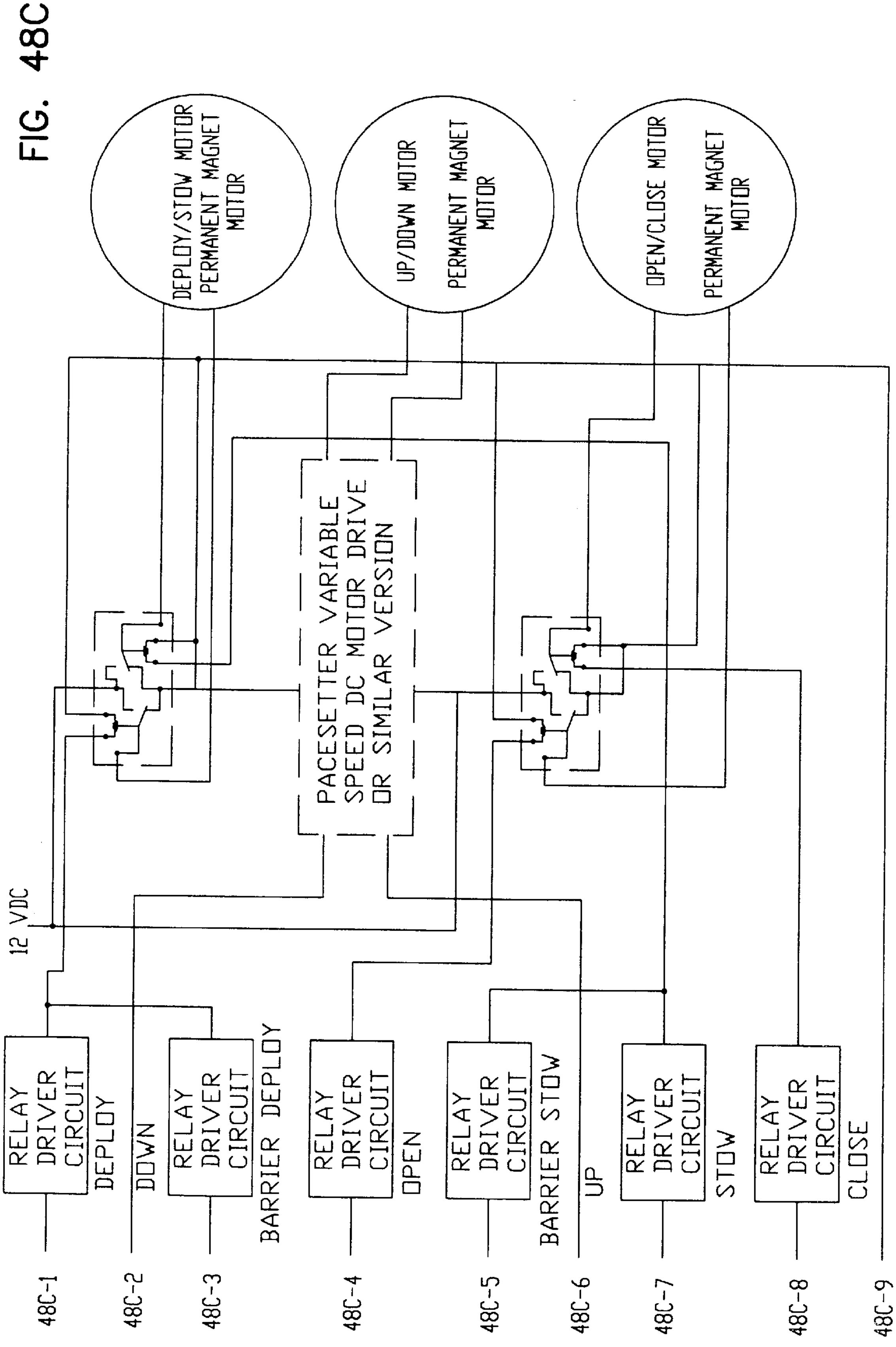
Figure 49A:
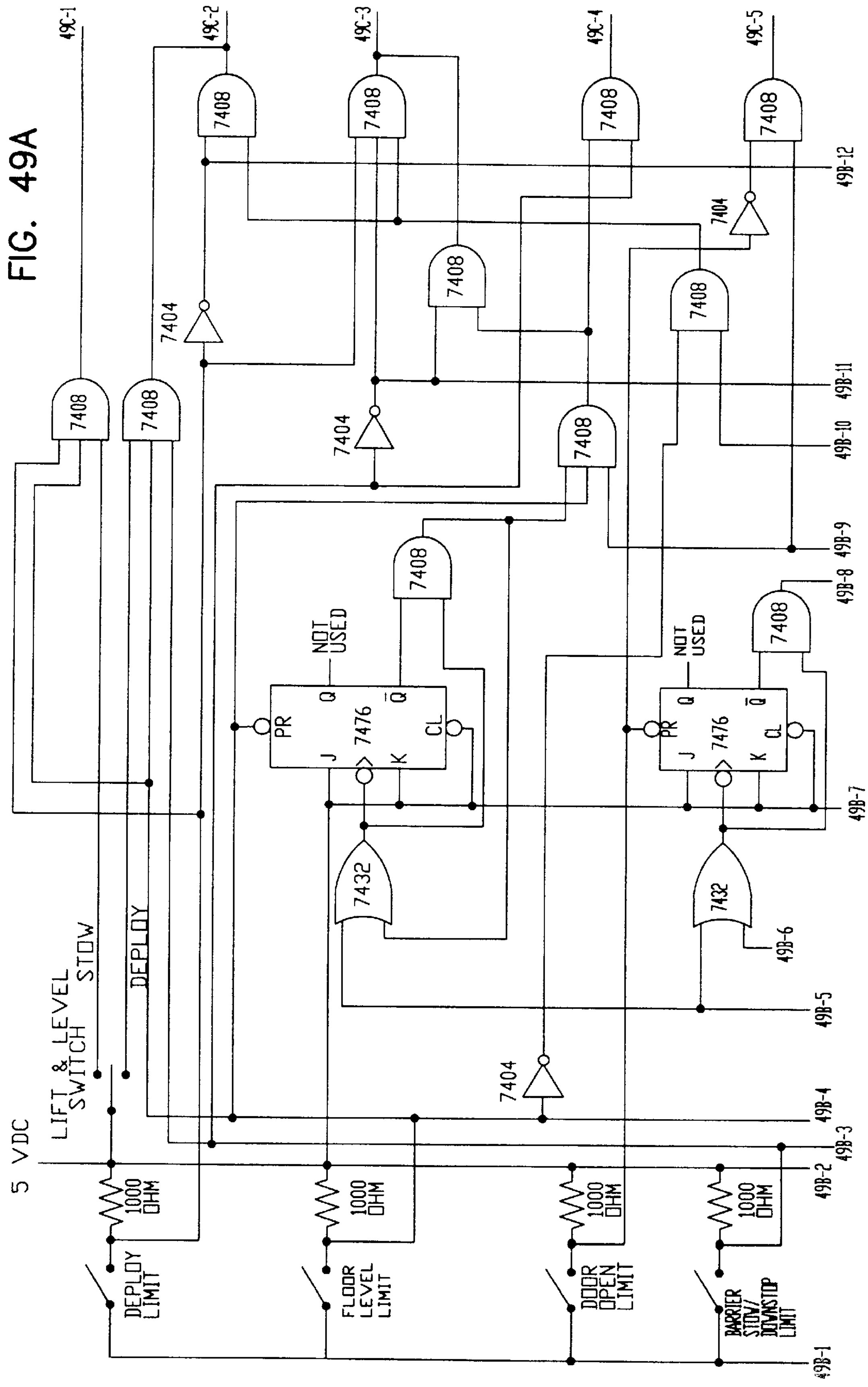
FIGS. 49A to 49C shows the logic schematic of an embodiment wherein a powered platform of FIG. 27A is controlled by a using a single toggle switch without autoleveling.
Figure 49B:
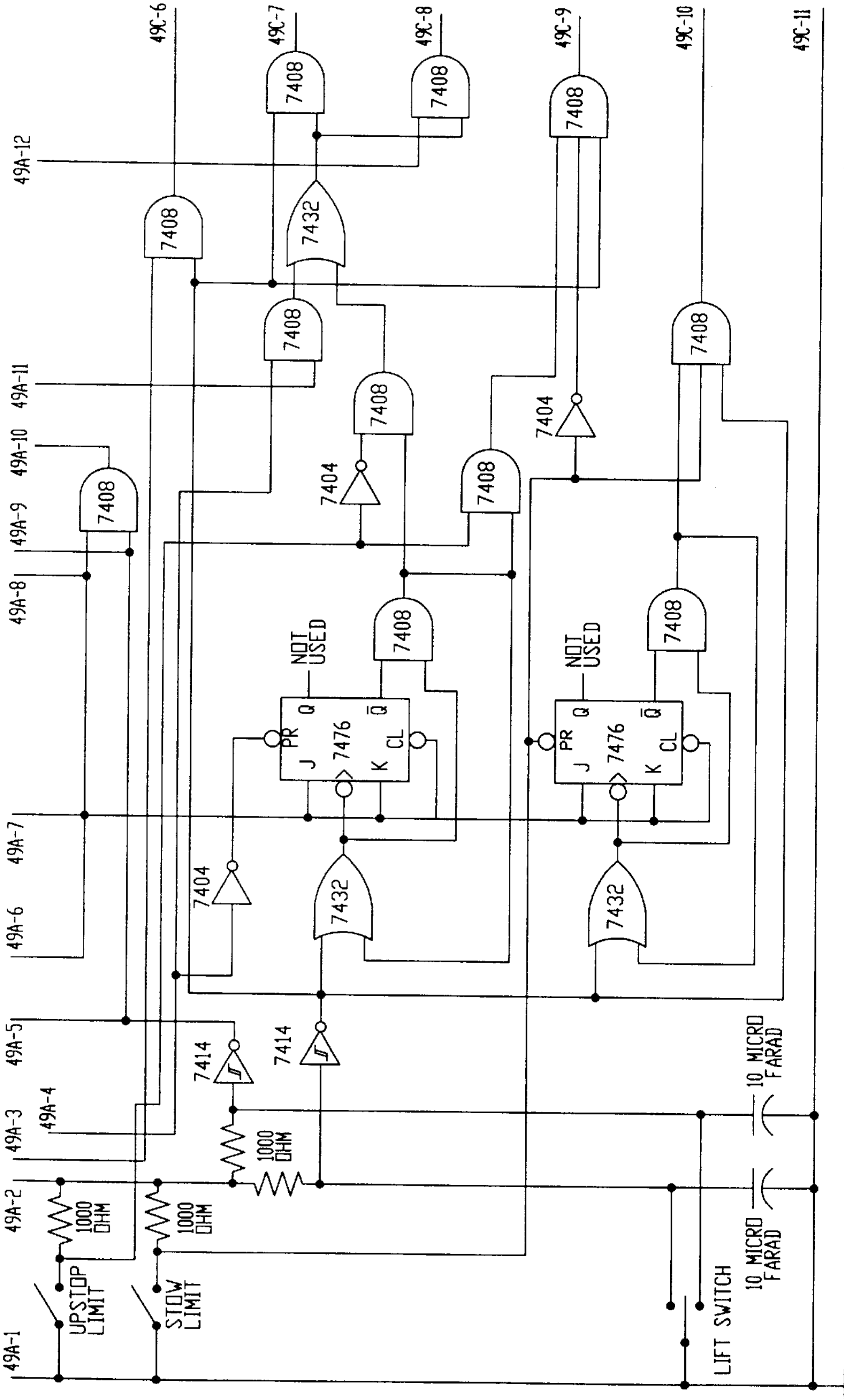
Figure 49C:
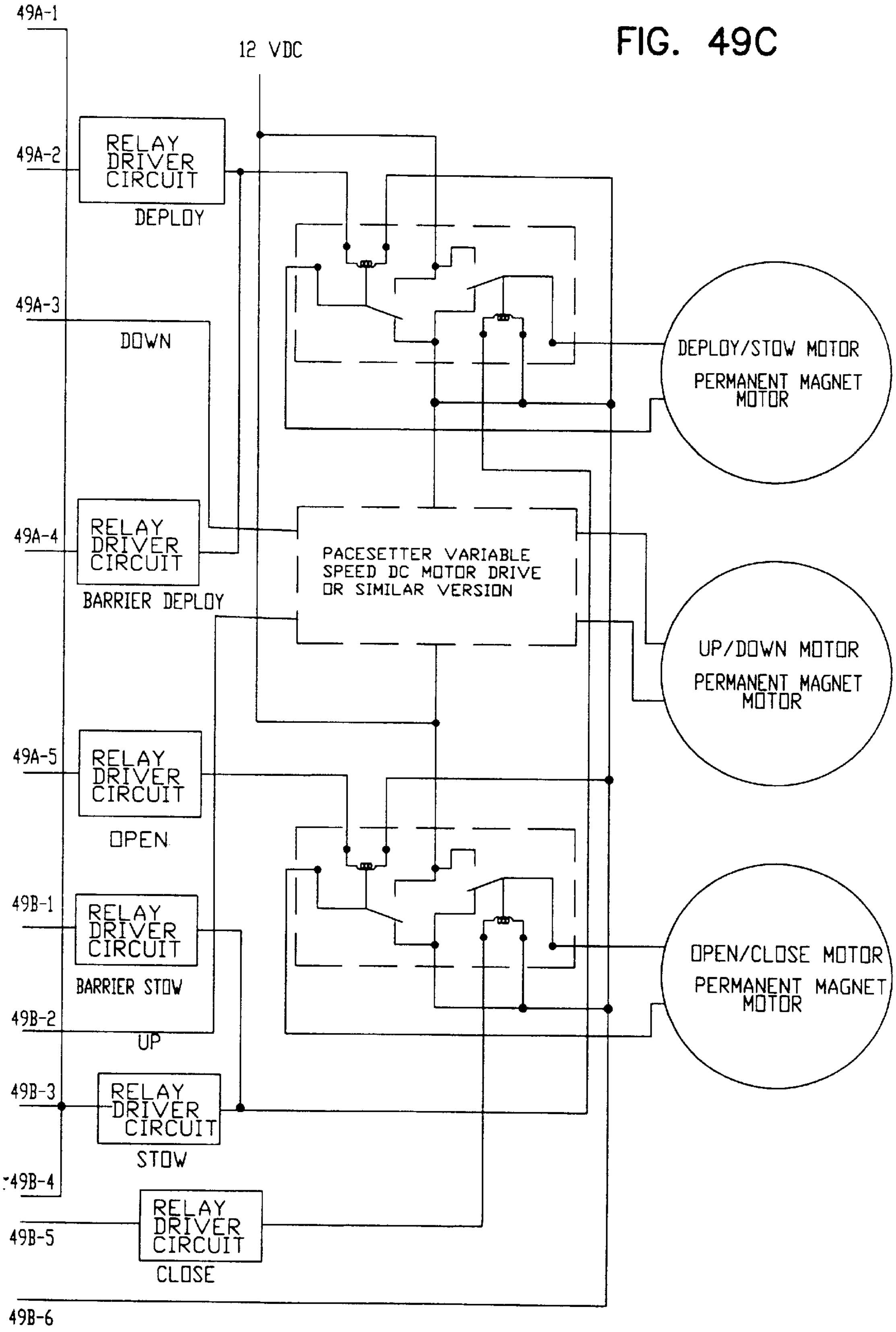

The speed of the up-down motor 320 is preferably adjustable to raise or lower the platform at a desired speed. This can be accomplished, for example, if the DC motor 320 is a variable speed motor which has a pacesetter for controlling the speed (as shown in FIGS. 48 and 49). A similar system can also be used for the embodiment of FIG. 11.

Using a Single Dual Function Switch for Control, with Autoleveling

The embodiment of FIG. 27A can be constructed to incorporate autoleveling and be controllable by using a single dual function (e.g., toggle) switch. The switch has three positions: an "up" position, a "neutral" position, and a "down" position. The logic schematic of such a system is shown in FIG. 48. It is to be understood that other multifunction switches can be adapted to function in a similar fashion. For example, a dual function momentary switch which will automatically return the switch to the "neutral" position and requires the switch to be manually held down in the "up" or "down" position to activate the motor can be adapted for the present single switch application. To transport a wheelchair down to the ground from a vehicle, the lift switch is moved to the down position. The control will allow a door open output. The door limit will make and disable the door open output. The lift switch must be released and moved back to the down position to get a deploy output. The deploy limit makes and switches the deploy output to the lift down output. The floor limit makes and disables the down output. When the floor level limit is made the auto level will level the platform using the lift & level motor. The lift switch must be released and moved back to the down position to get a down output. The down-stop limit makes and switches the down output to the barrier deploy output.

To stow the powered platform, the lift switch is moved to the up position. The control will allow a barrier stow output. The barrier stow limit makes and switches the barrier stow output to the lift up output. When the barrier stow limit is made the auto level will level the platform using the lift & level motor. The floor limit makes and disables the lift up output. The lift switch must be released and moved back to the up position to get a lift up output. The up-stop limit breaks and switches the lift up output to the stow output. The stow limit makes and disables the stow output. The lift switch must be released and moved back to the up position to get a door close output.

Single Dual Function Switch. Manual Leveling

FIG. 49 shows the logic schematic of an embodiment wherein a powered platform of FIG. 27A is controlled by using a lift switch (preferably a single toggle switch) without autoleveling. The switch has three positions: an "up" position, a "neutral" position, and a "down" position. To transport a wheelchair from a vehicle to the ground, the lift switch is moved to the down position. The control will allow a door open output. The door limit will make and disable the door open output. The lift switch must be released and moved back to the down position to get a deploy output. The deploy limit makes and switches the deploy output to the lift down output. The floor limit makes and disables the down output. The lift switch must be released and moved back to the down position to get a down output. When the floor level limit is made the lift & level deploy or stow are enabled. The down-stop limit makes and switches the down output to the barrier deploy output.

Preferably the handrail has a leveling switch for adjusting the horizontal orientation (leveling) of the platform. To level the platform manually, the leveling switch can be put to the up or down position to pivot the platform to a desired horizontal position when the person is on the platform.

With the lift & level deploy or stow enabled by the floor limit switch, to stow the powered platform, the lift switch is moved to the up position by the user. The control will allow a barrier stow output. The barrier stow limit makes and switches the barrier stow output to the lift up output. When the barrier stow limit is made the lift & level deploy or stow are enabled. The floor limit makes and disables the lift up output. The lift switch must be released and moved back to the up position to get a lift up output. The up-stop limit breaks and switches the lift up output to the stow output. The stow limit makes and disables the stow output. The lift switch must be released and moved back to the up position to get a door close output.

Manual Switches for Operating the Powered Platform

As previously stated, the collapsible, powered platform of the present invention can be operated by manipulating a single switch. Of course, the powered platform can be operated by using a set of switches to control the various functions such as deploying the platform from a substantially vertical position to a substantially horizontal position, moving the platform up and down, adjusting the barrier, and the like.

Figure 51:
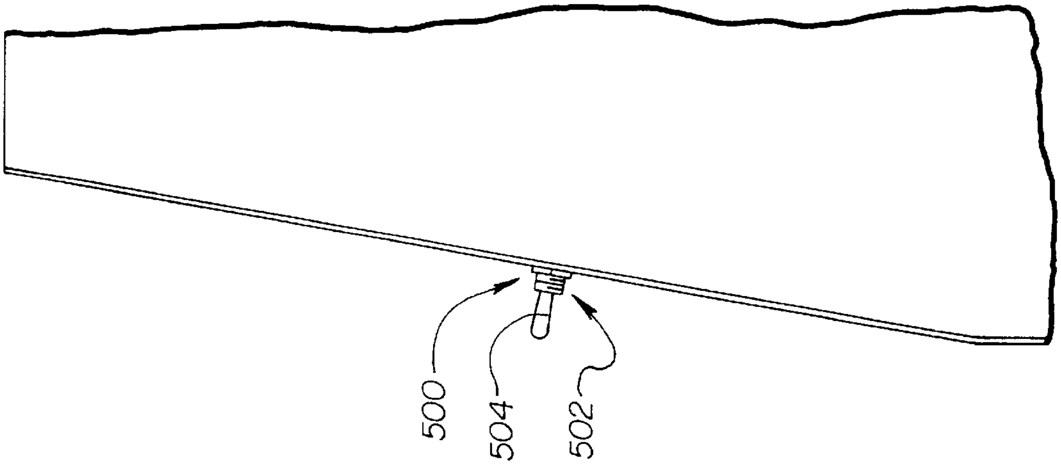
FIG. 51 shows a side elevation view of the control panel of FIG. 50.
Figure 50:
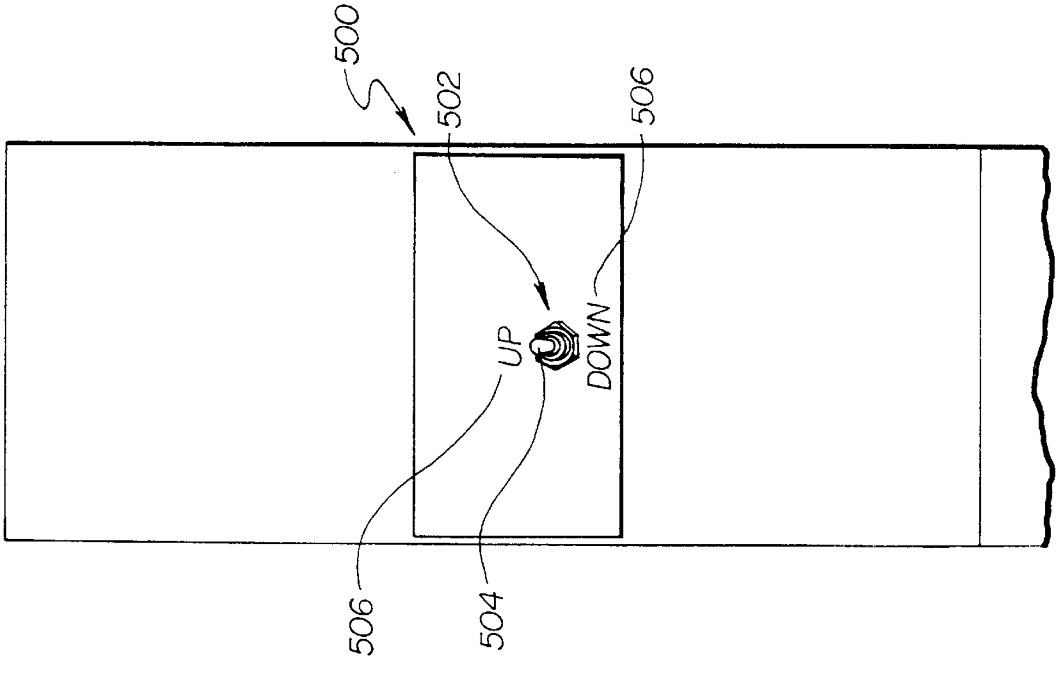
FIG. 50 shows the top elevation view of an embodiment of a control panel applicable for controlling the embodiment of FIG. 11 or FIG. 27A.

Referring to FIGS. 50 and 51, a control panel 500 which preferably includes a single dual function toggle switch 502 electrically connected to the circuitry of the powered platform can be used for operating the powered platform. The control panel 500 can be mounted, for example, on the housing or the hand rail of the powered platform. The toggle switch 502 has a stick 504 which can be flipped into one of (1) "up" (or "up sequence") position, (2) "down" (or "down sequence") position, and (3) "neutral" position. The neutral position renders the switch in a electrically disconnected state. The up position causes the raising and stowing of the lift. The down position causes the deploying and lowering of the lift. A label 506 having indicia indicates the position of the stick 504. The platform can be operated to progress through the different phases of movement for deploying the platform and lowering a wheelchair-bound person from the vehicle to the ground and the reciprocal action by using the single dual function switch 502. Preferably, the powered platform stops after the completion of certain phases and requires the stick 504 to be put to the neutral position (in the case the dual function switch is spring-loaded the switch is released to return to the neutral position) and reactivated before the next phase of movement can be initiated.

For example, to transport a wheelchair from the ground to the vehicle with manual leveling, the switch can be flipped to the up position to shut the distal barrier and raise the wheelchair to the vehicle floor level. The up motion of the platform can be stopped by returning the switch to the neutral position and the leveling can be adjusted by using the leveling control switch, which in using a single dual function switch for control, is preferably a separate switch located on the hand rail. After leveling has been completed, the up motion can be resumed to raise the platform to the vehicle floor level. After the wheelchair has been removed from the platform, to stow the platform, the stick 504 is put into the up position. The platform then pivots up until it is stopped by the activation of a limit switch, which requires the stick 504 to be put into the neutral position before the next phase of stowing can be initiated by putting the stick in the up position again. The platform stops moving after it has been stowed, requiring the stick 504 to be put into the neutral position before the powered door can be closed by putting the stick in the up position again. If desired, the control panel can be adapted with the appropriate circuitry to operate a platform with powered folding and unfolding of the platform.

Figure 53:
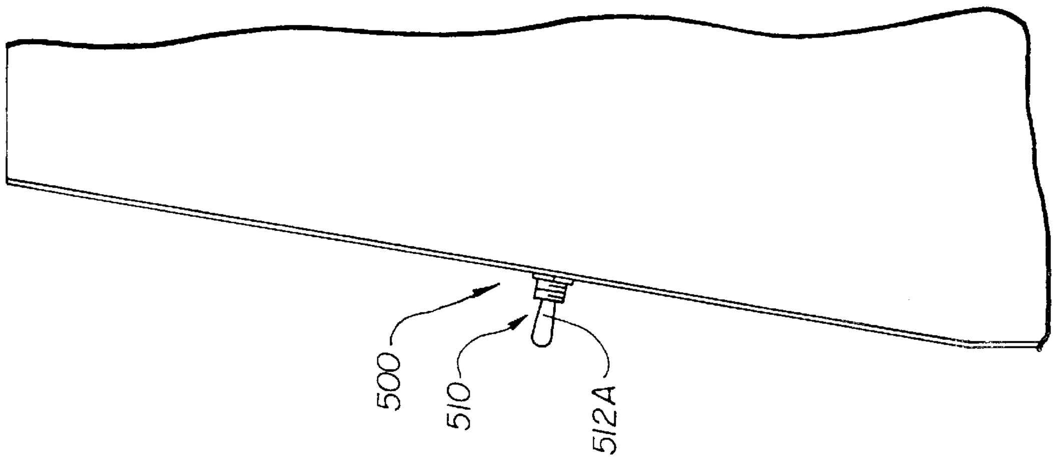
FIG. 53 shows a side elevation view of the control panel of FIG. 52.
Figure 52:
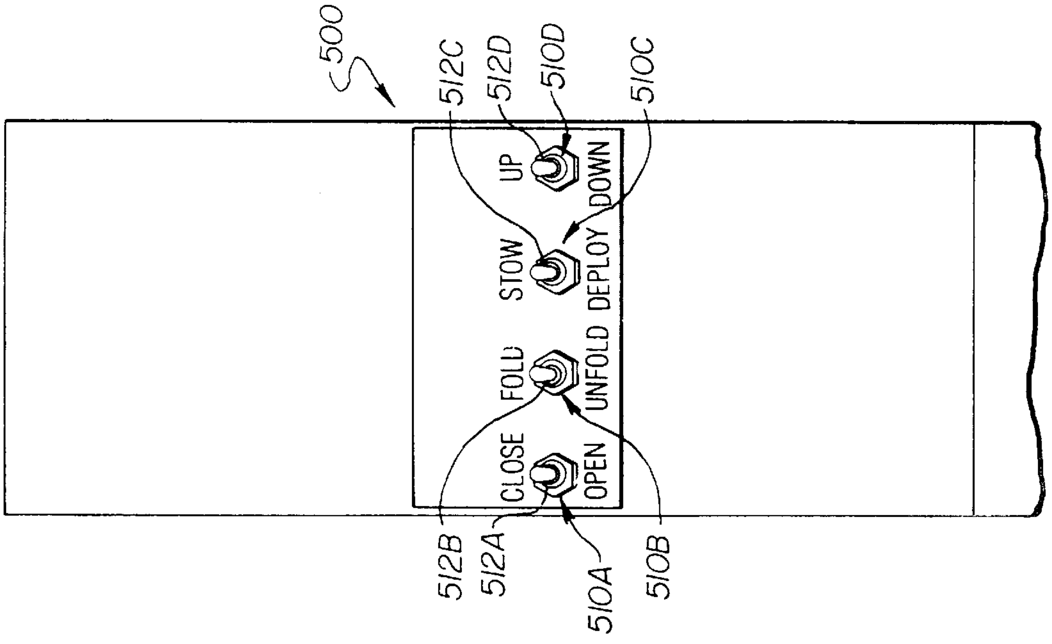
FIG. 52 shows the top elevation view of an alternative embodiment of a control panel applicable for controlling the embodiment of FIG. 11 or FIG. 27A.

Referring to FIGS. 52 and 53, the control panel 500 can have a plurality of dual function toggle switches 510, including close-open switch 510A, fold-unfold switch 510B, stow-deploy switch 510C, and up-down 510D. Each of the switches 510 has a stick 512A, 512B, 512C, and 512D for positioning the corresponding switches into a neutral position and two reciprocal activation positions, e.g. an up position and a down position. The close-open switch 510A is for opening and closing the vehicle door. The fold-unfold switch 510B is for the reciprocal folding-unfolding of the platform. The stow-deploy switch 510C is for the reciprocal stowing and deploying of the platform. The up-down switch 510D is for reciprocally raising or lowering the platform between two levels. The stow-deploy switch 510C can also be used to level the platform to a desired horizontal position.

If preferred, additional switches can be included to further divide the functions among the switches. For example, separate dual function switches can be used for deploying and stowing the platform and for leveling so as to safeguard against excessive tilting of the platform during leveling. Alternately, some of the functions can be controlled by a single switch. For example, the folding-unfolding and stowing-deploying can be controlled by one dual function switch. It is to be understood that the switch panel configuration of FIGS. 50–51 and FIGS. 52–53 can be modified to be applied to the various combinations of movement and control described hereinabove. Different indicia on the label can also be used if desired. The control panel 500 can also be adapted to operate a powered platform wherein the multi-sectional platform is folded and unfolded manually, with appropriate changes made in the indicia of the label if desired.

Figure 54:
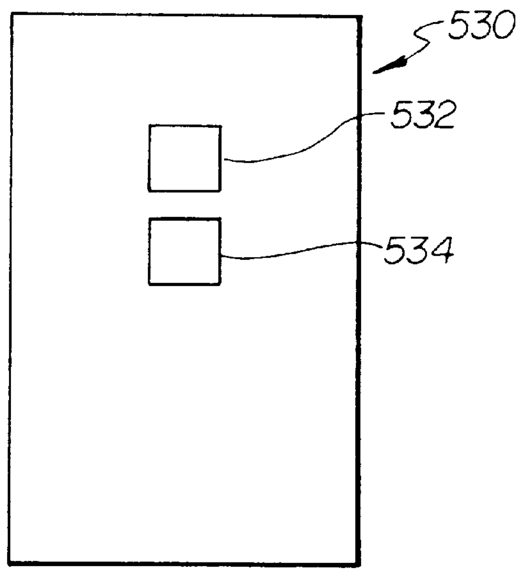
FIG. 54 shows the top elevation view of an embodiment of a hand-held remote control unit applicable for controlling the embodiment of FIG. 11 or FIG. 27A.

FIG. 54 shows an illustrative hand-held remote control unit that is used for operating the powered platform. The remote control unit 530 has two push-button switches (an "up" switch 532 and a "down" switch 534) each having a neutral position and an activation position. The push button switches 532 and 534 are each actuated by pressure. When the pressure is released from the button switches 532 and 534, the switches will spring back to a neutral position. The activation of the two push-button switches 532 and 534 corresponds to the activation of the dual function toggle switch of FIGS. 50–51 for the "up" and "down" functions. Standard electronic components and circuitry are used in the remote control unit and the powered platform for transmitting and receiving the electromagnetic wave signal to effectuate remote control. If desired, a remote control unit with a dual function momentary switch having a long stick for control can be mounted on a wheelchair so that the powered platform can be operated by even a severely handicapped person (e.g. a quadriplegic).

Figure 55:
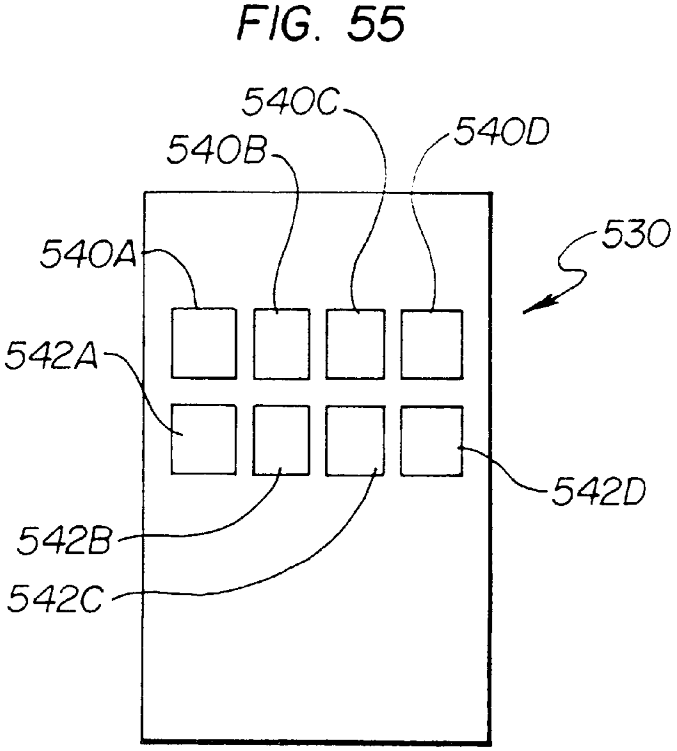
FIG. 55 shows the top elevation view of an alternative embodiment of a hand-held remote control unit applicable for controlling the embodiment of FIG. 11 or FIG. 27A.

Referring to FIG. 55, the remote control unit 530 has a plurality of push-button switches each having a neutral position and an activation position. The functioning of the push-button switch pairs 540A and 542A, 540B and 542B, 540C and 542C, 540D and 542D correspond to the functioning of the toggle switches 510A, 510B, 510C, and 510D respectively. Again, standard electronic components and circuitry can be used in the remote control unit and the powered platform for transmitting and receiving the electromagnetic wave signal to effectuate remote control.

Third Embodiment

Figure 56:
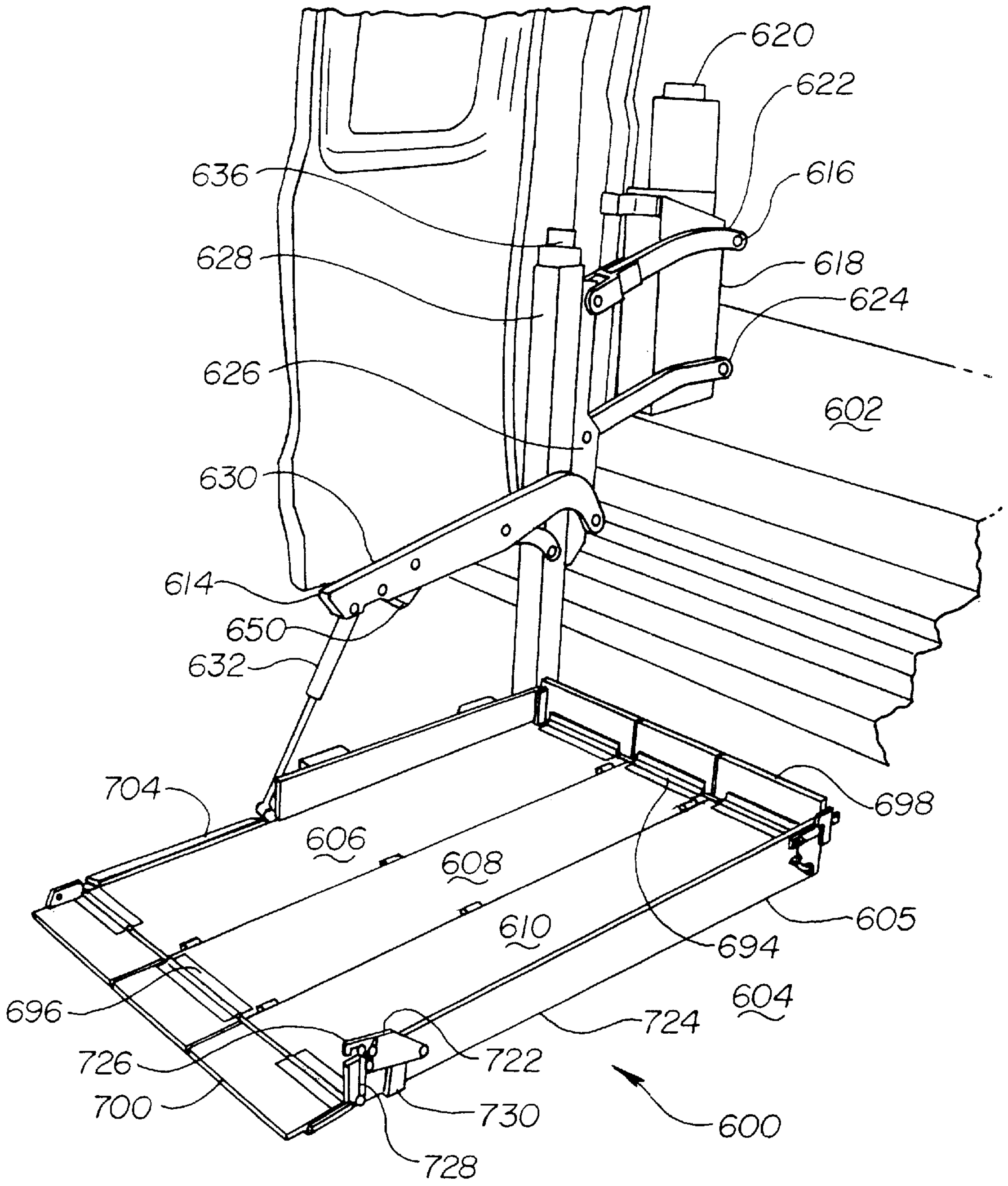
FIG. 56 shows a perspective view of an alternative powered platform constructed in accordance with the principles of the present invention.

FIG. 56 shows an alternative powered platform 600 constructed in accordance with the principles of the present invention. As previously described with respect the first and second platform embodiments, the powered platform 600 is preferably used to move an object, such as a wheelchair, between an upper position (typically adjacent a vehicle floor surface 602) and a lower position (typically at ground level 604). The powered platform 600 preferably includes a platform 605 having first, second and third sections 606, 608, 610 which are pivotally connected. The platform 605 is selectively moved between a unfolded orientation in which the sections 606, 608, 610 are substantially co-planar (as shown in FIG. 56) and a folded orientation in which the sections form a compact configuration (as previously described with respect to the first and second powered platform embodiments and shown in FIGS. 1 and 8). The powered platform 600 also preferably includes a folding assembly 612 (shown in FIG. 58) for selectively moving the sections 606, 608, 610 of the platform 605 between the folded orientation and the unfolded orientation, a deployment assembly 614 for selectively rotating the platform 605 between a substantially vertical orientation (as previously described with respect to the first and second powered platform embodiments and shown in FIG. 2) and a substantially horizontal orientation (as shown in FIG. 56), and a lift assembly 616 for moving the platform 605 between the upper position and the lower position.

Lift Assembly

As shown in FIG. 56, the lift assembly 616 of the powered platform 600 has essentially the same construction as the lift assembly employed by the powered platform illustrated in FIGS. 27A and 27B. The lift assembly 616 preferably includes a substantially vertical lift housing 618 which is rigidly mounted to the vehicle floor surface 602. An up-down motor 620 is mounted on the lift housing 618 and preferably drives an upper pivot arm 622 and a lower pivot arm 624 in a manner previously described with respect to the powered platform illustrated in FIGS. 27A and 27B. The first and second pivot arms 622 and 624 are preferably pivotally connected to a vertical channel beam 626 which is rigidly attached to a substantially vertical deployment housing 628. The deployment housing 628 is pivotally connected at its lower end to the platform 605. By selectively activating the up-down motor 620, the first and second pivot arms 622 and 624 of the lift assembly 616 are driven such that the platform 605 is selectively moved vertically between the upper position and the lower position.

Deployment Assembly

As described above, the deployment assembly 614 of the powered platform 600 selectively moves the platform 605 between the substantially vertical orientation and the substantially horizontal orientation. The deployment assembly 614 preferably includes a handrail 630 pivotally connected at one end to the vertical channel beam 626. The other end of the handrail 630 is pivotally connected to a platform linkage 632 which pivotally connects the handrail 630 to the platform 605. The deployment assembly 614 also preferably includes a deployment drive mechanism 634 for controlling rotation of the handrail 630 between a first generally downward direction and a second generally upward direction.

Figure 57:
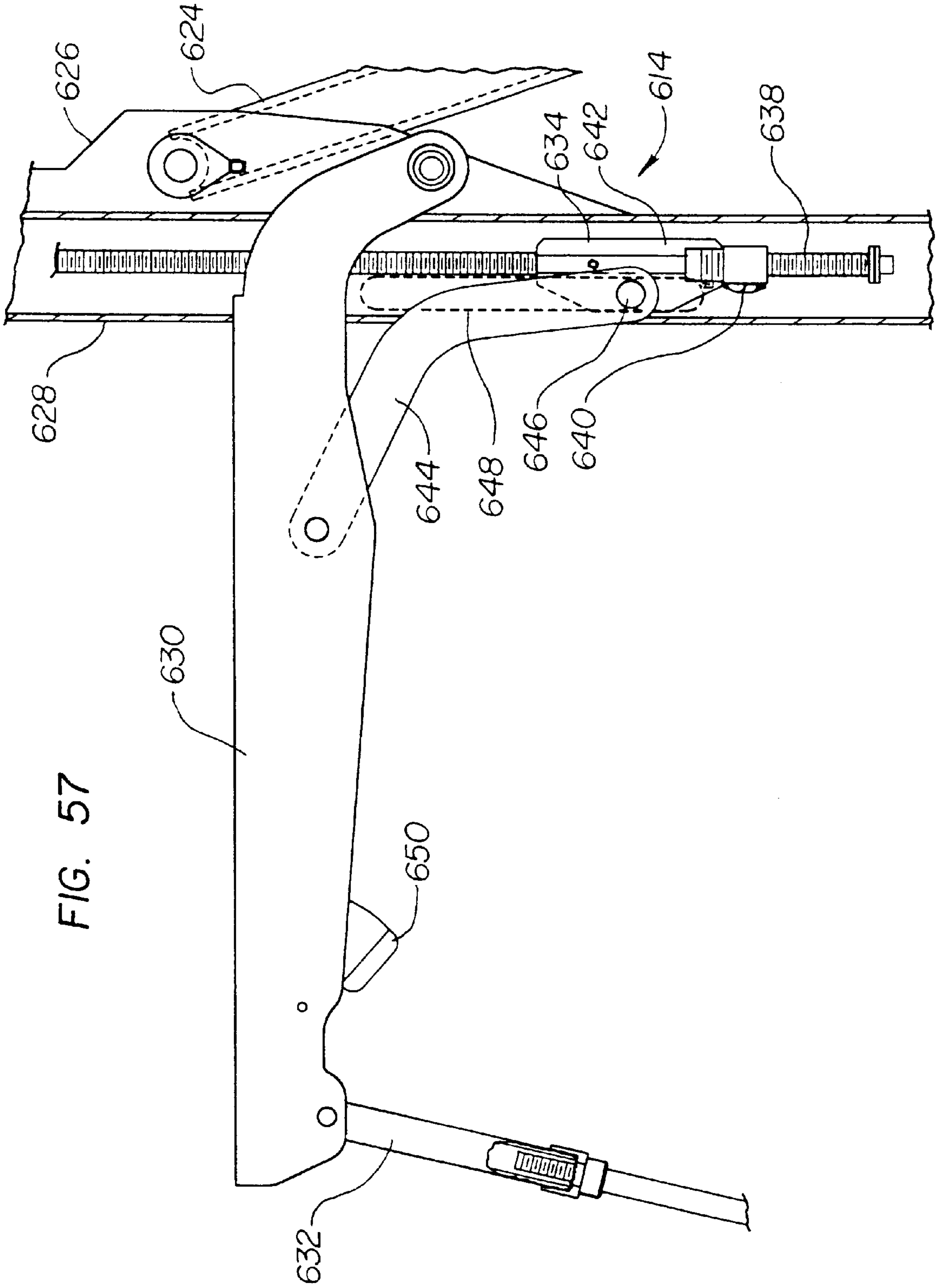
FIG. 57 shows a side view of a deployment assembly employed by the powered platform of FIG. 56.

The deployment drive mechanism 634 preferably includes a deployment actuator 636, also called a stow/deploy motor and is typically a DC motor, which is mounted on the deployment housing 628. The deployment actuator 636 selectively rotates a deployment lead screw 638 which is aligned within the deployment housing 628 as shown in FIG. 57. A ball nut 640 is threadingly mounted on the deployment lead screw 638 such that when the lead screw 638 is rotated in one direction, the ball nut 640 is driven upward along the lead screw 638, and when the lead screw 638 is rotated in the opposite direction, the ball nut 640 is driven downward along the lead screw 638.

A slide block 642 is rigidly connected to the ball nut 640 such that the ball nut 640 drives the slide block 642 upward and downward along the lead screw 638. The slide block 642 is mounted on a set of guides which hold the slide block 642 in place as it is moved upward or downward along the lead screw 638 by the ball nut 640. An elbow shaped handrail linkage 644 pivotally connects the slide block 642 to the handrail 630. One end of the handrail linkage 644 is pivotally connected to the slide block 642 by a pivot pin 646. The pivot pin 646 has a portion which extends within a substantially vertical slot 648 in the deployment housing 628 such that the range of vertical motion of the slide block 642 is limited by contact of the pivot pin 646 with the upper and lower ends of the slot 648. The other end of the elbow shaped handrail linkage 644 is pivotally connected to the handrail 630.

The deployment assembly 614 also preferably includes a platform kick-out 650 which is attached to the handrail 630 adjacent the platform linkage 632. The platform kick-out 650 is preferably constructed of a resilient highly elastic/compressible material such as rubber or may be spring loaded. When the platform 605 is in the substantially vertical orientation, the platform kick-out 650 is compressed between the handrail 630 and the platform linkage 632 such that the platform kick-out 650 exerts a compressive reactionary force against the handrail linkage 632 which assists in initially deploying the platform 605 from the substantially vertical position.

The following is a description of the stowing and deployment operation of the deployment assembly 614 starting from when the platform 605 is in the substantially vertical position. When the platform 605 is in the substantially vertical position, the handrail 630 is pivoted upward relative to the vertical channel beam 626 such that the handrail 630 is generally vertical and generally parallel to the vertical channel beam 626. Similarly, the platform linkage 632 is pivoted toward the handrail 630 such that the handrail 630 and the platform linkage 632 are generally parallel and the platform kick-out 650 is compressed between the platform linkage 632 and the handrail 630. Additionally, the platform 605 is rotated upward relative to the deployment housing

628 such that the platform 605 and the deployment housing 628 are substantially parallel.

To rotate the platform 605 from the substantially vertical orientation toward the substantially horizontal orientation, the deployment actuator 636 rotates the deployment lead screw 638 in a direction such that the ball nut 640 drives the slide block 642 downward along the lead screw 638. As the slide block 642 moves downward, the elbow shaped handrail linkage 644 causes the handrail 630 to rotate in the first generally downward direction. The initial rotation of the handrail 630 is assisted by the compressive force exerted by the platform kick-out 650. As the handrail 630 is rotated in the first generally downward direction, the platform 605 is concurrently rotated in drawbridge fashion outward from the deployment housing 628 and toward the generally horizontal orientation. As the platform 605 rotates away from the vertical orientation, the force of gravity pulls the platform 605 downward toward the horizontal orientation. The downward rotation of the platform 605 caused by gravity is restrained and controlled by the platform linkage 632 and handrail 630 which are allowed to rotate slowly in the first generally downward direction by the deployment drive mechanism 634. Specifically, the downward rotation of the handrail 630 is controlled by its connection to the elbow shaped handrail linkage 644, the movement of which is in turn controlled by the movement of the slide block 642 on along the lead screw 638.

When the platform 605 reaches the substantially horizontal orientation, as shown in FIG. 56, the platform 605 and the handrail 630 are each substantially horizontal. Additionally, the platform linkage 632 extends between the platform 605 and the handrail 630 and preferably forms a slightly acute angle with respect to the platform 605.

To rotate the platform 605 from the substantially horizontal orientation toward the substantially vertical orientation, the deployment actuator 636 rotates the deployment lead screw 638 in a direction such that the ball nut 640 drives the slide block 642 upward along the lead screw 638. As the slide block 642 moves upward, the elbow shaped handrail linkage 644 causes the handrail 630 to rotate in the second generally upward direction. As the handrail 630 is driven upward by the handrail linkage 644 of the deployment drive mechanism 634, the handrail 630 exerts an upward force on the platform linkage 632 which pulls the platform 605 from the generally horizontal orientation toward the generally vertical orientation. The handrail 630 is continuously driven upward by the deployment drive mechanism 634 until the handrail 630, the platform linkage 632 and the platform are substantially vertical. When the platform 605 is in the substantially vertical orientation, the platform kick-out 650 is compressed between the handrail 630 and the platform linkage 632.

Folding Assembly

Figure 58:
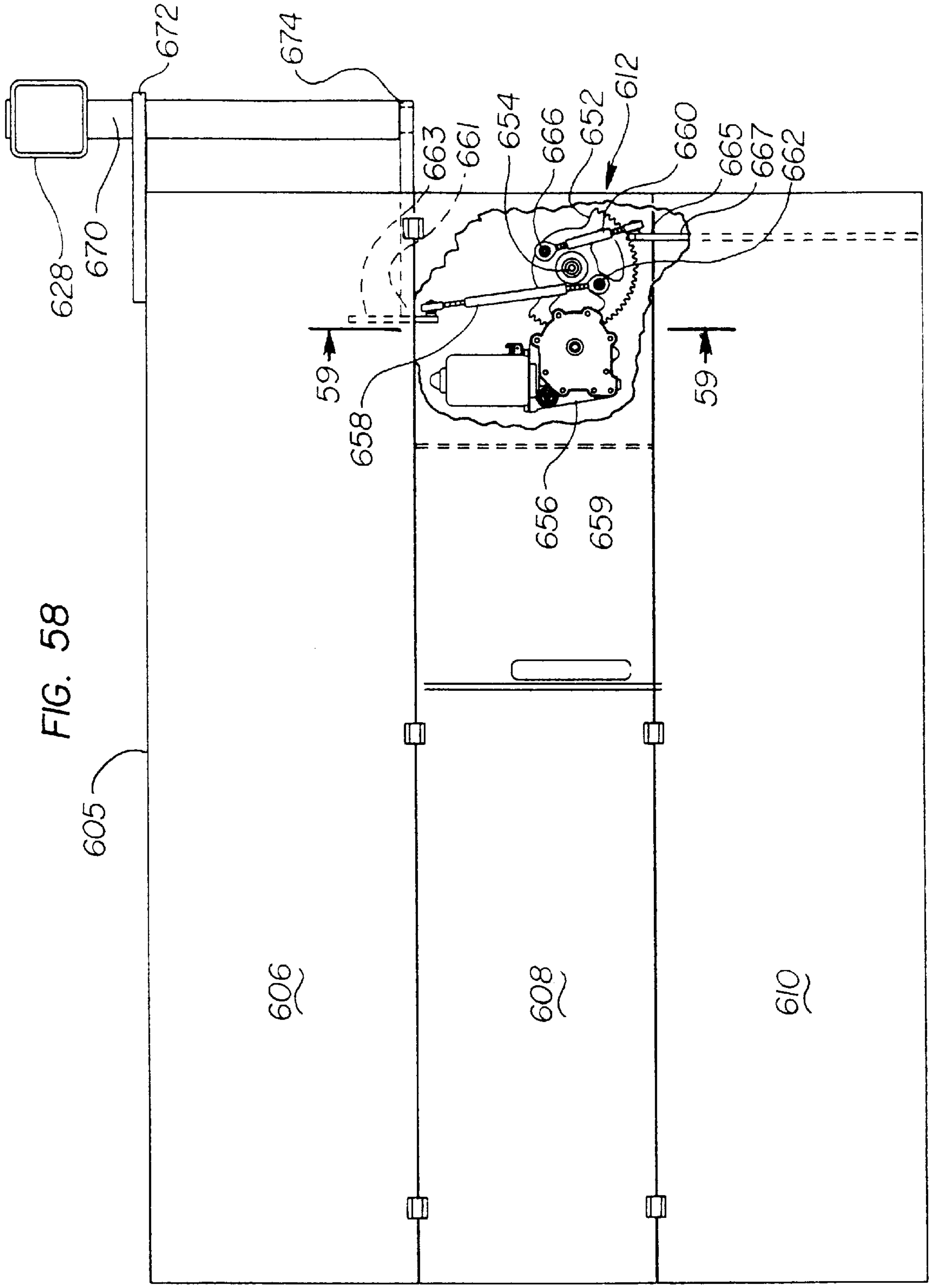
FIG. 58 shows a top cut away view of a folding assembly employed by the powered platform of FIG. 56.

As described above, the folding assembly 612 of the powered platform 600 selectively moves the sections 606, 608, 610 of the platform 605 between the folded orientation and the unfolded orientation. The folding assembly 612 preferably is mounted to the underside of the platform 605 such that the folding assembly 612 does not interfere with the trodden upper surface of the platform 605. As shown in FIG. 58, the folding assembly 612 preferably includes a driven member, such as a gear 652, which is pivotally connected to the second section 608 of the platform 605. The gear 652 is rotatable about an axis 654 which is generally perpendicular to the second section 608. The gear 652 is selectively rotated in a first direction (counterclockwise as shown in FIG. 58) and a second direction (clockwise as shown in FIG. 58) by a folding drive motor 656, such as a DC motor, which is also mounted to the underside of the second section 608 of the platform 605.

Figure 59:
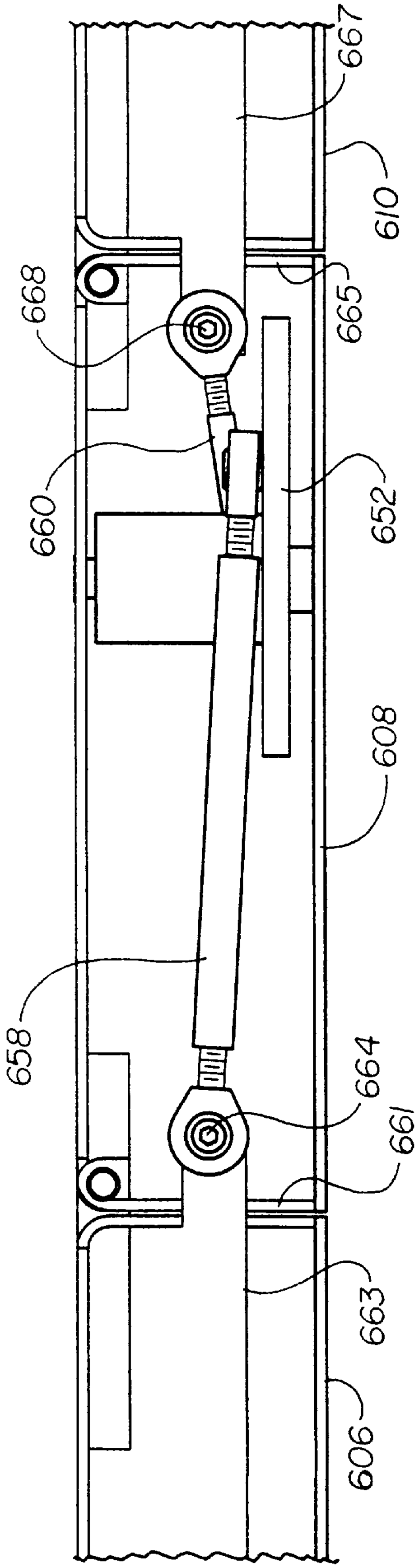
FIG. 59 shows a sectional view of FIG. 58 taken along section line 58—58.

As shown in FIGS. 58 and 59, the folding assembly 612 also includes a first fold linkage 658 and a second fold linkage 660 which are generally parallel and aligned on opposite sides of pivot axis 654. The first fold linkage 658 pivotally connects the gear 652 to the first section 606 of the platform 605. Preferably, one end of the first fold linkage 658 is pivotally connected to the gear 652 and is rotatable about an axis 662 which is generally perpendicular to the second section 608. Preferably, the other end of the first fold linkage 658 is pivotally connected to a pivot member 663 welded to the first section 606 and is rotatable about an axis 664 which is generally parallel to the second section 608. A slot 661 in the corresponding edge of the second section 608 allows the pivot member 663 and the first fold linkage 658 extend between the first and second sections 606, 608 and to pivot relative to each other without physically interfering with the pivotal relationship between the first and second sections 606, 608.

The second fold linkage 660 pivotally connects the gear 652 to the third section 610 of the platform 605. Preferably, one end of the second fold linkage 660 is pivotally connected to the gear 652 and is rotatable about an axis 666 which is generally perpendicular to the second section 608. Preferably, the other end of the second fold linkage 660 is pivotally connected to a pivot member 667 welded to the third section 610 and is rotatable about an axis 668 which is generally parallel to the second section 608. A slot 665 in the corresponding edge of the second section 608 allows the pivot member 667 and the second fold linkage 660 to extend between the second and third sections 608, 610 and to pivot relative to each other without physically interfering with the second and third sections 608, 610.

As shown in FIG. 58, the deployment housing 628 is pivotally connected to the platform 605 by a pivot pin 670 which is joined to the platform 605 by a pair of linking members 672 and 674 welded to the first section 606 of the platform 605. The linking members 672 and 674 prevent the first section 606 of the platform 605 from being folded or longitudinally pivoted by the folding assembly 612.

Figure 8:
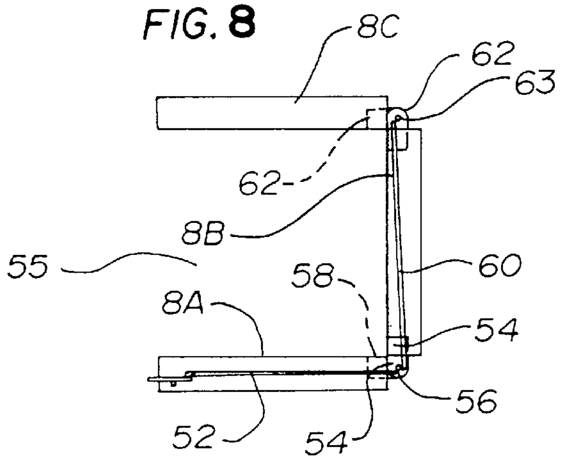
FIG. 8 is a top schematic view of the sections of the platform in the folded, stowed configuration.

In operation, the folding assembly 612 selectively moves the sections 606, 608, 610 of the platform between the unfolded orientation (shown in FIG. 56) and the folded orientation (shown in FIGS. 1 and 8). When moving the sections 606, 608, 610 from the folded orientation toward the unfolded orientation, the folding drive motor 656 rotates the gear 652 in the first direction (counterclockwise as shown in FIG. 58). As the gear 652 rotates in the first direction the first fold linkage 658 pulls the second section 608 toward the first section 606 thereby causing the second section 608 to longitudinally fold away from the first section 606. Simultaneously, as the gear 652 rotates in the first direction the second fold linkage 660 pulls the third section 610 toward the second section 608 thereby causing the third section 610 to longitudinally fold away from the second section 608. The gear 652 continues to rotate in the first direction until the fold linkages 658, 660 fold the sections 606, 608, 610 into the planar unfolded orientation.

When moving the sections 606, 608, 610 from the unfolded orientation toward the folded orientation, the folding drive motor 565 rotates the gear 652 in the second direction (clockwise as shown in FIG. 58). As the gear 652 rotates in the second direction the first fold linkage 658 pushes the second section 608 away from the first section 606 thereby causing the second section 608 to longitudinally fold toward the first section 606. Simultaneously, as the gear 652 rotates in the second direction the second fold linkage 660 pushes the third section 610 away from the second section 608 thereby causing the third section 610 to longitudinally fold toward the second section 608. The gear 652 continues to rotate in the second direction until the fold linkages 658, 660 fold the sections 606, 608, 610 into the compact folded orientation.

Manual Release Mechanism

Figure 60:
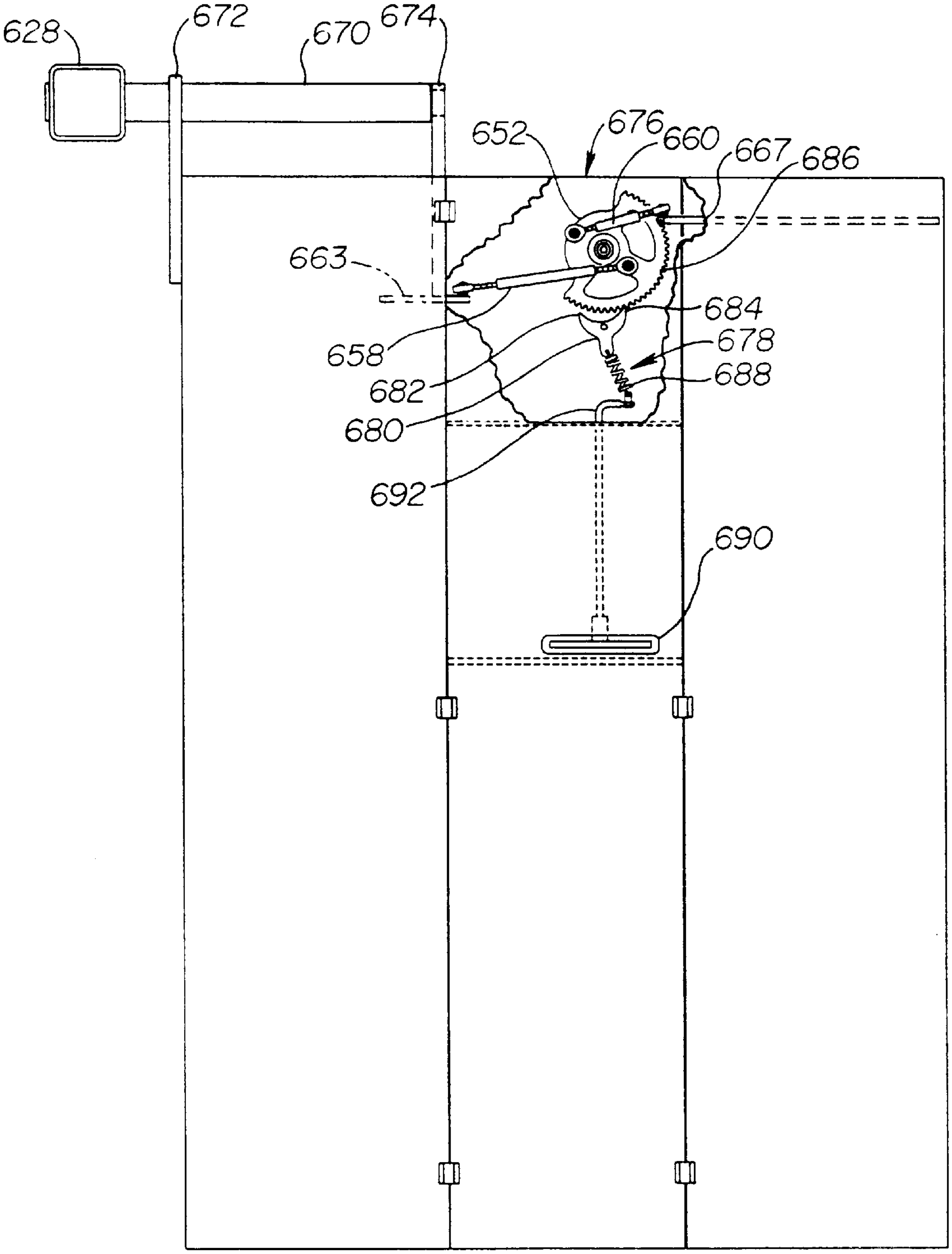
FIG. 60 shows a top cut away view of a manual release mechanism employed by the powered platform of FIG. 56.

It will be appreciated that the powered platform 600 may be equipped with a manual release mechanism 676 for allowing the platform 605 to be manually moved between the folded orientation and the unfolded orientation. As shown in FIG. 60, the manual release mechanism 676 has the same construction as the folding assembly 612 except that the folding drive motor 656 has been replaced by a locking switch 678. The locking switch 678 includes a locking member 680 which is pivotally connected to the underside of the platform 605. The locking member 680 has first and second pawls 682 and 684 which selectively engage the teeth 686 of the gear 652. The locking switch 678 also includes a spring 688 which connects the locking member 680 to a handle 690 having a curved extension member 692. The handle 690 is manually rotatable between a first position in which the curved extension member 692 causes the first pawl 682 to engage the teeth 686 of the gear 652 and a second position (as shown in FIG. 60) rotated 180 degrees from the first position in which the curved extension member 692 causes the second pawl 684 to engage the teeth 686 of the gear 652.

It will be appreciated that when the platform 605 is manually moved from the folded orientation toward the unfolded orientation, the first and second folding linkages 658, 660 cause the gear 652 to rotate in the first direction (counterclockwise as shown in FIG. 60). Similarly, when the platform 605 is manually moved from the unfolded orientation toward the folded orientation, the first and second folding linkages 658, 660 cause the gear 652 to rotate in the second direction (clockwise as shown in FIG. 60).

When the handle 690 is in the first position, the first pawl 682 allows the gear 652 to rotate in the second direction (clockwise as shown in FIG. 60) but prevents the gear 652 from rotating in the first direction (counterclockwise as shown in FIG. 60). The gear 652 is allowed to rotate in the second direction because the first pawl 682 slides over the teeth 686 of the gear 652 as the gear 652 is rotated. The gear 652 is prevented from rotating in the first direction because the first pawl 682 catches in the teeth 686 of the gear 652 thereby stopping any rotation. Therefore, when the handle 690 is in the first position, the platform 605 can be manually moved from the unfolded orientation toward the folded orientation (causing the gear 652 to rotate in the second direction) because the first pawl 682 allows the gear 652 to rotate in the second direction. However, when the handle 690 is in the first position, the platform 605 can not be manually moved from the folded orientation toward the unfolded orientation (causing the gear 652 to rotate in the first direction) because the first pawl 682 locks the gear 652 thereby preventing the gear 652 from rotating in the first direction.

When the handle 690 is in the second position, the second pawl 684 allows the gear 652 to rotate in the first direction (counterclockwise as shown in FIG. 60) but prevents the gear 652 from rotating in the second direction (clockwise as shown in FIG. 60). The gear 652 is allowed to rotate in the first direction because the second pawl 684 slides over the teeth 686 of the gear 652 as the gear 652 is rotated. The gear 652 is prevented from rotating in the second direction because the second pawl 684 catches in the teeth 686 of the gear 652 thereby stopping any rotation. Therefore, when the handle 690 is in the second position, the platform 605 can be manually moved from the folded orientation toward the unfolded orientation (causing the gear 652 to rotate in the first direction) because the second pawl 684 allows the gear 652 to rotate in the first direction. However, when the handle 690 is in the second position, the platform 605 can not be manually moved from the unfolded orientation toward the folded orientation (causing the gear 652 to rotate in the second direction) because the second pawl 684 locks the gear 652 thereby preventing the gear 652 from rotating in the second direction.

Distal and Proximal Barriers

As shown in FIG. 56, the powered platform 600 has a proximal edge 694 and a distal edge 696. The powered platform 600 also preferably includes a proximal barrier 698 positioned along the proximal edge 694 and a distal barrier 700 positioned along the distal edge 696. The barriers 698, 700 have the same construction as the barriers previously described with respect to the first and second powered platform embodiments and are selectively pivotally moveable between opened and closed positions. When the barriers 698, 700 are in the closed or "up" position, they retain an object such as a wheelchair on the platform 605 as the object is being moved by the powered platform 600. When the platform 605 is at the lower position (adjacent ground level 604), the distal barrier 700 preferably pivots to the open or "down" position (as shown in FIG. 56) thereby facilitating loading the object onto the platform 605 or removing the object from the platform 605. Similarly, when the platform is at the upper position (adjacent the vehicle floor surface 602), the proximal barrier 698 preferably pivots to the open or "down" position thereby facilitating loading the object onto the platform 605 or removing the object from the platform 605.

Figures 61, 62:
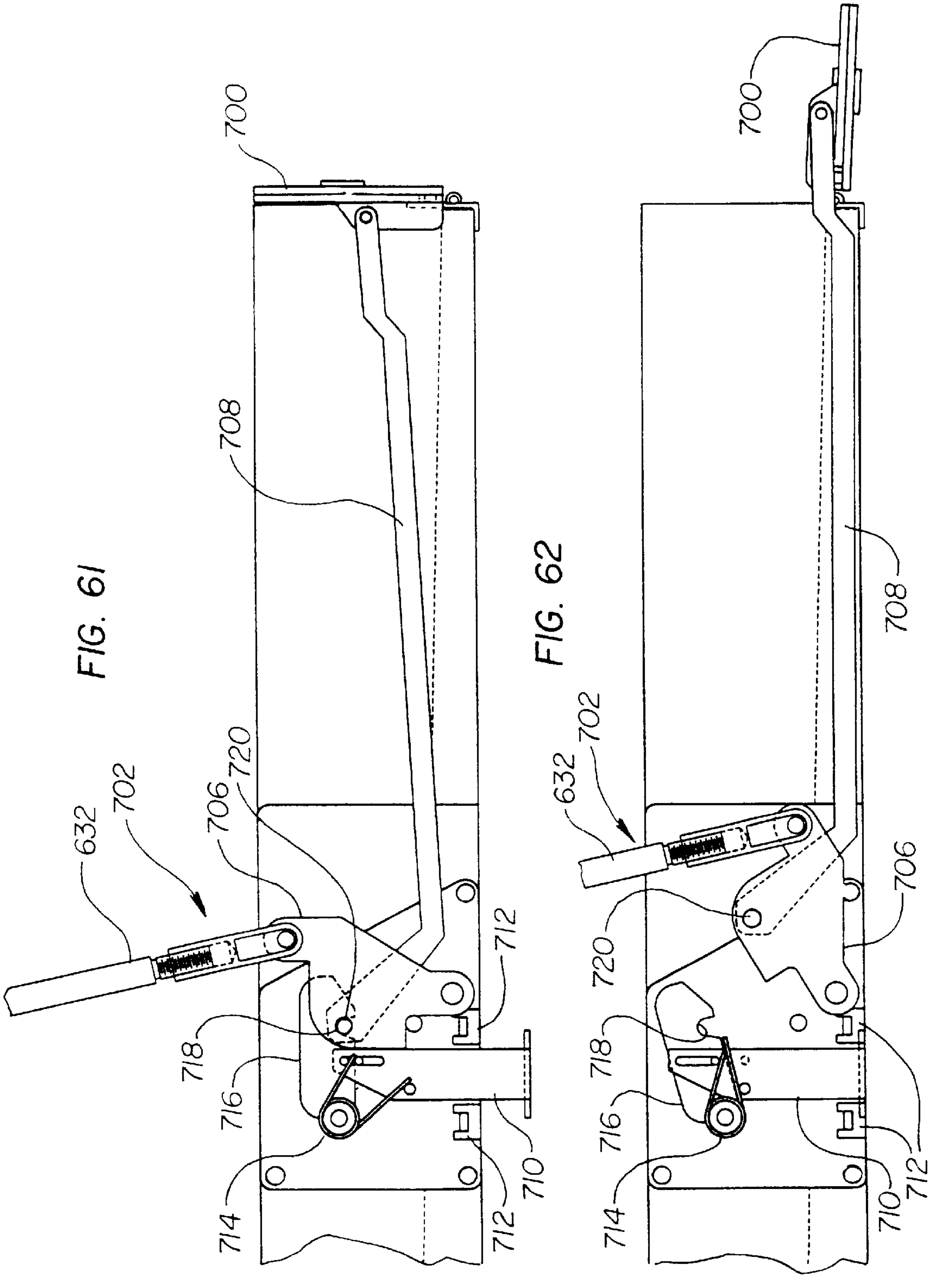
FIG. 61 shows a side view of a distal barrier drive mechanism employed by the powered platform of FIG. 56, the distal barrier is shown in the closed position.
FIG. 62 shows a side view of a distal barrier drive mechanism employed by the powered platform of FIG. 56, the distal barrier is shown in the open position.
Figure 63:
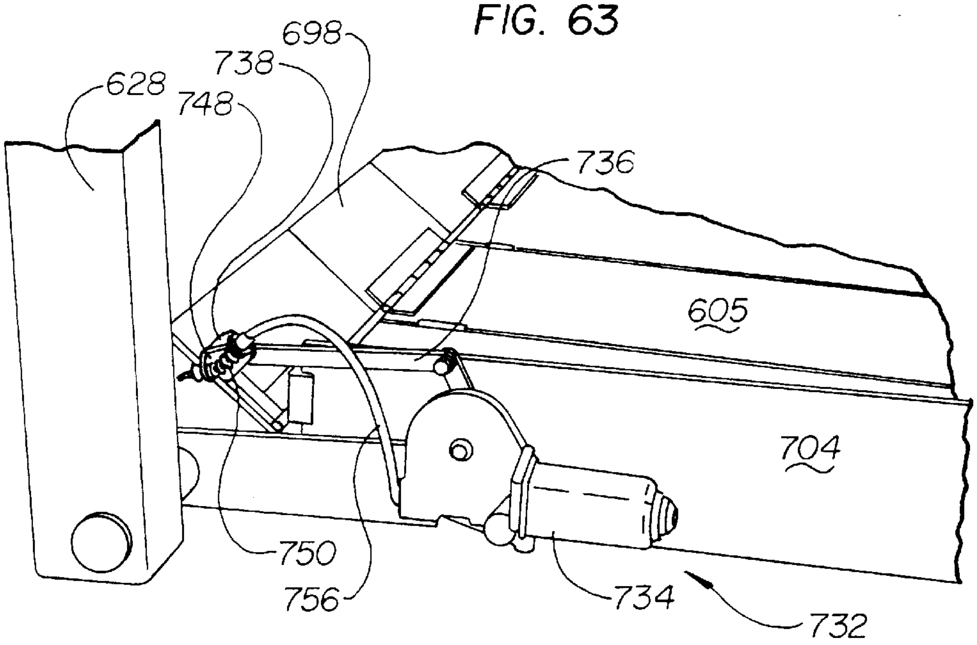
FIG. 63 shows a side view of a proximal barrier drive mechanism employed by the powered platform of FIG. 56, the proximal barrier is shown in the process of being opened.
Figure 64:
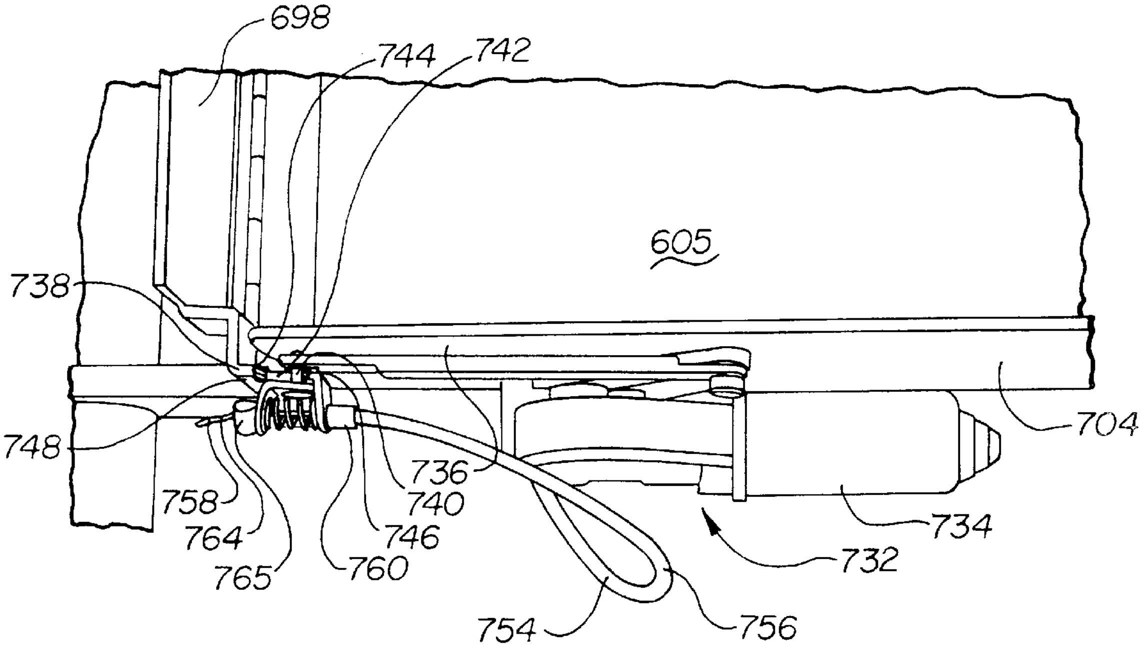
FIG. 64 shows a top view of a proximal barrier drive mechanism employed by the powered platform of FIG. 56, the proximal barrier is shown in the closed position.
Figure 65:
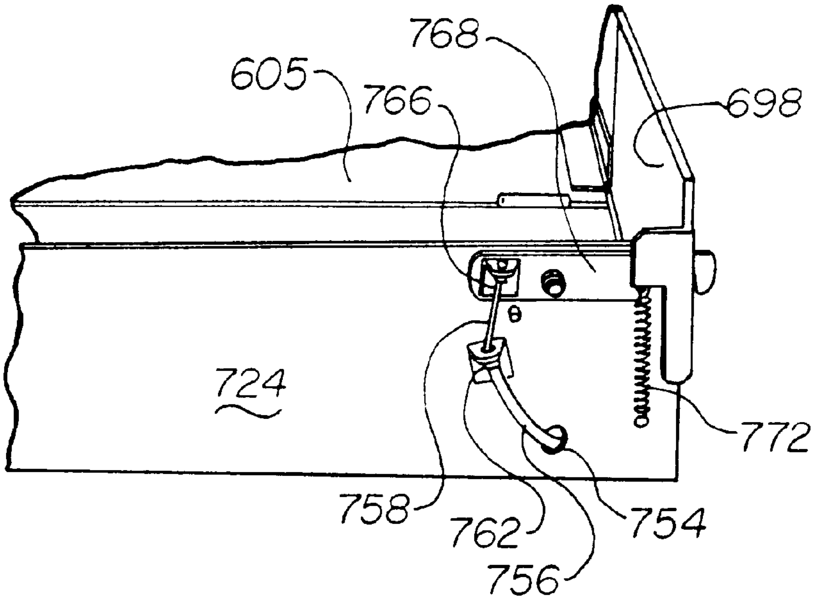
FIG. 65 shows a side view of a proximal barrier latch employed by the powered platform of FIG. 56, the proximal barrier is shown in the closed position.
Figure 66:
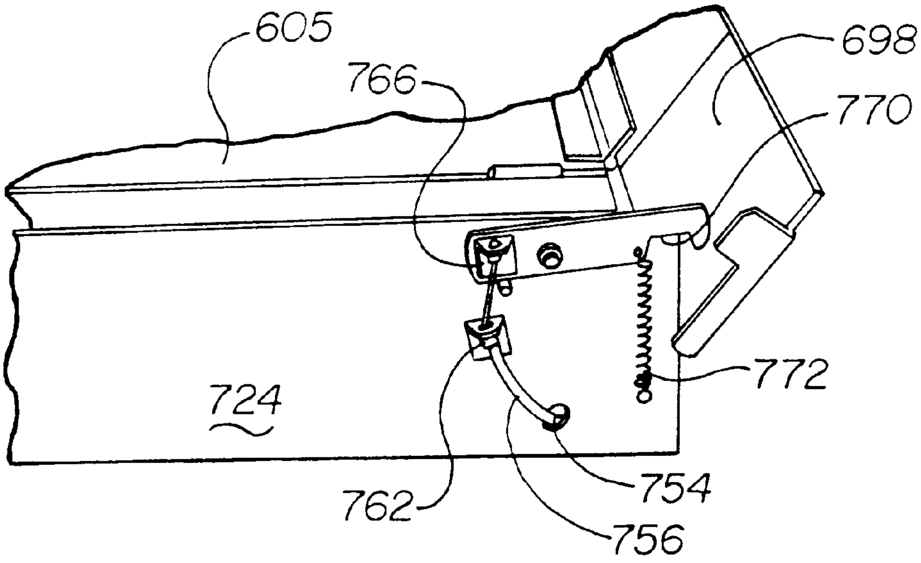
FIG. 66 shows a side view of a proximal barrier latch employed by the powered platform of FIG. 56, the proximal barrier is shown in the process of being opened.

As shown in FIGS. 61 and 62, powered platform 600 includes a distal barrier drive assembly 702 for selectively pivoting the distal barrier 700 between the open and closed positions. Adjacent a first side 704 of the platform 605, the platform linkage 632 of the deployment assembly 614 pivotally connects to the distal barrier drive assembly 702. As shown in FIGS. 61 and 62, the platform linkage 632 pivotally connects to a distal barrier cam 706 which is pivotally connected to the first side 704 of the platform 605. A distal barrier drive member 708 pivotally connects the distal barrier cam 706 to the distal barrier 700.

The distal barrier cam 706 is pivotally moved by the platform linkage 632 between a first position (as shown in FIG. 61) and a second position (as shown in FIG. 62). In the first position, the distal barrier cam 706 and corresponding distal barrier drive member 708 hold the distal barrier 700 in the closed position. In the second position, the distal barrier cam 706 and corresponding distal barrier drive member 708 push the distal barrier 700 into the open position.

The distal barrier drive assembly 702 also includes a first distal barrier foot 710 mounted between a pair of lift guides 712 which are connected to the first side 704 of the platform 605. The first distal barrier foot 710 is free to slide between the lift guides 712 but is biased downwardly by a first distal barrier spring 714.

The first distal barrier foot 710 is pivotally connected to a first distal barrier latch 716. The first distal barrier latch

716 has a slot 718 which mates with a cam pin 720 on the distal barrier cam 706 when the distal barrier cam 706 is in the first position (as shown in FIG. 61). When the cam pin 720 engages the slot 718, the cam 706 is locked in the first position.

As shown in FIG. 56 , the distal barrier drive assembly 702 further includes a second distal barrier latch 722 pivotally connected to a second side 724 of the platform 605. The second distal barrier latch 722 has a slot 726 for engaging and securing the distal barrier 700 when the distal barrier 700 is in the closed position. A second distal barrier spring 728 is connected to the latch 722 for downwardly biasing the latch 722. A second distal barrier foot 730 is connected to the latch 722 for lifting the latch 722 when the platform 605 reaches the lower position (adjacent ground level 604).

In operation, when the platform 605 is in any position except the lower position (adjacent ground level 604) the distal barrier 700 is locked in the closed position by the first and second distal barrier latches 716, 722. However, when the platform 605 reaches the lower position (adjacent ground level 604), the first and second distal barrier feet 710, 730 are forced to slide upward by the ground surface 604. When the first and second distal barrier feet 710, 730 slide upward, they move the first and second distal barrier latches 716, 722 upward thereby disengaging the first distal barrier slot 718 from the cam pin 720 and also disengaging the second distal barrier slot 726 from the distal barrier 700. Once the latches 716, 722 are raised, the platform linkage 632 (driven by the deployment actuator 636) pivots the distal barrier cam 706 from the first position to the second position thereby causing the distal barrier drive member 708 to push the distal barrier 700 from the closed position to the open position.

When the platform 605 is ready to be moved upward from the lower position, the platform linkage 632 is pulled upward by the deployment actuator 636 via the handrail 630 causing the distal barrier cam 706 to rotate from the second position to the first position. As the cam 706 rotates toward the first position, the cam 706 causes the distal barrier drive member 708 to pull the distal barrier 700 from the open position to the closed position. Once the distal barrier 700 is closed, the platform is lifted upward from the lower position by the lift assembly 616. As the platform 605 is raised above ground level 604, the first and second distal barrier springs 714, 728 bias the first and second distal barrier latches 716, 722 downwardly such that the distal barrier 700 is locked in the closed position.

As shown in FIGS. 63–66, the proximal barrier 698 is pivotally moved between the closed and open positions by a proximal barrier drive mechanism 732. The proximal barrier drive mechanism 732 includes a proximal barrier drive motor 734 connected to the platform adjacent the first side 704. A proximal barrier drive member 736 pivotally connects the drive motor 734 to a flange 738 preferably bolted to the proximal barrier 698. The drive member 736 is pivotally connected to the flange 738 by a pivot pin 740 which extends through a longitudinal slot 742 in the flange 738. The longitudinal slot 742 has a proximal end 744 proximate the proximal barrier 698 and a distal end 746 distal from the proximal barrier 698. An L-shaped member 748 is also connected to the flange 738 by the pivot pin 740. A cable spring 750 is positioned between the L-shaped member 748 and an end portion 752 of the flange 738.

The pivot pin 740 is longitudinally moved along the slot 742 by the drive member 736. When the proximal barrier 698 is closed, the pivot pin 740 is located at the distal end 746 of the slot 742 such that the cable spring 750 is compressed between the L-shaped member 748 and the end portion 752 of the flange 738. When the proximal barrier 698 is opened, the pivot pin 740 moves from the distal end 746 of the slot 742 to the proximal end 744 of the slot 742 causing the L-shaped member 748 to slide along the slot 742 toward the proximal barrier 698 thereby allowing the spring 750 to expand and hold the pivot pin 740 against the proximal end 742 of the slot 740.

The proximal barrier drive mechanism 732 also includes a cable 754, such as a conventional bicycle cable, extending beneath the platform 605. The cable 754 includes an outer casing 756 and an inner wire 758. The outer casing 756 has a first end 760 connected to the end portion 752 of the flange 738 and a second end 762 connected to the second side 724 of the platform 605. The inner wire 758 has a first end portion 764 which extends through the end portion 752 of the flange 738 and through the center bore of the cable spring 750. The first end portion 764 is engaged by a conventional bolt assembly 765 which abuts the L-shaped member 748. It will be appreciated that if the cable assembly is manufactured to size, the first end portion 764 may be fixedly connected to the L-shaped member 748 thereby eliminating the need for the conventional bolt assembly 765.

The inner wire 758 also has a second end portion 766 which is connected to a proximal barrier latch 768 adjacent the second side 724 of the platform 605. The proximal barrier latch 768 includes a recess or slot 770 for engaging and retaining the proximal barrier 698 when the proximal barrier 698 is in the closed position. The latch 768 is downwardly biased by a latch spring 772.

In operation, the proximal barrier 698 is typically in the closed position. However, when the platform 605 reaches the upper position (adjacent the vehicle floor surface 602), the proximal barrier drive motor 734 is actuated to drive the proximal barrier drive member 736 toward the proximal barrier 698. As the proximal barrier drive member 736 moves toward the proximal barrier 698, the pivot pin 740 moves from the distal end 746 of the slot 742 to the proximal end 744 of the slot 742 causing the L-shaped member 748 to slide along the slot 742 toward the proximal barrier 698. When the L-shaped member 748 slides along the slot 742, the cable spring 750 is allowed to expand thereby tensioning the inner wire 758 of the cable 754. The tensioned inner wire 758 pulls on the proximal barrier latch 768 causing the latch 768 to be lifted. Once the proximal barrier latch 768 is lifted by the inner wire 758, the pivot pin 740 contacts the proximal end 744 of the slot 742 causing the proximal barrier drive motor 734 and corresponding drive member 736 push the proximal barrier 698 from the closed position to the open position.

When the platform 605 is to be lowered from the upper position to the lower position, the drive motor 734 is actuated such that the drive member 736 pulls the proximal barrier 698 from the open position toward the closed position. When the proximal barrier 698 approaches the closed position, the cable spring 750 is compressed between the L-shaped member 748 and the end portion 752 of the flange 738 causing the inner wire 758 to relax. The relaxed inner wire 758 no longer pulls on the proximal barrier latch 768, therefore, the latch spring 772 pulls the proximal barrier latch 768 downwardly such that the proximal barrier 698 is locked in the closed position by the latch 768.

Control Logic for Third Embodiment

Figure 67:
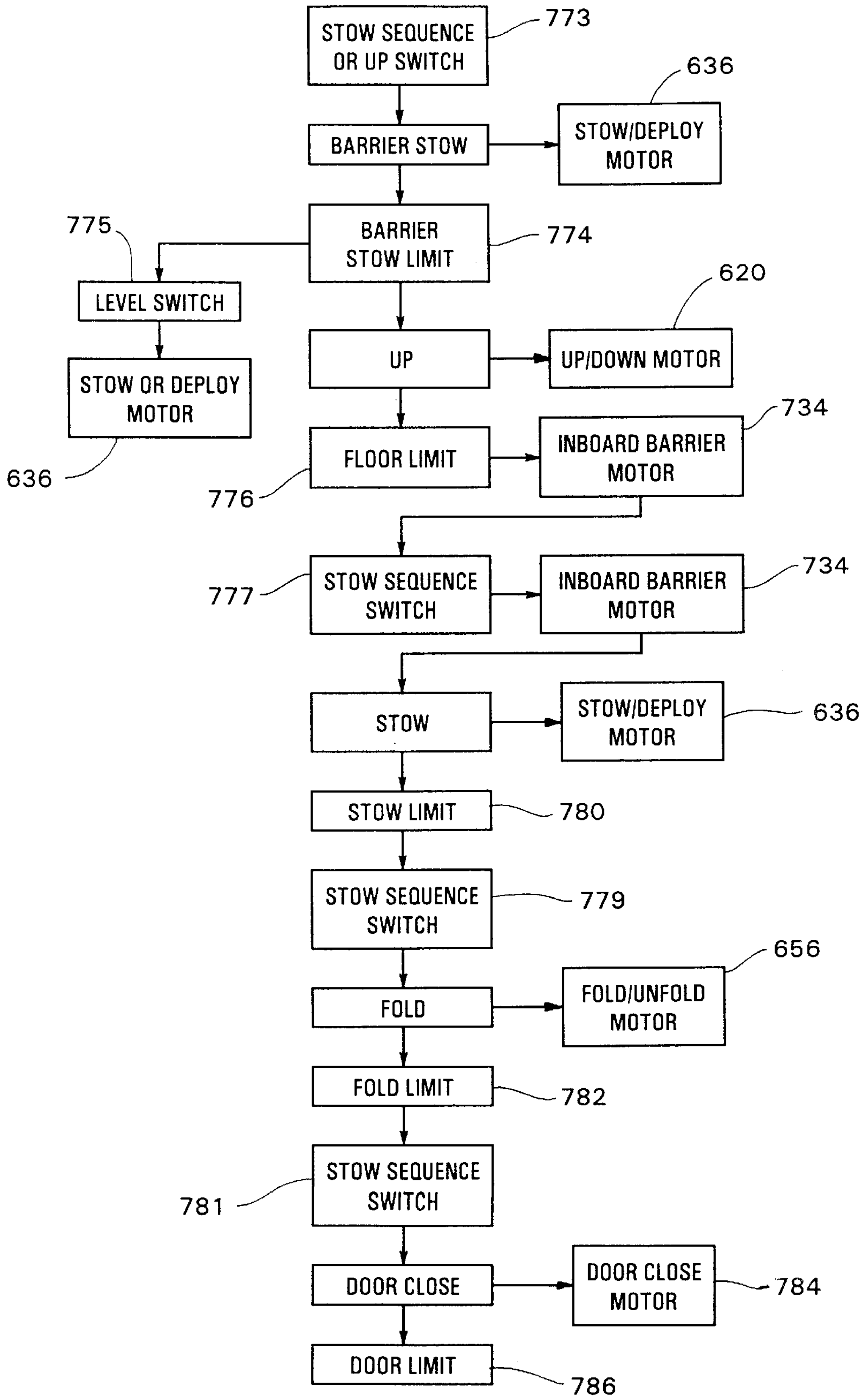
FIG. 67 shows a flow chart illustrating the control logic for stowing the powered platform of FIG. 56.

FIG. 67 is a flow diagram which illustrates representative control logic for moving the platform 605 from the deployed position (the platform 605 is adjacent the ground level 604 and aligned along a horizontal plane) to the stowed position (the platform is adjacent the vehicle floor surface 602 and arranged in the generally vertical compact folded configuration). As shown in FIG. 67, the stow/deploy motor 636 is activated by manual toggle switch 773 to raise the distal barrier 700 from the open to the closed position. A limit switch 774 senses when the distal barrier 700 is closed and activates the up/down motor 620 to vertically raise the platform 605 and deactivates the stow/deploy motor 636. A limit switch 776 senses when the platform 605 reaches the upper position and activates the proximal barrier drive motor 734 to move the proximal barrier 698 to the open position. After the object, such as a wheelchair, is removed from the platform 605, manual toggle switch 777 is used to activate proximal drive barrier motor 734 to close the proximal barrier 698 and then activates the stow/deployment motor 636 to move the platform 605 from the horizontal orientation toward the vertical orientation. When the platform 605 reaches the vertical position, limit switch 780 deactivates the stow deployment motor 636. Manual toggle switch 779 is then used to activate the fold/unfold motor 656 causing the platform 605 to move from the unfolded orientation to the folded orientation. When the platform 605 reaches the folded orientation, limit switch 782 senses that the platform is folded and deactivates the fold/unfold motor 656. Manual toggle switch 781 then is used to activate a door motor 784 which closes the vehicle door. Limit switch 786 senses when the door is closed and deactivates the door motor 784. It will be appreciated that the powered platform 600 can not be activated when the door is closed.

As also shown in FIG. 67, the horizontal orientation of the platform 605 can be adjusted through a manual level switch 775 which activates the stow/deploy motor 636 such that the platform 605 can be oriented in a particular inclined orientation to compensate for uneven ground surfaces and vehicle tilt.

Figure 68:
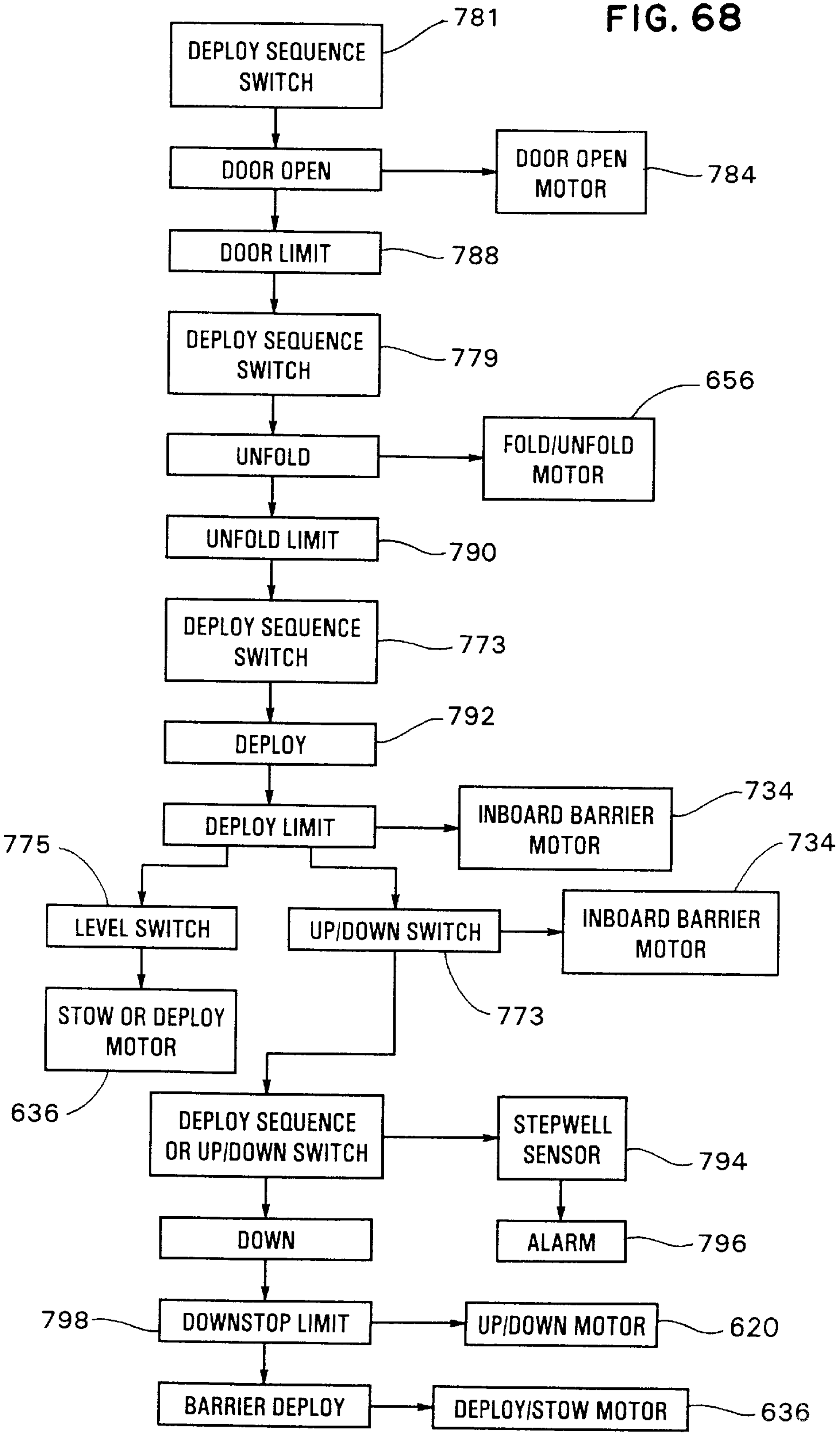
FIG. 68 shows a flow chart illustrating the control logic for deploying the powered platform of FIG. 56.

FIG. 68 is a flow diagram which illustrates representative control logic for moving the platform 605 from the stowed position (the platform is adjacent the vehicle floor surface 602 and arranged in the generally vertical compact folded configuration) to the deployed position (the platform 605 is adjacent the ground level 604 and aligned along a horizontal plane). As shown in FIG. 68, the door motor 784 is by activated manual toggle switch 781 such that the door is opened. Limit switch 788 deactivates the door motor 784 when the door is opened. Once the door is opened, manual toggle switch 779 is used to activate fold motor 656 causing the platform 605 to move from the folded orientation to the unfolded orientation. Limit switch 790 deactivates the fold motor 656 when the platform 605 reaches the unfolded orientation. Manual toggle switch 777 is then switched to activate the stow/deploy motor 636 and cause the platform 605 to move from the vertical orientation to the horizontal orientation. A limit switch 792 deactivates the stow/deploy motor 636 when the platform 605 is generally horizontal. The exact orientation of the platform may be controlled by manual level switch 775 as previously described. The limit switch 792 also activates the proximal barrier motor 734 which causes the proximal barrier 698 to move from the closed to the open position. A step well sensor 794 triggers an alarm 796 if the platform 605 is not directly adjacent to the vehicle floor surface 602. Once the object is loaded on the platform 605, manual toggle switch 773 is switched causing the proximal barrier motor to close the proximal barrier 698 and also causing the up/down motor 620 to vertically lower the platform 605. A limit switch 798 deactivates the up/down motor 620 when the platform reaches ground level 604 and activates the deployment stow motor 636 which moves the distal barrier from the closed to the open position.

It will be appreciated that manual toggle switches 773, 777, 779, 781 may be incorporated in a single control panel.

Figure 69:
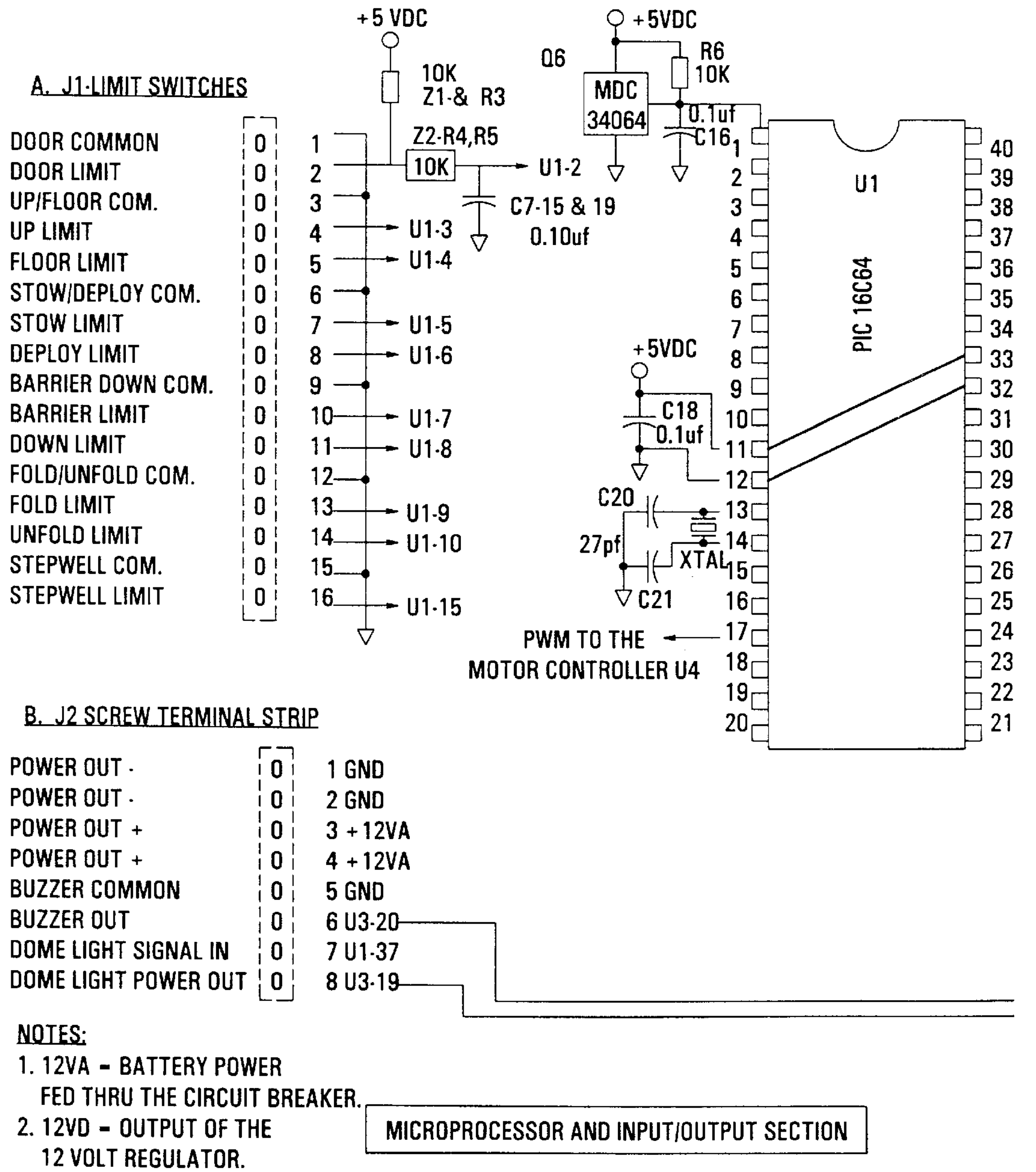
FIG. 69 illustrates a representative microprocessor which may be employed by the powered platform 600 from controlling systems operations.

FIG. 69 illustrates a representative microprocessor which may be employed by the powered platform 600 from controlling systems operations. Specifically, FIG. 69 shows limit switch wiring configurations to the microprocessor.

FIG. 70 defines microprocessor connections and limit switch commons for the microprocessor shown in FIG. 69. FIG. 70 also defines connection points for the limit switches to the microprocessor.

FIG. 71 defines additional processor connections and outputs of the microprocessor of FIG. 69.

Figure 72:
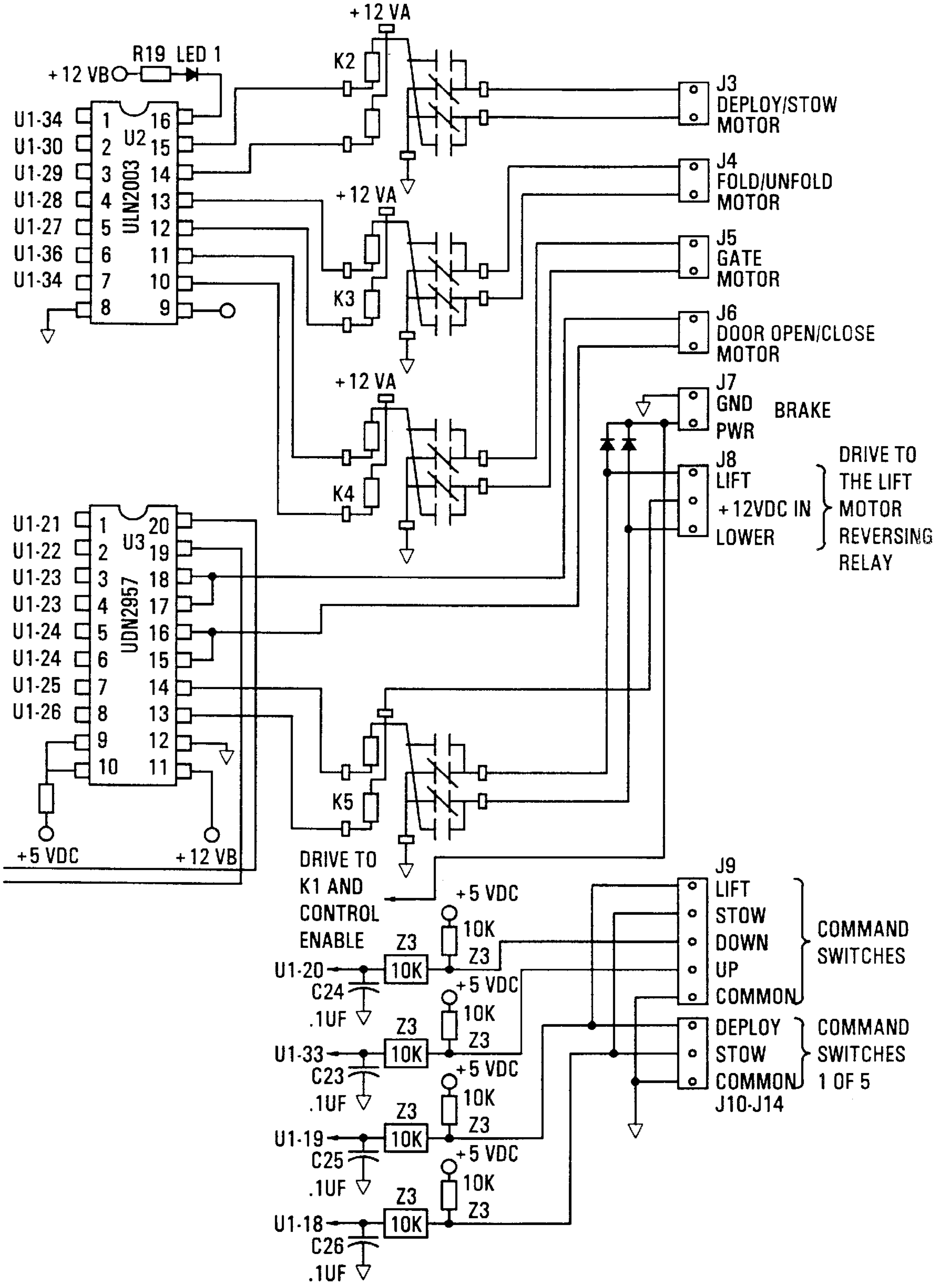
FIG. 72 illustrates a representative control processor for controlling the speed of the up-down motor 620.

FIG. 72 illustrates a representative control processor for controlling the up-down motor 620. The up-down motor 620 is variable speed with the processor controlling the pulse width modulated (PWM) output.

Figure 73:
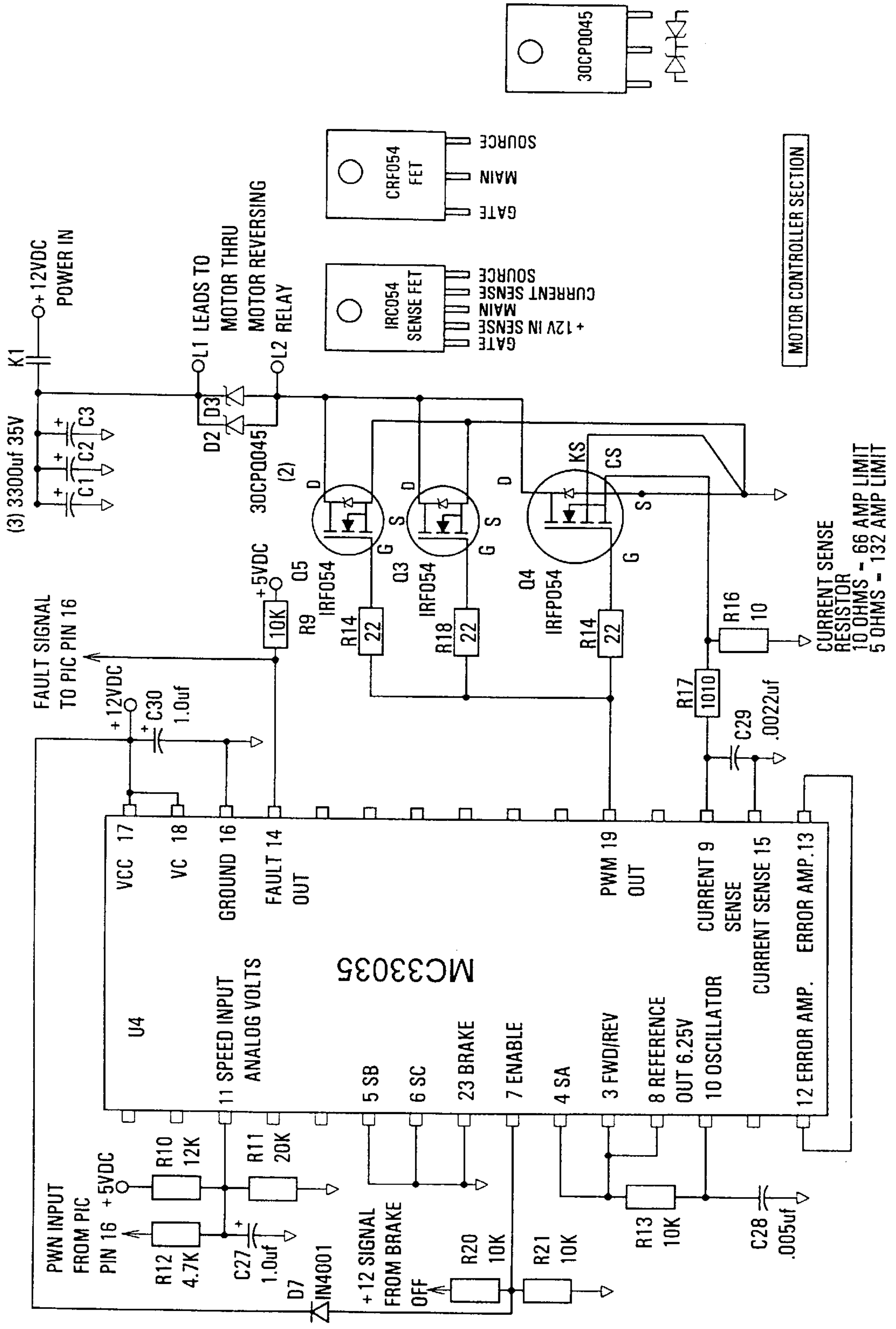
FIG. 73 shows a schematic diagram illustrating representative circuitry for controlling the power supplies of the powered platform of FIG. 56.

FIG. 73 shows a schematic diagram illustrating representative circuitry for controlling the power supplies of the powered platform 600.

Figure 74:
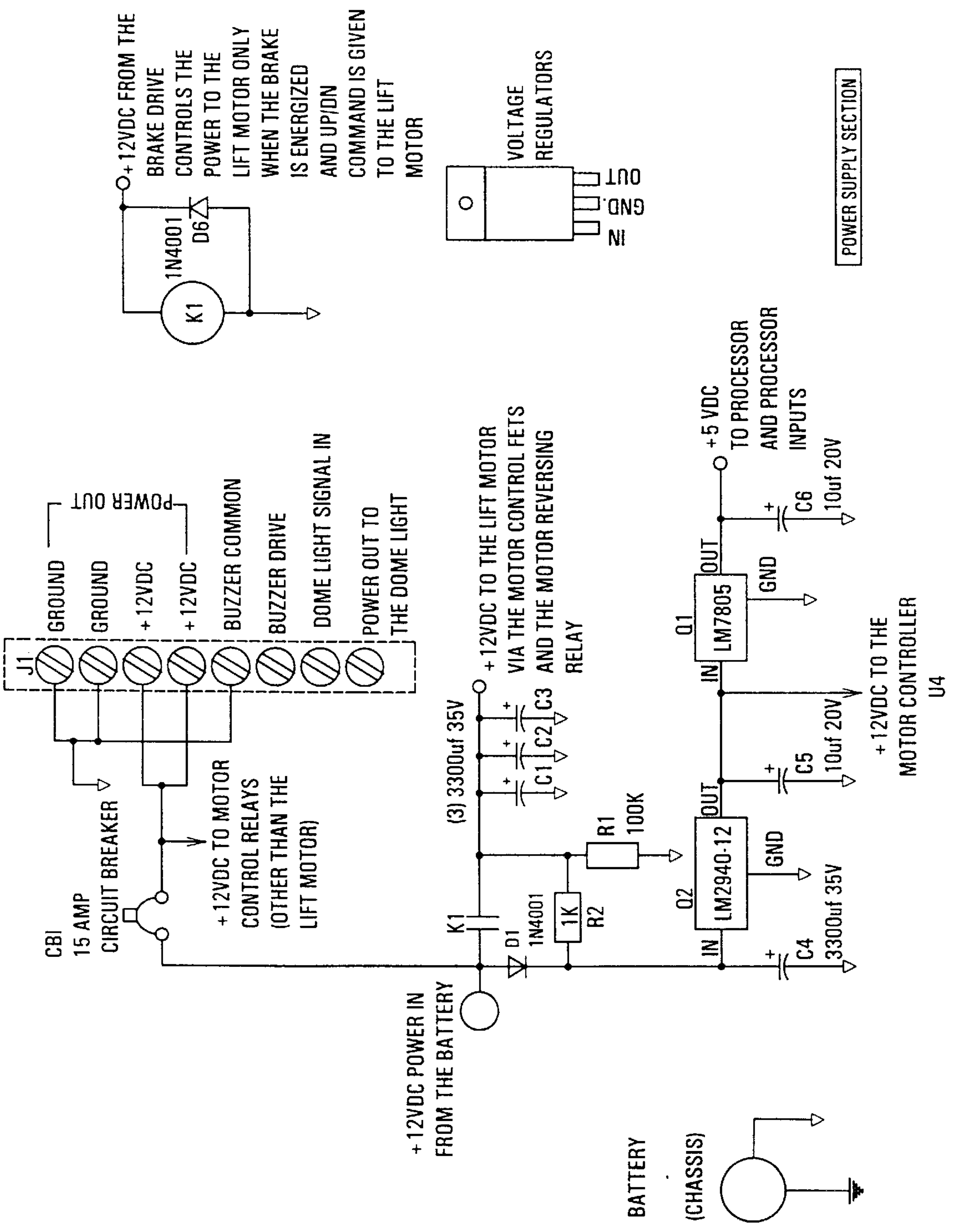
FIG. 74 shows a schematic diagram illustrating representative circuitry for controlling the drive motors of the powered platform of FIG. 56.

FIG. 74 shows a schematic diagram illustrating representative circuitry for controlling all of the drive motors of the powered platform 600 except the PWM for the main motor 620.

The present invention has been described in detail by means of illustrative embodiments, which are not to be interpreted to unduly limit the scope of the invention. It is believed that modification can be made by one skilled in the art, particularly in sizes and shapes. For example, the various combinations of the pivot arms, automatic leveling, and single toggle switch operation can be incorporated into the various embodiments; various limiting switches can be selected; and the locations of limiting switches can be varied. Further, it is to be understood that the switch panel configurations of FIGS. 50–51 and FIGS. 52–53, as well as the remote control units of FIGS. 54–55 can be modified to be applied to the various combinations of movement and control schemes described hereinabove. Also, different materials that can facilitate sliding, such as other plastics, e.g., polytetrafluroethylene, can be used in place of neoprene in the sliding shoe 102 or the neoprene piece 134 on which the hand rail slides.

What is claimed is:

1. A collapsible, powered platform for transportation of an object between a floor of a first structure at a first level and a floor of a second structure at a second level, comprising:

(a) a multi-section platform having a folded configuration and an unfolded configuration, a stowed position and a deployed position, and a raised position at the first level and a lowered position at the second level;

(b) a powered drive means mounted on the first structure and operatively connected to the multi-section platform for moving the platform through multiple movement phases including platform unfolding and folding movement phases in which the platform is moved from the folded configuration to the unfolded configuration and from the unfolded configuration to the folded configuration, respectively, platform deploy and stow movement phases in which the platform is moved from the stowed position to the deployed position and from the deployed position to the stowed position, respectively, and platform down and up movement phases in which the platform is moved vertically from the raised position to the lowered position and from the lowered position to the raised position, respectively; and (c) a platform maneuvering system including a control system for controlling all of the movement phases in step (b), said control system includes a manually actuated switch, wherein the manually actuated switch includes a down sequence position and a neutral position, and wherein the manually actuated switch and the control system are operatively constructed such that the platform unfolding movement phase, the platform deploy movement phase and the platform down movement phase are each controlled by the manually actuated switch as a result of separate actuations of the manually actuated switch to the down sequence position wherein the platform stops upon completion of each of said movement phases and a subsequent said movement phase commences upon actuation of the switch.

2. A collapsible, powered platform in accordance with claim 1, in which the manually actuated switch is biased to return to the neutral position.

3. A collapsible, powered platform in accordance with claim 2, in which the manually actuated switch comprises a single toggle switch.

4. A collapsible, powered platform in accordance with claim 3, in which the single switch further includes an up sequence position, and wherein the platform folding movement phase, the platform stow movement phase and the platform up movement phase are each controlled by the single switch as a result of separate actuations of the single switch to the up sequence position.

5. A collapsible, powered platform in accordance with claim 1, wherein the first structure includes at least one door that is moveable between a substantially open position and a closed position, and in which the control system includes door movement phase circuitry controlling door opening and closing movement phases including moving the door from the open position to the closed position and from the closed position to the open position, respectively.

6. A collapsible, powered platform in accordance with claim 1, in which the control system includes platform folding and unfolding movement circuitry controlling movement of the platform during the platform folding and unfolding movement phases.

7. A collapsible, powered platform in accordance with claim 1, in which the control system includes platform deploy and stow movement circuitry controlling movement of the platform during the deploy and stow movement phases, wherein in the stowed position the platform is substantially vertical and in the deployed position the platform is substantially horizontal.

8. A collapsible, powered platform in accordance with claim 1, further including a barrier mounted upon the platform the barrier being pivotally attached to an end of the platform closest to the first structure, and wherein the control system includes circuitry for controlling the barrier.

9. A collapsible, powered platform in accordance with claim 1, in which the control system includes platform down and up movement circuitry controlling movement of the platform during the platform down and up movement phases.

10. A collapsible, powered platform in accordance with claim 9, further including a barrier mounted upon the platform the barrier being pivotally attached to an end of the platform furthest from the first structure, and wherein the control system includes circuitry for controlling the barrier.

11. A collapsible, powered platform in accordance with claim 9, in which the control system includes level sensors and circuitry for automatically positioning the platform in a position level with the floor of the second structure.

12. A collapsible, powered platform in accordance with claim 9, in which the control system includes manual level means for positioning the platform in a position level with the floor of the second structure.

13. A collapsible, powered platform in accordance with claim 1, wherein the control system includes a second manually actuated switch, and said second manually actuated switch includes an up sequence position and a neutral position, and wherein the control system and the second manually actuated switch are operatively constructed such that the platform folding movement phase, the platform stow movement phase and the platform up movement phase are each controlled by the second manually actuated switch as a result of separate actuations of the second manually actuated switch to the up sequence position.

* * * * *